(12) United States Patent
Dong et al.

(10) Patent No.: US 9,632,243 B2
(45) Date of Patent: Apr. 25, 2017

(54) GLASS LARGE-CORE OPTICAL FIBERS

(71) Applicant: IMRA America, Inc., Ann Arbor, MI (US)

(72) Inventors: Liang Dong, Clemson, SC (US); Jun Li, Harrisburg, PA (US); Hugh McKay, Ann Arbor, MI (US); Libin Fu, Ann Arbor, MI (US); Andrius Marcinkevicius, Saline, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 14/644,779

(22) Filed: Mar. 11, 2015

(65) Prior Publication Data

US 2015/0241628 A1  Aug. 27, 2015

Related U.S. Application Data

(63) Continuation of application No. 13/440,215, filed on Apr. 5, 2012, now Pat. No. 8,995,051, which is a
(Continued)

(51) Int. Cl.
*G02B 6/028* (2006.01)
*H01S 3/067* (2006.01)
(Continued)

(52) U.S. Cl.
CPC ....... *G02B 6/0288* (2013.01); *G02B 6/02009* (2013.01); *G02B 6/0283* (2013.01);
(Continued)

(58) Field of Classification Search
CPC .................................................. H01S 3/06754
See application file for complete search history.

(56) References Cited

U.S. PATENT DOCUMENTS

| | | |
|---|---|---|
| 4,641,917 A | 2/1987 | Glodis |
| 4,784,486 A | 11/1988 | Van Wagenen |

(Continued)

FOREIGN PATENT DOCUMENTS

| | | |
|---|---|---|
| CN | 1686884 | 10/2005 |
| DE | 60004638 | 6/2004 |

(Continued)

OTHER PUBLICATIONS

Birks, et. al., "Endlessly single-mode photonic crystal fiber," Jul. 1, 1997, vol. 22, No. 13, Optics Letters, pp. 961-963.
(Continued)

*Primary Examiner* — Eric Bolda
(74) *Attorney, Agent, or Firm* — Knobbe, Martens, Olson & Bear, LLP

(57) ABSTRACT

Embodiments of optical fiber may include cladding features that include a material (e.g., fluorine-doped silica glass) that may produce a very low relative refractive index difference with respect to cladding material in which the cladding features are disposed. This relative refractive index difference may be characterized by $(n_1-n_2)/n_1$, where $n_1$ is the index of refraction of the cladding material in which the cladding features are included, and $n_2$ is the index of refraction of the cladding features. In certain embodiments, the relative refractive index difference may be less than about $4.5 \times 10^{-3}$. In various embodiments, the configuration of the cladding features including, for example, the size and spacing of the cladding features, can be selected to provide for confinement of the fundamental mode yet leakage for the second mode and higher modes, which may provide mode filtering, single mode propagation, and/or low bend loss.

25 Claims, 47 Drawing Sheets

Related U.S. Application Data continuation of application No. 12/641,262, filed on Dec. 17, 2009, now Pat. No. 8,159,742, which is a continuation of application No. PCT/US2008/074668, filed on Aug. 28, 2008.

(60) Provisional application No. 60/975,478, filed on Sep. 26, 2007, provisional application No. 61/086,433, filed on Aug. 5, 2008.

(51) Int. Cl.
  *G02B 6/02* (2006.01)
  *H01S 3/091* (2006.01)
  *H01S 3/11* (2006.01)
  *G02B 6/14* (2006.01)

(52) U.S. Cl.
  CPC ..... *G02B 6/02333* (2013.01); *G02B 6/02357* (2013.01); *G02B 6/02361* (2013.01); *G02B 6/02366* (2013.01); *G02B 6/02371* (2013.01); *H01S 3/06754* (2013.01); *H01S 3/091* (2013.01); *H01S 3/11* (2013.01); *G02B 6/14* (2013.01); *H01S 3/06729* (2013.01)

(56) References Cited

U.S. PATENT DOCUMENTS

| | | | |
|---|---|---|---|
| 5,032,001 A | 7/1991 | Shang | |
| 5,121,460 A | 6/1992 | Tumminelli | |
| 5,175,785 A | 12/1992 | Dabby | |
| 5,353,363 A | 10/1994 | Keck | |
| 5,452,394 A | 9/1995 | Huang | |
| 5,521,703 A | 5/1996 | Mitchell | |
| 5,615,673 A | 4/1997 | Berger et al. | |
| 5,742,722 A | 4/1998 | Imoto | |
| 5,802,236 A | 9/1998 | DiGiovanni | |
| 5,818,630 A | 10/1998 | Fermann et al. | |
| 5,949,941 A | 9/1999 | DiGiovanni | |
| 6,072,811 A | 6/2000 | Fermann et al. | |
| 6,097,870 A | 8/2000 | Ranka | |
| 6,236,779 B1 | 5/2001 | Kafka | |
| 6,243,522 B1 * | 6/2001 | Allan | C03B 37/01205 385/123 |
| 6,334,017 B1 | 12/2001 | West | |
| 6,334,019 B1 | 12/2001 | Birks | |
| 6,389,198 B2 | 5/2002 | Kafka | |
| 6,418,258 B1 | 7/2002 | Wang | |
| 6,444,133 B1 | 9/2002 | Fajardo et al. | |
| 6,483,973 B1 | 11/2002 | Mazzarese | |
| 6,542,681 B2 | 4/2003 | Broeng | |
| 6,603,912 B2 | 8/2003 | Birks et al. | |
| 6,631,234 B1 | 10/2003 | Russell | |
| 6,652,163 B2 | 11/2003 | Fajardo | |
| 6,778,732 B1 | 8/2004 | Fermann et al. | |
| 6,792,188 B2 | 9/2004 | Libori | |
| 6,795,635 B1 | 9/2004 | Fajardo | |
| 6,825,974 B2 | 11/2004 | Kliner et al. | |
| 6,836,607 B2 | 12/2004 | Dejneka et al. | |
| 6,845,204 B1 | 1/2005 | Broeng | |
| 6,853,786 B2 | 2/2005 | Russell | |
| 6,856,742 B2 | 2/2005 | Broeng | |
| 6,888,992 B2 | 5/2005 | Russell | |
| 6,892,018 B2 | 5/2005 | Libori et al. | |
| 6,954,574 B1 | 10/2005 | Russell | |
| 6,972,894 B2 | 12/2005 | Bjarklev | |
| 6,987,783 B2 | 1/2006 | Fajardo | |
| 6,990,282 B2 | 1/2006 | Russell | |
| 7,054,513 B2 | 5/2006 | Herz | |
| 7,088,756 B2 | 8/2006 | Fermann et al. | |
| 7,106,932 B2 | 9/2006 | Birks | |
| 7,116,875 B2 | 10/2006 | Wadsworth | |
| 7,136,558 B2 | 11/2006 | Epworth et al. | |
| 7,136,559 B2 | 11/2006 | Yusoff | |
| 7,155,097 B2 | 12/2006 | Jakobsen | |
| 7,171,091 B1 | 1/2007 | Ward | |
| 7,174,078 B2 | 2/2007 | Libori | |
| 7,190,705 B2 | 3/2007 | Fermann et al. | |
| 7,209,619 B2 | 4/2007 | Dong | |
| 7,221,840 B2 | 5/2007 | Vienne | |
| 7,224,873 B2 | 5/2007 | Bird | |
| 7,245,807 B2 | 7/2007 | Mangan | |
| 7,257,302 B2 | 8/2007 | Fermann | |
| 7,266,275 B2 | 9/2007 | Hansen | |
| 7,280,730 B2 | 10/2007 | Dong et al. | |
| 7,289,709 B2 | 10/2007 | Folkenberg et al. | |
| 7,304,309 B2 | 12/2007 | Suhami | |
| 7,305,164 B2 | 12/2007 | Williams | |
| 7,321,712 B2 | 1/2008 | Williams | |
| 7,327,922 B2 | 2/2008 | Skovgaard | |
| 7,346,249 B2 | 3/2008 | Russell | |
| 7,349,611 B2 | 3/2008 | Broeng | |
| 7,400,804 B1 | 7/2008 | Di Teodoro et al. | |
| 7,414,780 B2 | 8/2008 | Fermann | |
| 7,418,836 B2 | 9/2008 | Dong | |
| 7,532,798 B2 | 5/2009 | Williams | |
| 7,539,382 B2 | 5/2009 | Skovgaard | |
| 7,590,323 B2 | 9/2009 | Broeng | |
| 7,787,729 B2 | 8/2010 | Dong et al. | |
| 7,792,394 B2 | 9/2010 | Dong et al. | |
| 7,970,248 B2 | 6/2011 | Dong et al. | |
| 8,027,557 B2 | 9/2011 | Frith | |
| 8,040,929 B2 | 10/2011 | Imeshev et al. | |
| 8,055,109 B2 | 11/2011 | Dong et al. | |
| 8,159,742 B2 | 4/2012 | Dong et al. | |
| 8,285,099 B2 | 10/2012 | Dong et al. | |
| 8,290,322 B2 | 10/2012 | Dong et al. | |
| 8,571,370 B2 | 10/2013 | Dong et al. | |
| 8,861,913 B2 | 10/2014 | Dong et al. | |
| 8,873,916 B2 | 10/2014 | Dong et al. | |
| 8,995,051 B2 | 3/2015 | Dong et al. | |
| 9,146,345 B1 | 9/2015 | Dong et al. | |
| 9,281,650 B2 | 3/2016 | Dong et al. | |
| 2001/0024546 A1 | 9/2001 | Kafka | |
| 2001/0026667 A1 | 10/2001 | Kawanishi et al. | |
| 2002/0131742 A1 * | 9/2002 | Bayart | B82Y 20/00 385/125 |
| 2002/0159736 A1 | 10/2002 | Dejneka | |
| 2002/0181534 A1 | 12/2002 | Hodgson | |
| 2003/0059185 A1 | 3/2003 | Russell | |
| 2004/0005127 A1 | 1/2004 | Kliner | |
| 2004/0033043 A1 | 2/2004 | Monro et al. | |
| 2004/0052484 A1 | 3/2004 | Broeng et al. | |
| 2004/0071423 A1 | 4/2004 | Libori et al. | |
| 2004/0136669 A1 | 7/2004 | Hasegawa | |
| 2004/0146264 A1 | 7/2004 | Auner | |
| 2004/0165809 A1 | 8/2004 | Kersey et al. | |
| 2004/0175084 A1 | 9/2004 | Broeng et al. | |
| 2004/0213302 A1 | 10/2004 | Fermann et al. | |
| 2004/0228592 A1 | 11/2004 | Gaeta et al. | |
| 2004/0258381 A1 | 12/2004 | Borrelli | |
| 2005/0018714 A1 | 1/2005 | Fermann et al. | |
| 2005/0025441 A1 | 2/2005 | Kawanishi et al. | |
| 2005/0031280 A1 | 2/2005 | Izoe et al. | |
| 2005/0041702 A1 | 2/2005 | Fermann et al. | |
| 2005/0069269 A1 | 3/2005 | Libori | |
| 2005/0105865 A1 | 5/2005 | Fermann et al. | |
| 2005/0157998 A1 | 7/2005 | Dong | |
| 2005/0169590 A1 | 8/2005 | Alkeskjold | |
| 2005/0185908 A1 | 8/2005 | Roberts | |
| 2005/0226278 A1 | 10/2005 | Gu et al. | |
| 2005/0232313 A1 | 10/2005 | Fermann | |
| 2005/0238070 A1 | 10/2005 | Imeshev | |
| 2005/0276556 A1 | 12/2005 | Williams | |
| 2006/0005579 A1 | 1/2006 | Jacobsen | |
| 2006/0067632 A1 | 3/2006 | Broeng | |
| 2006/0088261 A1 | 4/2006 | Berkey | |
| 2006/0177187 A1 | 8/2006 | Williams | |
| 2006/0193583 A1 | 8/2006 | Dong et al. | |
| 2006/0209908 A1 | 9/2006 | Pedersen | |
| 2006/0222307 A1 | 10/2006 | Walton | |
| 2006/0263024 A1 | 11/2006 | Dong et al. | |
| 2007/0163301 A1 | 7/2007 | Dong | |
| 2007/0177846 A1 | 8/2007 | Chen | |

(56) References Cited

U.S. PATENT DOCUMENTS

| | | |
|---|---|---|
| 2007/0201801 A1 | 8/2007 | Provost |
| 2008/0056656 A1 | 3/2008 | Dong |
| 2009/0122308 A1 | 5/2009 | Dong et al. |
| 2009/0207483 A1 | 8/2009 | Goto |
| 2009/0257055 A1 | 10/2009 | Chen et al. |
| 2010/0157418 A1 | 6/2010 | Dong et al. |
| 2011/0305251 A1 | 12/2011 | Tanigawa et al. |
| 2013/0089112 A1 | 4/2013 | Dong et al. |
| 2013/0089113 A1 | 4/2013 | Dong et al. |
| 2014/0044139 A1 | 2/2014 | Dong et al. |
| 2015/0036701 A1 | 2/2015 | Dong et al. |
| 2015/0036703 A1 | 2/2015 | Dong et al. |
| 2015/0241628 A1 | 8/2015 | Dong et al. |

FOREIGN PATENT DOCUMENTS

| | | |
|---|---|---|
| EP | 1043281 | 10/2000 |
| EP | 1421420 | 1/2007 |
| FR | 2333628 | 7/1977 |
| GB | 2103202 | 2/1983 |
| JP | 05-345632 | 12/1993 |
| JP | 53-45632 | 12/1993 |
| JP | 06-037385 | 2/1994 |
| JP | 60-37385 | 2/1994 |
| JP | 06-298542 | 10/1994 |
| JP | 62-98542 | 10/1994 |
| JP | S62-116902 | 5/1997 |
| JP | H11-74593 | 3/1999 |
| JP | 2000-347057 | 12/2000 |
| JP | 2000-356719 | 12/2000 |
| JP | 2001-272568 | 10/2001 |
| JP | 2001-272569 | 10/2001 |
| JP | 2002-506533 | 2/2002 |
| JP | 2002-116181 | 4/2002 |
| JP | 2002-185063 | 6/2002 |
| JP | 2002-533290 | 10/2002 |
| JP | 2003-021759 | 1/2003 |
| JP | 2003-202445 | 7/2003 |
| JP | 2004-101565 | 4/2004 |
| JP | 2005-500583 | 1/2005 |
| WO | WO 98/36300 | 8/1998 |
| WO | WO 99/00685 A1 | 1/1999 |
| WO | WO 00/16141 | 3/2000 |
| WO | WO 00/37974 A1 | 6/2000 |
| WO | WO 00/49435 A1 | 8/2000 |
| WO | WO 00/60390 | 10/2000 |
| WO | WO 01/37008 | 5/2001 |
| WO | WO 02/39159 | 5/2002 |
| WO | WO 02/059656 | 8/2002 |
| WO | WO 02/088801 | 11/2002 |
| WO | WO 02/101429 | 12/2002 |
| WO | WO 03/019257 A1 | 3/2003 |
| WO | WO 03/032039 | 4/2003 |
| WO | WO 03/034118 | 4/2003 |
| WO | WO 03/078338 | 9/2003 |
| WO | WO 03/100488 | 12/2003 |
| WO | WO 2004/019092 | 3/2004 |
| WO | WO 2004/053550 | 6/2004 |
| WO | WO 2004/111695 | 12/2004 |
| WO | WO 2005/070170 | 4/2005 |
| WO | WO 2005/041367 | 5/2005 |
| WO | WO 2005/054139 | 6/2005 |
| WO | WO 2005/059612 | 6/2005 |
| WO | WO 2005/091029 | 9/2005 |
| WO | WO 2006/005111 | 1/2006 |
| WO | WO 2006/072025 | 7/2006 |
| WO | WO 2006/112071 | 10/2006 |
| WO | WO 2006/119334 | 11/2006 |
| WO | WO 2008/014331 | 1/2008 |
| WO | WO 2008/126472 | 10/2008 |
| WO | WO 2009/042347 | 4/2009 |

OTHER PUBLICATIONS

Bouwmans, et al., "High-power Er:Yb fiber laser with very high numerical aperture pump-cladding waveguide", Applied Physics Letters, vol. 83, No. 5, pp. 817-818, Aug. 4, 2003.

Bouwmans, et al., "Properties of a hollow-core photonic bandgap fiber at 850 nm wavelength", Optic Express, vol. 11, No. 14, 2003, pp. 1613-1620.

Cregan, et al., "Single-mode photonic band gap guidance of light in air", Science Mag., vol. 285, Sep. 1999, pp. 1537-1539.

Croteau et al., "Bending insensitive highly Yb-doped LMA triple-clad fiber for nearly diffraction-limited laser output" SPIE Proceedings Laser Beam Control and Applications, vol. 6101, pp. 61010G-1 to 61010G-10, Feb. 16, 2006.

De Matos et al., "All-fiber chirped pulse amplification using highly-dispersive air-core photonic bandgap fiber," Optics Express vol. 11, No. 22, Nov. 3, 2003, pp. 2832-2837.

Deguil-Robin, et al., "Rod-type fiber laser", Advanced Solid State Photonics, 2005.

Dong et al. "All-glass large-core leakage channel fibers", Selected Topics in Quantum Electronics, vol. 15, No. 1, pp. 47-53, Jan./Feb. 2009.

Dong et al. "Robust single-mode operation in 50 micron Ytterbium-doped Leakage Channel Fibers", Fiber Lasers IV: Technology, Systems, and Applications, ed. Harter et al., Proceedings of SPIE, vol. 6453, pp. 645316-1 to 645316-8, Feb. 2007.

Engeness, et al., "Dispersion tailoring and compensation by modal interaction in omniguide fibers", Optics Express, vol. 11; No. 10; May 19, 2003; pp. 1175-1196.

Feng, X. et al., "Solid microstructured optical fiber," Optics Express, vol. 11, No. 18, pp. 2225-2230, Sep. 8, 2003.

Fermann, M.E., "Single-mode excitation of multimode fibers with ultrashort pulses," Optics Letters, vol. 23, No. 1, pp. 52-54, Jan. 1, 1998.

Fini, J.M., "Design of solid and microstructure fibers for suppression of higher-order modes," Optics Express, vol. 13, No. 9, pp. 3477- 3490, May 2, 2005.

Fink, et al., "Guiding optical light in air using an all-dielectric structure", journal of lightwave technology, vol. 17, No. 11, Nov. 1999, pp. 2039-2041.

Folkenberg et al., "Experimental investigation of cutoff phenomena in nonlinear photonic crystal fibers", Optics Letters, vol. 28, No. 20, pp. 1882-1884, Oct. 15, 2003.

Fu L. et al., "All-glass Leakage Channel Fibers with Fluorine-doped Silica Pump Cladding", Conference on Lasers and Electro-optics, IQEC 2009, pp. 1-2, Jun. 2009.

Furusawa et al., "Cladding pumped ytterbium-doped fiber laser with holey inner and outer cladding", Optics Express, vol. 9, No. 13, pp. 714-720, Dec. 17, 2001.

Galvanauskas, Mode-scalable fiber chirped pulse amplification systems, IEEE J. Sel. Top. Quantum Electronics, vol. 7, No. 4, pp. 504-517, Jul./Aug. 2001.

Ghatak et al., Section 8.5.2 "Splice Loss" in Introduction to Fiber Optics, Cambridge University Press, pp. 151-154, 1998.

Glas, et al., "Cladding pumped large-mode-area nd-doped holey fiber laser", Optics Express, vol. 10, No. 6, pp. 286-290, Mar. 25, 2002.

Hasegawa, et al., "Hole-assisted light guide fiber for large anomalous dispersion and low optical loss," Optics Express, vol. 9, No. 13, pp. 681-686, Dec. 17, 2001.

Knight, et al., Properties of photonic crystal fiber and the effective index model, J. Opt. Soc Am. A/vol. 15, No. 3, Mar. 1998, pp. 748-752.

Knight, et. al., All-silica single-mode optical fiber with photonic crystal cladding, Oct. 1, 1996, vol. 21, No. 19, Optics Letters, pp. 1547-1549.

Kuhlmey, et al., "Microstructured optical fibers: where's the edge?", Optics Express, vol. 10, No. 22, pp. 1285-1290, Nov. 4, 2002.

Kuhlmey, et al., "Modal cutoff in microstructured optical fibers", Optics Letters, vol. 27, No. 19 pp. 1684-1686, Oct. 1, 2002.

Lægsaard, et al., "Material effect in air-guiding photonic bandgap fibers", Journal of the Optical Society of America, B, vol. 20, No. 10, Oct. 2003, pp. 2046-2051.

(56) References Cited

OTHER PUBLICATIONS

Laperle et al., "Yb-doped LMA triple-clad fiber laser" SPIE Proceedings Paper, vol. 6343: Photonics North 2006, Pierre Mathieu, Editors, pp. 63430X-1 to 63430X-9, Sep. 8, 2006.
Limpert et al., "Extended single-mode photonic crystal fiber lasers", Optics Express, vol. 14, No. 7, pp. 2715-2720, Apr. 3, 2006.
Limpert, et al., "High power air-clad large-mode-area photonic crystal fiber laser", Optics Express, vol. 11, pp. 818-823, Apr. 7, 2003.
Limpert, et al., High power Q-switched Yb-doped photonic crystal fiber laser producing sub-10 pulses, Conf. on Advanced Solid State Photonics, paper pd-411, Vienna (2005).
Mangan, et al., "Low loss (1.7 db/km) hollow core photonic bandgap fiber", pdp24, Optical Communications Conference, Feb. 2004.
Martinez, et al., "(E)ESI determination from mode-field diameter and refractive index profile measurements on single-mode fibers", IEEE Proceedings v135, pp. 202-210, Jun. 1988.
Monsoriu, et al., "High-index-core Bragg fibers: dispersion properties", Optics Express, vol. 11, No. 12, Jun. 16, 2003, pp. 1400-1405.
Mortensen, et al., "Improved large-mode-area endlessly single-mode photonic crystal fibers", Optics Letters, vol. 28, No. 6, pp. 393-395, Mar. 15, 2003.
Mortensen, "Effective area of photonic crystal fibers", Optics Express, vol. 10, No. 7, pp. 341-348, Apr. 8, 2002.
Mortensen, "Modal cutoff and the V parameter in photonic crystal fibers", Optics Letters vol. 28, No. 20 p. 1879-1881, Oct. 15, 2003.
Ouyang, et al., "Comparative study of air-core and coaxial bragg fibers: single-mode transmission and dispersion characteristics", Optics Express, vol. 9, No. 13, Dec. 17, 2001, pp. 733-747.
Ouyang, et al., "Theoretical study on dispersion compensation in air-core bragg fibers", Optics Express, vol. 10, No. 17, Aug. 26, 2002, pp. 899-908.
Ouzounov et al., "Generation of megawatt optical solutions in hollow-core photonic band-gap fibers", Science Magazine, vol. 301, Sep. 19, 2003, pp. 1702-1704.
Ranka et al., "Optical properties of high-delta air silica microstructure optical fibers", Optics Letters, vol. 25, No. 11, pp. 796-798, Jun. 1, 2000.
Ranka et al., "Visible continuum generation in air-silica microstructure optical fibers with anomalous dispersion at 800 nm", Optics Letters, vol. 25, No. 1, pp. 25-27, Jan. 1, 2000.
Russell et al., "Photonic crystal fibers", Science Mag. vol. 299, pp. 358-362, Jan. 17, 2003.
Schreiber et al., "Stress-induced single-polarization single-transverse mode photonic crystal fiber with low nonlinearity", Optics Express, vol. 13, No. 19, pp. 7621-7630, Sep. 19, 2005.
Smith et al., "Low-loss hollow-core silica/air photonic bandgap fiber", Nature, vol. 424, Aug. 2004, pp. 657-659.
Snyder et al., "Optical Waveguide Theory," appendix charts, Chapman and Hall Ltd., 1983.
Wadsworth et al., "High power air-clad photonic crystal fibre laser", Optics Express, vol. 11, No. 1, pp. 48-53, Jan. 13, 2003.
Wong et al., "Breaking the limit of maximum effective area for robust guided single-mode propagation in optical fibers", Optics Letters, vol. 30, No. 21, Nov. 1, 2005.
Wong et al., "Robust single-mode propagation in optical fibers with record effective areas", Conference on Lasers and Electro-optics (CLEO), May 22-27, 2005, CLEO 05 Cpdb10.
Wu T., et al.., "Bend performance of leakage channel fibers", Optics Express, vol. 16, No. 6, pp. 4278-4285, Mar. 17, 2008.
Yeh et al., "Theory of Bragg Fiber", J. Opt. Soc. Am., vol. 68, No. 9, Sep. 1978, pp. 1196-1201.
International Search Report and Written Opinion in International Application No. PCT/US2008/074668 dated Jan. 27, 2009.
International Search Report and Written Opinion in International Application No. PCT/US05/00911 dated Jul. 18, 2006.
International Search Report and Written Opinion in International Application No. PCT/US05/47520 dated Jan. 23, 2007.

Office Action issued Jan. 25, 2010 for German Patent Application No. DE 10 2006 023 976.8.
Examiner's Office Letter for Japanese Patent Application No. JP 2011-14254 dated May 21, 2013, in 8 pages.
Office Action in Japanese Pat. App. No. JP2011-014254, dated May 21, 2012, in 8 pages.
Response to Office Action in Japanese Pat. App. No. JP2011-014254, dated Nov. 21, 2013, in 8 pages.
Office Action in Japanese Pat. App. No. JP2012-168758, dated Nov. 14, 2013, in 5 pages.
Translation of Office Action in Japanese Pat. App. No. JP2006-549544, dated Aug. 9, 2010.
Translation of Response to Office Action in Japanese Pat. App. No. JP2006-549554, dated Jan. 26, 2011.
Translation of Examiner's Office Letter in Japanese Pat. App. No. JP2006-549554, dated Jan. 30, 2012, in 10 pages.
Translation of Applicant Reply in Japanese Pat. App. No. JP2006-549554, dated Jul. 30, 2012, in 10 pages.
Fujita et al., Photonic Crystal Fibers(1)-Optical Properties, Mitsubishi Electric Cable Report, No. 99, pp. 1-9, Jul. 2002.
O. Tohyama et al., "Photonic Crystal Fibers and Their Applications", Institute of Electronics, Information, and Communication Engineers, Technical Report of 18 ICE, OPE2002-11, vol. 102, No. 521, pp. 27-32, Dec. 11, 2002.
S. Yamadori et al., "Numerical Aperture of Multimode Photonic Crystal Fiber", Proceedings of Elect. Society Conference of IEICE, Sep. 10-13, 2002, paper C-3-51.
English translation of Notice of Reason for Refusal in Japanese Pat. App. No. JP2013-179477, dispatch date May 13, 2014, in 4 pages.
Chiang K.S. et al., "Ultra-large-core single-mode fiber optical communications: The segmented cladding fiber", Optical Fiber Communications Postdeadline Papers, Trends in Optics and Photonics Series, Optical Soc. America, vol. 70, Mar. 17, 2002, pp. 620-621.
Rastogi V et al., "Propagation Characteristics of a Segmented Cladding Fiber," Optics Letters, vol. 26, No. 8, Apr. 15, 2001, pp. 491-493.
Rastogi V et al., "Large Mode Area Single-Mode Fiber: A Modified Segmented Cladding Fiber," Proceedings International Conference on Optical Communications and Networks, World Scientific, Jan. 1, 2002, pp. 115-117.
EP Extended Search Report for EP App. No. EP08798892, dated Jun. 3, 2014, in 10 pages.
English translation of response to Notice of Reason for Refusal in Japanese Pat App. No. JP2013-179477, dated Aug. 28, 2014, in 15 pages.
English translation of Notification of First Office Action in Chinese Pat App. No. 201310097062.4, dated Jan. 16, 2015, in 6 pages.
Notice of Reason for Refusal in Japanese Pat App. No. JP2013-241076, dated Aug. 26, 2014, in 8 pages.
English translation of Amendments and Arguments in response to Notice of Reason for Refusal in Japanese Pat. App. No. JP2013-241076, dated Jan. 23, 2015, in 10 pages.
Argyros et al., Photonic bandgap with an index step of one percent, Optics Express, vol. 13, No. 1, pp. 309-314, Jan. 10, 2005.
Birks et al., Approximate band structure calculation for photonic bandgap fibres, Optics Express, Vo. 14, No. 20, pp. 9483-9490, Oct. 2, 2006.
Folkenberg et al., Broadband single-polarization photonic crystal fiber, Optics Letters, vol. 30, No. 12, pp. 1446-1448, Jun. 15, 2005.
Folkenberg et al., Polarization maintaining large mode area photonic crystal fiber, Optics Express, vol. 12, No. 5, pp. 956-960, Mar. 8, 2004.
Limpert et al., High-power air-clad large-mode-area photonic crystal fiber laser, Optics Express, vol. 11, No. 7, pp. 818-823, Apr. 7, 2003.
Luan et al., All-solid photonic bandgap fiber,Optics Letters, vol. 29 No. 20, pp. 2369-2371, Oct. 15, 2004.
Schreiber et al., Stress-induced birefringence in large-mode-area micro-structured optical fibers, Optics Express, vol. 13, No. 10, pp. 3637-2646, May 16, 2005.

(56) References Cited

OTHER PUBLICATIONS

Schreiber et al., Stress-induced single-polarization single-transverse mode photonic crystal fiber with low nonlinearity, Optics Express, vol. 13, No. 19, pp. 7621-7630, Sep. 19, 2005.
Summons to an Oral Hearing in the German Patent & Trademark Office for App. No. DE 10 2006 023 976.8, dated Jan. 18, 2016, in 4 pages.
Arguments and Amendments submitted Jan. 23, 2015 in Japanese Pat. App. No. 2013-241076.

* cited by examiner

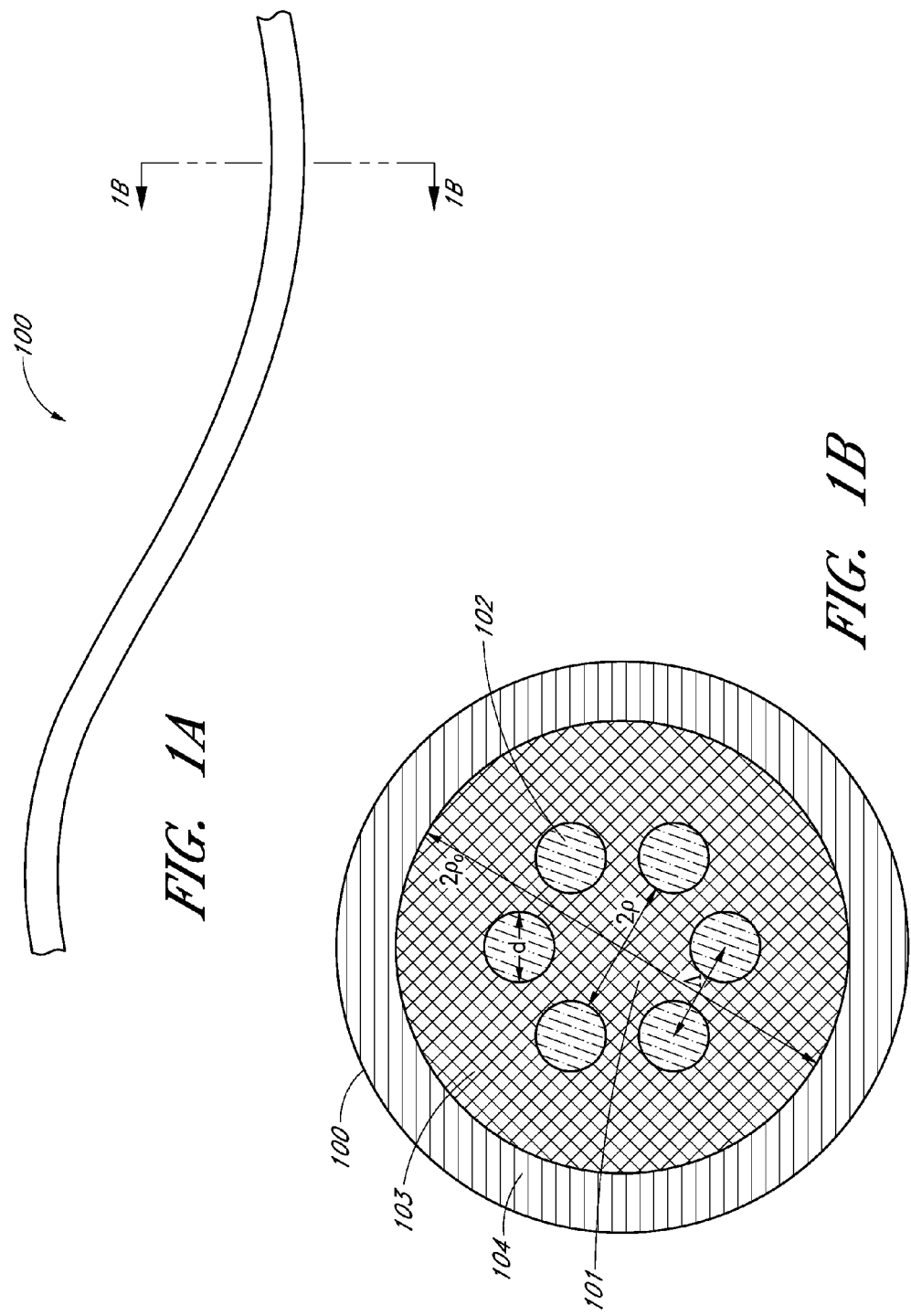

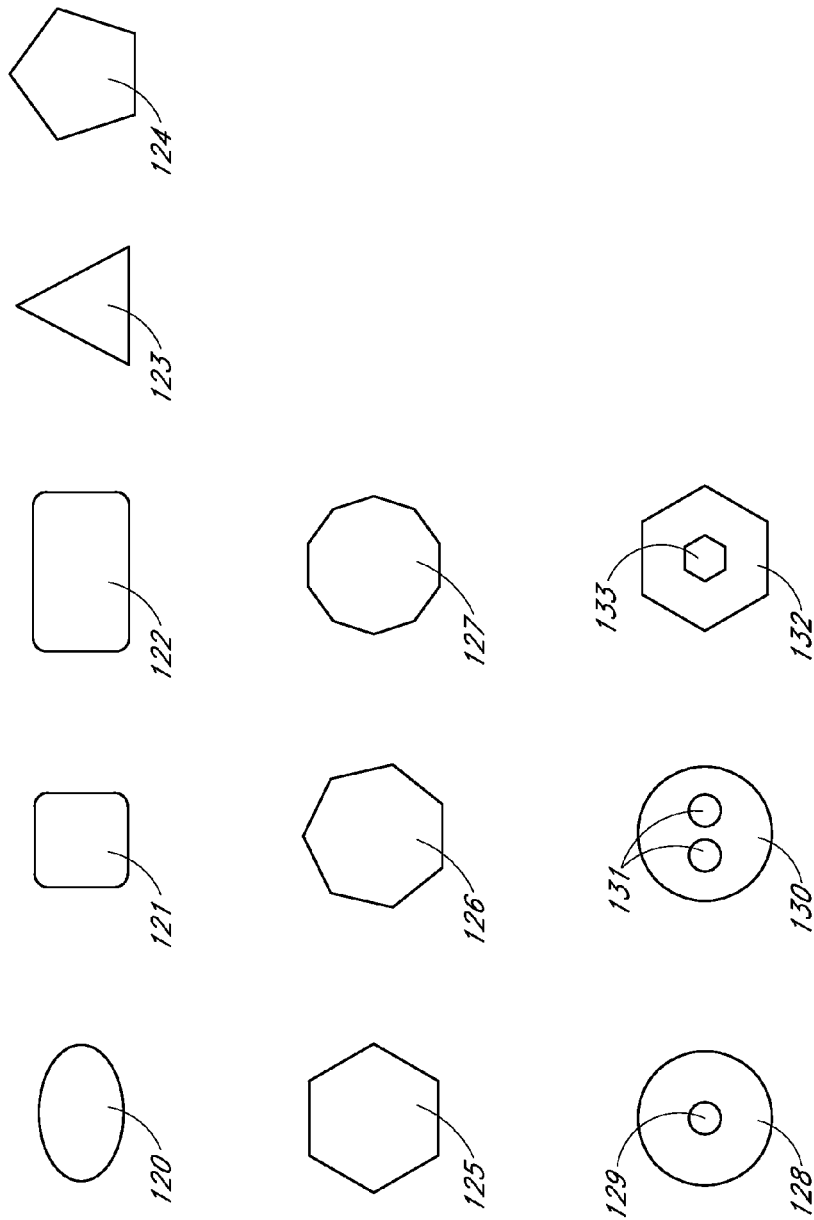

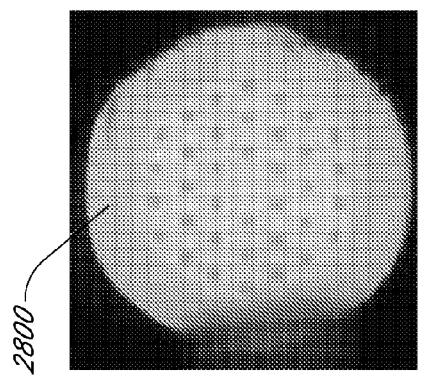
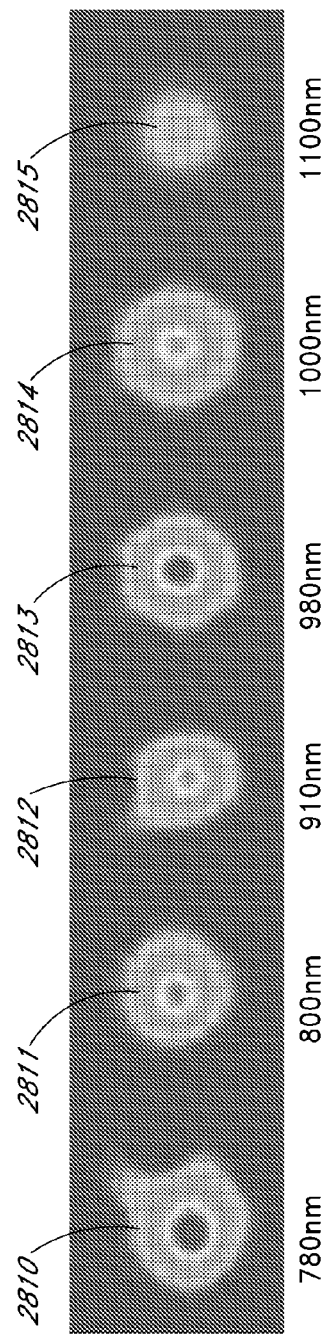
FIG. 28A
FIG. 28C

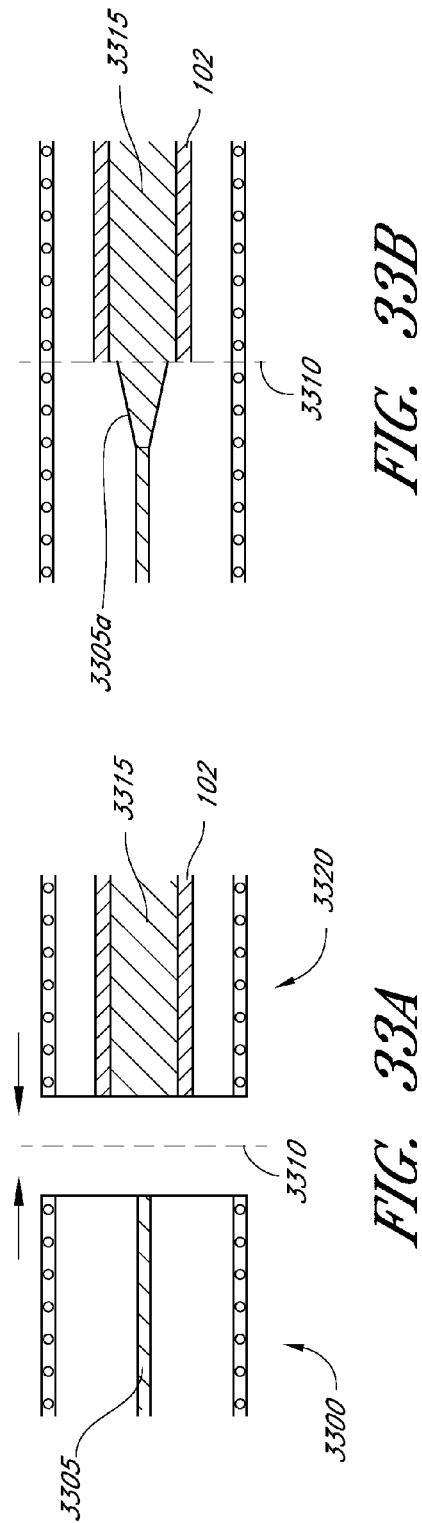

GLASS LARGE-CORE OPTICAL FIBERS

CROSS-REFERENCE TO RELATED APPLICATIONS

This application claims the benefit under 35 U.S.C.§120 as a continuation of U.S. patent application Ser. No. 13/440, 215, filed Apr. 5, 2012, entitled "GLASS LARGE-CORE OPTICAL FIBERS," now U.S. Pat. No. 8,995,051, which is a continuation of U.S. patent application Ser. No. 12/641, 262, filed Dec. 17, 2009, entitled "GLASS LARGE-CORE OPTICAL FIBERS," now U.S. Pat. No. 8,159,742, which claims the benefit under 35 U.S.C. §120 and 35 U.S.C.§365 (c) as a continuation of International Application No. PCT/US2008/074668 designating the United States, with an international filing date of Aug. 28, 2008, entitled "GLASS LARGE-CORE OPTICAL FIBERS," which claims the benefit under 35 U.S.C.§119(e) of U.S. Provisional Patent Application No. 60/975,478, filed Sep. 26, 2007, entitled "GLASS LARGE-CORE OPTICAL FIBERS," and U.S. Provisional Patent Application No. 61/086,433, filed Aug. 5, 2008, entitled "GLASS LARGE-CORE OPTICAL FIBERS." All of the above applications and patents are hereby expressly incorporated by reference herein in their entireties and made a part of this specification.

BACKGROUND

Field

Various embodiments relate to optical fibers such as, for example, optical fibers with large core dimensions and optical fibers that support single mode propagation, as well as devices and systems that use such fibers such as, for example, lasers, amplifiers, and laser based material processing systems.

Description of the Related Art

Single mode optical fibers provide a flexible delivery media for high quality optical beams. Conventional single mode fibers typically have a core diameter below 9 µm. However, the small core diameter of the conventional single mode fiber is not well suited for delivery of high power optical beams. High optical intensity beams propagating in these fibers can cause strong nonlinear effects such as self-phase modulation, Raman scattering, Brillouin scattering, etc. Self-phase modulation can lead to pulse distortion. Raman and Brillouin scattering can lead to significant power loss during transmission.

Recently, fiber lasers based on rare-earth ions and Raman effects have found advantages in many applications over their solid state counterparts and their power level has been improving. One limit to further scaling of output power from a single mode fiber laser or amplifier is nonlinearity. However, the upper limit may be extended with designs using a much larger core diameter.

There is a need for single mode optical fibers. It may also be desirable for the fibers to operate over a very large wavelength range. Ease of use and manufacturing are also considerations which may lead to increased use.

SUMMARY

Various embodiments include single mode fiber and large core fiber. In some embodiments, the fiber may operate over a large wavelength range.

Various embodiments are also described that comprise a fiber including cladding features comprising material (e.g., fluorine-doped silica glass) that may produce a very low relative refractive index difference with respect to the cladding material in which the cladding features are disposed. This relative refractive index difference may be characterized by $(n_1-n_2)/n_1$, where $n_1$ is the index of refraction of the cladding material in which the cladding features are included, and $n_2$ is the index of refraction of the cladding features.

In various embodiments, the configuration of the cladding features, for example, the size and spacing of the cladding features can be selected to provide for confinement of the fundamental mode yet leakage for the second mode and higher modes so at to provide mode filtering and single mode propagation.

Bend loss performance has generally been known to deteriorate with low relative index difference. This trend was confirmed with experiments and simulations. However, surprisingly, it has been also discovered that significant improvements in mode filtering can be achieved with a low relative index difference, while bend loss performance remains adequate. In particular, small relative refractive index difference can provide for better mode filtering and ease of use and manufacturing, while providing for a higher but adequate bend loss.

In various embodiments, therefore, a fiber is configured with a core at least partially surrounded by cladding features. The cladding comprises a first cladding material having an index of refraction $n_1$, and cladding features that are formed from a second cladding material having an index of refraction $n_2$, wherein $n_2 < n_1$ and the relative refractive index difference $(n_1-n_2)/n_1$ is small.

In certain embodiments, a very small relative refractive index difference $(n_1-n_2)/n_1$ provides for improved mode filtering and sufficiently low bend loss.

In certain embodiments, the relative refractive index difference may be less than about $4.5 \times 10^{-3}$. In certain embodiments, the relative refractive index difference may be less than about $1.0 \times 10^{-3}$. In certain embodiments, the relative refractive index difference may be less than about $8 \times 10^{-4}$.

In some embodiments, the configuration may provide higher order mode loss of at least about 1 dB/m. In some embodiments, the configuration may provide higher order mode loss of at least about 5 dB/m. In some embodiments, the configuration may provide higher order mode loss of at least about 10 dB/m.

In some embodiments, a fiber diameter may be configured to provide low loss of the fundamental mode while increasing higher order mode loss. For example, in various embodiments loss for the fundamental mode may be about 0.1 dB/m or less and the loss for higher order modes may be about 1 dB/m or more in some embodiments. In other embodiments loss for the fundamental mode may be about 1 dB/m or less and the loss for higher order modes may be about 10 dB/m or more in some embodiments.

In certain embodiments, the fiber has a bend radius of 10 cm or larger.

In certain embodiments, the fiber may be "all-glass". The core, cladding material in which the cladding features are disposed, as well as the cladding features may comprise glass at least over a portion of the fiber length.

In various embodiments, a fiber design may comprise a leakage channel fiber (LCF) wherein leakage of higher order modes is promoted, photonic crystal fiber, endless single mode photonic crystal fiber (having a wavelength range greater than 500 nm or greater than 1000 nm, e.g. having a wavelength range at least from 458 nm to 1550 nm), and/or large core design.

In at least one embodiment an optical fiber comprises a core surrounded by a number of glass features wherein the location, shape and dimension of the glass features provide single mode operation and a loss of at least about 1 dB/m for the $2^{nd}$ mode of the fiber.

In at least one embodiment a fiber comprises a core surrounded by many $2^{nd}$ glass features arranged in a regular or irregular array in a $1^{St}$ cladding material wherein the location, shape and dimension of features provide for single mode operation, and wherein the relative refractive index difference is less than about $4.5 \times 10^{-3}$. In some embodiments, the relative refractive index difference is less than about $1.0 \times 10^{-3}$.

In at least one embodiment a fiber comprises a core surrounded by a plurality of $2^{nd}$ glass features arranged in a regular or irregular array in a $1^{st}$ cladding material wherein the location, shape and dimension of features provide for single mode operation over a broad range of wavelengths (e.g., at least about 500 nanometers), and where the relative refractive index difference is less than about $4.5 \times 10^{-3}$. In some embodiments, the wavelength range may be from 500 to 1000 nm, e.g., 800 nm. In some embodiments, the relative refractive index difference is less than about $1.0 \times 10^{-3}$.

In at least one embodiment a fiber is configured to produce a large differential mode loss between higher order modes and fundamental mode. For example, the loss for the first order mode may be about 0.1 dB/m or less, and the loss for higher order modes may be about 1 dB/m or more in some embodiments.

At least one embodiment comprises an optical fiber for propagating at least one lower order mode (e.g., the fundamental mode) having a wavelength, while limiting propagation of higher order modes having the wavelength by providing said higher order modes with a higher loss than the at least one lower order mode at the wavelength. The optical fiber may comprise: a first cladding region comprising material with index $n_1$; a second cladding region comprising one or more cladding features comprising material with index $n_2$; and a core region at least partially surrounded by the said second cladding region. The cladding features are configured to substantially confine propagation of said lower order mode(s) to the core region. The cladding features comprise a material to produce a low relative index of refraction $\Delta_c = (n_1 - n_2)/n_1$, and the loss of at least one higher order mode is at least about 1 dB/m. In some embodiments, the loss of at least one higher order mode is at least about 5 dB/m.

In various embodiments, the optical fiber has a hexagonal shaped cross-section orthogonal to the length of the fiber. The hexagonal shaped cross-section may have rounded corners. In certain embodiments, the fiber may be a double clad fiber wherein the outer hexagonal shaped perimeter of the fiber forms a reflective boundary of a region for guiding the pump. Such a double clad fiber with cross-section having a shape of a hexagon with rounded corners may be beneficial for pump mode mixing. With perfect circular boundary, there are skew rays which will not pass the doped core in the center. Certain embodiments having hexagonal boundary will not allow such modes to exist or reduce the existence of such modes and may at least increase the amount of light that passes through the core.

In various embodiments, the cladding features are doped and have a lower refractive index than the background cladding material in which the cladding features are disposed.

At least one embodiment comprises a fiber having first cladding material and a first index of refraction, $n_1$. Cladding features are disposed in the first cladding material. The cladding features of the second cladding have a second index of refraction, $n_2$. At least one cladding feature is non-rotationally symmetric. A pre-selected outer diameter and relative spacing among the features may provide a higher order mode loss at least about 5 dB greater than a fundamental mode loss. A mode profile measurable at a fiber output may be approximately diffraction limited over a substantial portion of at least the central portion of the mode profile, for example between the half power or $1/e^2$ intensity points.

The core may be rare earth doped so as to provide an optical gain medium. Various embodiments of the invention may be utilized in laser amplifiers, lasers, short or ultrashort pulse generators, Q-switched lasers and other systems.

In various embodiments, a fiber comprises a first cladding region that comprises a first cladding material having a first index of refraction, n1. The fiber also comprises a second cladding region comprising one or more cladding features comprising a second cladding material having a second index of refraction, n2. The fiber also comprises a core region at least partially surrounded by the second cladding region. The first and second cladding regions may be configured such that the core region propagates at least one lower order mode. In at least one embodiment a dimension of the first cladding region and one or a combination of dimension, arrangement, and number of cladding features provides a higher order mode loss greater than a fundamental mode loss.

Various embodiments may include a fiber amplifier system or a fiber laser producing high peak power, nearly diffraction limited pulses. By way of example, an output pulse energy may be in the range of about 10 μJ to 10 mJ, or about 100 μJ to 1 mJ. Output pulse widths may be less than 1 ns and produced at repetition rates exceeding 1 KHz. The output pulses may be free of a distortion associated with a non-linear effect. For example, in some embodiments, a fiber optic amplifier system comprises an optical pulse source providing optical pulses having a nearly diffraction limited input spatial profile, an optical pump source, and any of the optical fibers disclosed herein. In some such embodiments, at least a portion of a core region of the fiber is rare-earth doped. The fiber may further comprise a pump cladding configured to receive pump energy from the optical pump source, and a pump guide to transmit a portion of the received pump energy to the core region. The fiber may be configured to receive the pulses and amplify the pulses so as to produce output pulses having nearly diffraction limited output spatial profiles and at least one output pulse having energy in a range from about 10 μJ to about 10 mJ.

Various embodiments of the fibers disclosed herein may include a large core, all-glass photonic crystal fiber (PCF) having two or more layers of cladding features.

In some embodiments an LCF or PCF may be configured in such a way that a fundamental mode is guided within a portion of a core having a non-uniform refractive index, for example a parabolic index variation. The mode diameter may be a fraction of the LCF core diameter, for example about 50%.

In various embodiments an all-glass LCF may be configured in such a way that a fundamental mode is guided within a portion of the core having a substantially uniform refractive index.

In at least one embodiment an LCF or PCF may be made by a method comprising: tailoring a refractive index profile of the LCF or PCF in such a way that a fundamental mode is guided within at least a portion of the core. A stress-optical effect may be exploited to tailor the index profile. In some methods of making an optical fiber, the method includes determining a variation in at least one of modal confinement loss and modal index with a variation in a dimension of a first cladding region of the fiber, and selecting a dimension of the first cladding region to provide a ratio of the loss of at least one higher order mode to the loss of at least one lower order mode that is greater than about 10.

In at least one embodiment an all glass fiber may include a first cladding material having a first thermal expansion coefficient. Cladding features are formed from a second cladding material having a second thermal expansion coefficient. The cladding features may be disposed in the first cladding material. A localized increase in an index of refraction may be present in a region adjacent to a cladding feature. A core region, which is bounded by the first inner layer of cladding features, may have a non-uniform index profile such that a relative refractive index difference within a core portion is less than about $1.0 \times 10^{-3}$. The index difference may be sufficient to guide a fundamental mode within at least a portion of the core, for example with an index guiding mechanism.

Various embodiments may include a large core, all-glass, leakage channel fiber (LCF). In at least one embodiment an all-glass LCF may include a core having a diameter in the range of about 30 μm to about 200 μm. In at least one embodiment an all-glass LCF may provide a higher order mode loss that is about 1 dB/m greater than a fundamental mode loss. In other embodiments, the all-glass LCF may provide a higher order mode loss that is about 5 dB/m greater than a fundamental mode loss.

Various embodiments may comprise a large core, all-glass, polarization maintaining LCF or PCF.

An embodiment of a polarization maintaining fiber comprises a first cladding region comprising a first cladding material having a first index of refraction, n1, a second cladding region comprising one or more cladding features comprising a second cladding material having a second index of refraction, n2, that is less than n1, and a relative refractive index difference characterized by (n1−n2)/n1 that is less than about $4.5 \times 10^{-3}$. The second cladding region further comprises stress elements having an index of refraction different from the second index of refraction. The fiber also comprises a core region at least partially surrounded by the second cladding region. The first and second cladding regions are configured such that the core region propagates a fundamental mode and maintains a beam polarization, such that a dimension of the first cladding region and one or a combination of dimension, arrangement, and number of the cladding features and stress elements provides a higher order mode loss greater than a fundamental mode loss while maintaining the beam polarization.

In various embodiments a ratio of higher order mode loss to fundamental mode loss may be substantially maximized by pre-selecting a dimension of a first cladding region. In at least one embodiment a variation of modal confinement loss versus a first cladding may increase or substantially maximize the ratio. In at least one embodiment the dimension may be a diameter of the first cladding region.

Various embodiments may include a laser-based material processing system utilizing a fiber laser, fiber amplifier, and/or transmission fiber. The laser, amplifier, or transmission fiber may include an all-glass, large core LCF or PCF. Material processing may be carried out with spot sizes in the range of about 1 μm to about 250 μm.

Some embodiments may utilize "all-fiber" designs, or at least configurations that reduce the number of bulk optical components. Integrated configurations may be utilized in fiber lasers, fiber amplifiers, or fiber-based transmission systems. For example, bulk optic component(s) may not be required for coupling energy into a large-mode amplifier. A single-mode or few-mode input fiber may be coupled to a large-mode fiber to deliver pulses from an optical source. The large-mode fiber and the input fiber may be joined in such a way that power coupled from a core of the input fiber to the large-mode fiber is substantially greater than obtainable with butt-coupling. For example, the core of the input fiber may be expanded during joining, e.g., by applying one or more electrical arcs to heat the fiber ends. Further, a mode at an output of the input fiber may be substantially matched to a mode of the large-mode fiber.

In some embodiments power coupling may be sufficiently high to limit coupling loss to less than about 3 dB. In some embodiments power coupling may be sufficiently high to limit coupling loss to less than about 1.5 dB.

Embodiments of the present invention may be used in systems for laser based modification of metal, semiconductor, and dielectric materials utilizing infrared, visible, and/or UV wavelengths. Embodiments of the fibers, lasers, and/or amplifiers described herein may be used in laser radar systems, material processing systems, telecommunications systems, and many other systems.

BRIEF DESCRIPTION OF THE DRAWINGS

FIG. 1-*c* is a cross sectional view schematically illustrating a double clad, polarization maintaining (PM) fiber, having a Ytterbium doped large core and a multi-material cladding corresponding to an embodiment of the present invention.

FIG. 1-*d* illustrates other cladding feature shapes that may be employed. A variety of different cladding feature cross-sections are shown although the cladding feature design is not limited to these.

FIG. 13-b illustrates measured mode profiles (modal "near field" distributions) obtained along two orthogonal directions using the fabricated fiber of FIG. 13-a.

FIG. 13-c is a plot illustrating measured bend loss versus bend radius obtained at several bend radii of the fabricated fiber of FIG. 13-a, and a curve fit based on the measurements

FIG. 26 also illustrates a cross section of a fiber and an output mode.

FIGS. 28A-28C illustrate some characteristics of a fabricated all-glass LCF having three layers. FIG. 28A illustrates a cross section of the fiber, FIG. 28B illustrates a measured two-dimensional refractive index profile, and FIG. 28C illustrates several mode profiles measured at several various wavelengths in the range of 780 nm to 1100 nm.

FIG. 33A is a cross-section that schematically illustrates an embodiment of a large core LCF having a doped core, and a single-mode fiber, prior to splicing.

FIG. 33B is a cross-section that schematically illustrates the LCF and single-mode fiber of FIG. 33A after splicing, and schematically illustrates an expanded mode field of the single-mode fiber.

FIG. 33C schematically illustrates a mode profile of the LCF output relative to the cladding features, illustrating propagation of the fundamental core mode and LCF guidance.

DETAILED DESCRIPTION OF PREFERRED EMBODIMENTS

Figure 1C:
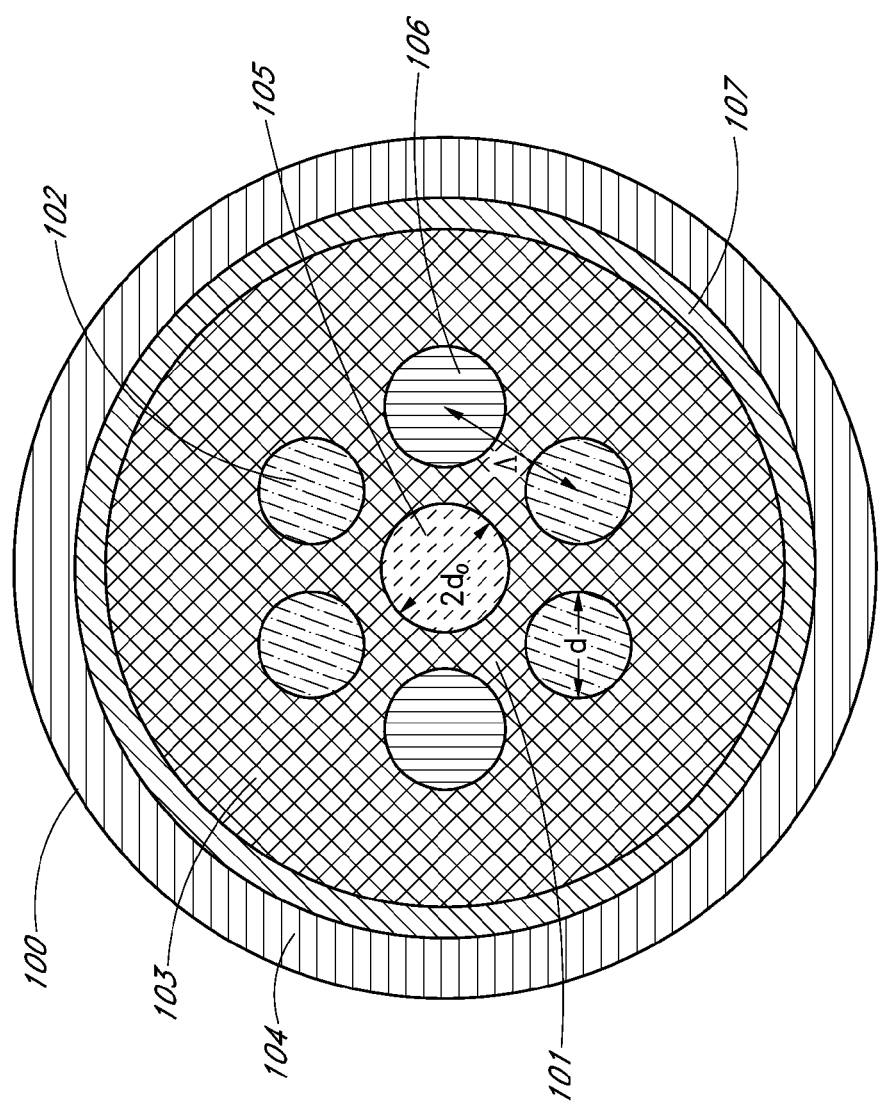
FIGS. 1-*a* and 1-*b* are respective side and cross-sectional views schematically illustrating a leakage channel optical fiber and parameters pitch Λ, hole diameter d, core radius ρ, and fiber diameter 2ρ₀. The example fiber also comprises a coating, and a cladding area beyond the holes. Leakage channel fibers may comprise large air holes for guiding an optical mode. In at least one embodiment of the present invention a leakage channel fiber comprises commercially available fluorine-doped silica as a second cladding material (rather than air holes) in an all "all-glass" design, wherein a small relative refractive index $\Delta_c$ is produced between the second cladding material and another cladding material. (The use of glass cladding features may result in larger cladding features in comparison to the case wherein the core diameter is the same but the cladding features comprise air holes.)

As described above, various embodiments of the invention include single mode fiber and large core fiber.

In general, conventional single mode fibers typically have a core diameter below 9 µm. Conventional fibers will support more modes if the core diameter is further increased.

Photonic crystal fibers, however, can provide for single mode operation at slightly larger core diameters by effectively reducing equivalent numerical aperture of the fiber at the expense of its ability to bend. The photonic crystal fibers include a large array of air holes typically in a hexagonal arrangement in the cladding. Photonic crystal fibers can also operate as single mode optical fiber over an entire wavelength spectrum (e.g., from 458 nm to 1550 nm) if the hole size is small enough. Such fiber may be referred to as endless single mode fiber. See, for example, Birks et al, Optics Letters, Vol. 22. No. 3, Jul. 1, 1997, pp 961-963.

In a leakage channel fiber (LCF), an optical mode is guided by few large cladding features such as air holes. The air holes may have a spacing that permits leakage of optical energy from the higher order modes. The fundamental mode may be supported with the higher order modes being leaked out.

Aspects and designs of leakage mode fibers, "holey fibers", photonic crystal fibers, photonic bandgap fibers, etc., are disclosed in the following disclosures assigned to the assignee of the present invention: (i) U.S. patent application Ser. No. 10/844,943, filed May 13, 2004 and entitled "Large Core Holey Fibers", published Jul. 21, 2005 as U.S. patent publication US2005/0157998, (ii) U.S. patent application Ser. No. 11/134,856, filed May 30, 2005 and entitled "Single Mode Propagation in Fibers and Rods with Large Leakage Channels", published Nov. 23, 2006 as U.S. patent publication US2006/0263024, and (iii) U.S. patent application Ser. No. 11/323,177, filed Dec. 30, 2005 and entitled "Photonic Bandgap Fibers", published Aug. 31, 2006 as U.S. Patent publication US2006/0193583, now U.S. Pat. No. 7,209,619. The disclosures of U.S. patent application Ser. Nos. 10/844,943; 11/134,856;and 11/323,177 (and their corresponding publications) are incorporated by reference herein in their entirety.

Designs of both photonic crystal fibers and leakage channel fibers may use air holes in a glass matrix and benefit from the high refractive index contrast between air and glass. This refractive index difference is characterized as relative refractive index difference $\Delta_c=(n_1-n_2)/n_1$, where $n_1$ is the refractive index of the background cladding materials ($1^{st}$ cladding material), and $n_2$ is the refractive index of the material in the holes ($2^{nd}$ cladding material). A large refractive index difference between the hole and the rest of the fiber (other cladding materials) provides for high mode confinement and good bend loss performance (low bend loss) for single mode operation. Relatively large relative refractive index contrast $\Delta_c$ also provides sufficient mode filtering.

However, to seal off the air holes from long term environmental exposure, a small section at two ends of the fiber are heated to collapse the air holes. The prepared end faces often distort the output mode pattern due to uneven collapse along the fiber. Also, the size of air holes is controlled by a combination of pressurization of holes, drawing temperature, perform feed speed and fiber drawing speed during fiber drawing. The process can limit repeatability, especially in the case of large core photonic crystal fiber where dimension of small air holes with high surface tension is very sensitive to drawing conditions.

Embodiments of the present invention generally provide for improvements in leakage channel fibers, photonic crystal fibers, endless single mode photonic crystal fibers, and other designs. Such improvements may include manufacturing advantages.

In various embodiments, described herein the cladding comprises cladding features comprising at least a second material disposed in a first cladding material. (In some embodiments, more than one material is used for the cladding features. For example, in certain embodiments, 4 fluorine doped silica features and 2 boron-doped silica stress rods are used). The first material has an index of refraction $n_1$ and the second material has an index of refraction $n_2$. Certain properties of the fiber are known to be affected by the relative refractive index of the first and second materials.

For example, bend loss performance has generally been known to deteriorate with low relative index difference. This trend was confirmed with experiments and simulations. However, surprisingly, it has been also discovered that significant improvements in mode filtering can be achieved with a low relative index difference, while bend loss performance remains adequate.

Such low index contrast fibers may comprise glass cladding features disposed in a glass material. Glass cladding features advantageously avoid or at least reduce the difficulties associated with manufacturing air holes in the cladding. Additionally, a hexagonal-shaped cross-section with rounded corners is easily formed into a fiber comprising glass cladding features disposed in glass cladding material. Such fiber with hexagonal-shaped cross section offers advantages in mode mixing pump light propagating in a double clad fiber that is configured to guide the pump light at least in part with the hexagonal sidewalls.

Simulated results and measurements obtained from fabricated fibers having reduced index contrast indicate that single mode operation is achievable with sufficient mode filtering and sufficient bend loss performance for many applications. Various embodiments of the fiber are generally configured to provide loss of higher order modes so that the energy emitted at the fiber output corresponds to a low order mode. For example the fiber may produce an output having a mode profile that is a good approximation to the fundamental mode.

As used herein, single mode and multimode fiber are defined consistently with the definitions used for traditional non-holey fiber. For traditional fibers, single mode and multimode fiber are generally defined in terms of V number, which is equal to $\pi$ (numerical aperture) (core diameter)/wavelength for step index fibers. For non-step index fibers, numerical aperture and core diameter can be calculated with the equivalent values for step index fibers [see, e.g., Martinez, F., Husey, C. D., "(E)ESI determination from mode-field diameter and refractive index profile measurements on single-mode fibres" IEEE Proceedings V 135, pp. 202-210, (1988)]. For fibers satisfying the relationship V<2.4, the power of the fundamental mode is significantly larger than the optical power of the next higher mode. Alternatively, for fibers wherein V>2.4, at least the next mode above the fundamental mode can have significant power in comparison to the fundamental mode. Single mode and multimode traditional fibers are accordingly specifically defined by the relationships V<2.4 and V>2.4, respectively. V=2.4 is the cut-off for the propagation of any mode but the lowest order mode.

In holey fibers, the numerical aperture can be found by the difference in refractive index of core and cladding. However, a core diameter that is the equivalent value for step index fibers is difficult to calculate. Various references [see, e.g., (1) Knight et al, "Properties of photonic crystal fiber and the effective index model" J. Opt. Soc. Am. A Vo. 15, pp. 748-752, (1998), and (2) Mortensen et al "Modal cutoff and the V parameter in photonic crystal fibers" Opt. Lett. V. 28, pp. 1879-1881, (2003)] report that if the core diameter is made equal to the pitch or the distance between holes, $\Lambda$, then the V for cut off for the propagation of any mode other than the single mode is 2.5 (see, e.g., Knight et al) and $\pi$ (see, e.g., Mortensen et al). For the various embodiments described herein, whether the V cut-off is 2.405, 2.5 or $\pi$ is not critical. Various embodiments of holey fiber described herein have a much larger core radius than possible with conventional optical fiber that supports propagation of a single optical mode. Therefore, we will utilize the recent research in this technical area where multimode fiber is defined as where V>$\pi$ and the core diameter is made equal to the pitch or average pitch to the fiber. Conversely, single mode fiber is defined herein as fiber where V<$\pi$.

A holey fiber may be designed to introduce loss for specific modes. The hole size, bridge, and the number of holes may, for example, be selected to induce loss in the propagation of higher order modes in a multimode fiber where V>$\pi$. With a decrease of the number of holes, light in the higher order modes may not be confined to the core and may escape from the fiber. Such loss introduced into multimode fiber with V>$\pi$ is analogous to traditional non-holey multimode fiber having a V number larger than $\pi$ that include mode filtering provided, for example, by bending the fiber to introduce loss in the propagation of higher order modes. (Mode filters are described in, e.g., U.S. Pat. No. 5,818,630 issued to Fermann et al on Oct. 6, 1998 and entitled "Single-mode Amplifier and Compressors Based on Multi-mode Fibers"). Sufficient bending can be applied to induce losses for each of the modes higher than the fundamental mode such that the fundamental mode is the sole mode that propagates through the bent multimode fiber. Similarly, multimode holey fiber having a V number larger than about $\pi$ may have a design that introduces loss to higher order modes so that propagation of these higher order modes is attenuated. The fiber need not be bent to provide mode filtering.

FIGS. 1-a and 1-b illustrate a leakage channel fiber. An example optical fiber 100 comprises a core 101 surrounded by cladding features 102, for example 6 holes. The features have a diameter of d and a center-to-center spacing, also referred to as pitch, $\Lambda$. The core has a diameter defined as nearest hole-to-hole spacing $2\rho$. The fiber diameter is $2\rho_0$. In this example, a first cladding region 103 is formed beyond the low index cladding features 102, and a coating 104 is added. The normalized hole diameter d/$\Lambda$ is chosen so that the leakage loss for the $2^{nd}$ mode is significantly higher than that of the fundamental mode. This provides for effective single mode operation at much larger core diameters than that is possible with conventional optical fiber by using this built-in mode filtering.

FIGS. 1b and 1c schematically illustrate circular holes as cladding features. Similarly, a fiber diameter $2\rho_0$ is shown for the exemplary circular fiber. As will become apparent from examples of fabricated fibers that follow, the cladding features may be non-circular and a shape of the fiber may comprise at least a non-circular portion. For example, some features or cladding shapes may approximate a hexagon, octagon, or may be rotationally asymmetric with linear and/or curved portions. In some embodiments a cladding shape may be irregular and without a clearly defined, standard shape.

One possible definition of a polygon diameter is the maximum distance between any pairs of vertices, and corresponds to the longest polygon diagonal. Further, with respect to a features dimension d, unless otherwise stated d/2 is generally regarded as the distance from the center of a feature to a side along a line linking the centers of two nearest neighbors. The center of a feature may be calculated as the "center of mass" or "centroid" for non-circular or asymmetric features.

By way of example, numerical values of the fiber diameter are generally referenced to the outer edge of the first cladding 103 as shown in FIG. 1-b, which may also be utilized as a pump guide in some embodiments. For a circular fiber example the diameter is $2\rho_0$. The diameter is the maximum dimension to outer edges of first cladding 103 along a line through the core 101 center.

In at least one embodiment, at least one of the cladding features 102 is fabricated from a second material glass having a lower refractive index than that of either the core 101 or other cladding materials(s) (e.g., first cladding material) 103. Some embodiments comprise "all-glass" designs wherein both the cladding features 102 and the material in which the cladding features are disposed comprise glass.

A very small relative refractive difference, for example $\Delta_c$ approximately $8.3 \times 10^{-4}$, is created between, for example, fluorine doped silica (the fluorine doped silica or other suitable material for the cladding features 102 being used rather than all air holes) and another cladding material in which the cladding features are disposed. Cladding materials 102 ($2^{nd}$ cladding) will generally have a slightly lower refractive index than that of the cladding materials 103 ($1^{st}$ cladding) of the optical fiber 101. Surprisingly, low loss single mode operations for both photonic crystal fibers and leakage channel fibers may occur with relative refractive index difference between the two cladding materials substantially lower than $7 \times 10^{-3}$. In some embodiments the relative refractive index difference $\Delta_c$ is as low as $2 \times 10^{-4}$ for large core fibers. The relative refractive index may be lower as well. In some embodiments $\Delta_c$ may be less than about $1 \times 10^{-3}$, or less than about $4.5 \times 10^{-3}$. In the fiber embodiments described herein, the relative refractive index is determined at a nominal wavelength of 1.05 µm. Numerical simulations were generally performed based on a design wavelength of 1.05 µm, however wavelength dependence was quantified and found to be weak.

Moreover, the all-glass photonic crystal fibers, endless single mode optical fibers and leakage channel fibers may provide for ease of use comparable to conventional optical fibers as well as ease of manufacturing. As described above, advantages of such "all glass" fiber include sufficiently low bending loss, improved repeatability of product produced and performance because of the lack of air holes, and the shape of the fiber cross-section which readily takes the form of a hexagon shaped, for example, with rounded corners.

Generally, a very small relative refractive index provides for sufficient mode filtering for single mode operation while also providing reasonable bend loss performance. Although larger $\Delta_c$ implies good mode filtering and bend performance, a sufficiently small relative index difference provides for single mode and control of bend loss. Also, as described above, a reduced or minimum useful refractive index difference between the first background cladding materials and that of the $2^{nd}$ cladding material in the holes improve manufacturability and performance significantly. Results obtained by fabricating several leakage channel fibers with fluorine-doped silica with a relative refractive index difference $\Delta_c = \sim 8.3 \times 10^{-4}$ to replace air holes used in the previous designs are discussed below. Embodiments having the fabricated leakage channel fibers were determined to provide sufficient bend loss performance for many applications.

As described above, bend loss performance was known to deteriorate with low relative index difference, and was confirmed with Applicant's experiments and simulations. However, Applicant discovered significant improvements in mode filtering with a low relative index difference, and also found that bend loss performance was adequate. This, e.g., "all glass", design, provides for improved mode filtering in comparison to equivalent leakage channel fibers where the cladding features comprises air holes.

In some embodiments with much smaller refractive difference between the two cladding materials, widely available high purity fused silica glass can be used as the $1^{st}$ cladding glass 103 while another high purity silica glass doped with fluorine or/and boron can be used as the $2^{nd}$ cladding glass 102. If fluorine and boron doping levels are low, the two cladding materials will have good mechanical, chemical, physical and thermal compatibility. Commercially available fluorine-doped silica may be used as a material for holes 102 and high purity silica glass for the $1^{st}$ cladding 103. Other materials and designs are also possible.

FIG. 1c is another example of an "all-glass" design: a double clad, polarization maintaining, ytterbium-doped large core fiber. (As discussed above, when such double clad arrangement is included in a fiber having a non-circular, e.g., hexagonal cross-section, pump mixing can be increased.) Ytterbium-doped area 105 inside core 101 has a diameter of $2d_0$ and a refractive index closely matched to the surrounding glass. Two stress elements 106 have substantially different thermal expansion coefficient from the surrounding glass and different refractive index from that of other low index features 102. The stress elements 106 may also have different dimension and size from other low index features 102. Stress elements 106 can be made from boron-doped silica glass. In this example, glass 107 is a low refractive index glass to provide pump cladding, and can be made from fluorine and/or boron doped silica glass.

Construction of the fiber of FIG. 1 may generally be carried out with standard methods of construction of leakage fiber designs. For example, a fluorine-doped silica rod is first inserted into silica tubes to be drawn into canes with desired diameters and ratio of fluorine-doped silica to silica glass. The canes along with silica canes are then stacked in a hexagonal stack in the desired configuration. The stack is then inserted into a silica tube to be drawn into fibers. Vacuum inside the silica tube is sometimes used in combination with low drawing temperatures to produce non-circular (e.g. hexagonal fibers) fibers. Ytterbium-doped silica rod or/and stress rods are sometimes used in the stack to make ytterbium-doped fiber or/and polarization maintaining fiber. Generally, low relative index, "all-glass" construction may simplify overall manufacturing of leakage fibers, for example, as described above.

FIG. 1-d illustrates other cladding feature shapes that may be employed. As shown, the cross-section of the cladding feature is not limited to circular shapes. FIG. 1-d illustrates some other possible shapes 120-127, which can also be used. Accordingly, the configurations of the cladding feature, for example, the shape, dimension, material, refractive indexes, etc. of the cladding feature can vary. The variations are not limited to the perimeter of the cladding feature but can include further internal features and design as well. Cross-sections 128, 130 and 132 in FIG. 1-d, for example, show one or more inclusions with different refractive index 129, 131 and 133 than the material in which these inclusions are imbedded. These internal features can vary as well, for example, in shape, size, arrangement, material, refractive index, etc. Still other designs are possible.

FIGS. 2-18 illustrate various simulated results, characterizing several fabricated fibers based on measurements and other information. For example, fibers having different geometries, core sizes, diameters, and coatings are discussed. The calculated results corresponding to plots of FIGS. 2-6 were obtained with an assumption that cladding region 103 is infinite (e.g. infinite diameter), and is without coating 104. Some calculated results demonstrate the effect of finite diameter and coating index variations. Also, simulations were generally performed based on a design wavelength of 1.05 µm, although wavelength dependence was quantified and found to be weak. Fused silica glass is assumed to have an index n=1.444, a typical value near the design wavelength which may vary somewhat in practice as a result of normal manufacturing tolerances. Examples illustrating fabricated fibers and measured mode profiles are also included.

Figure 2:
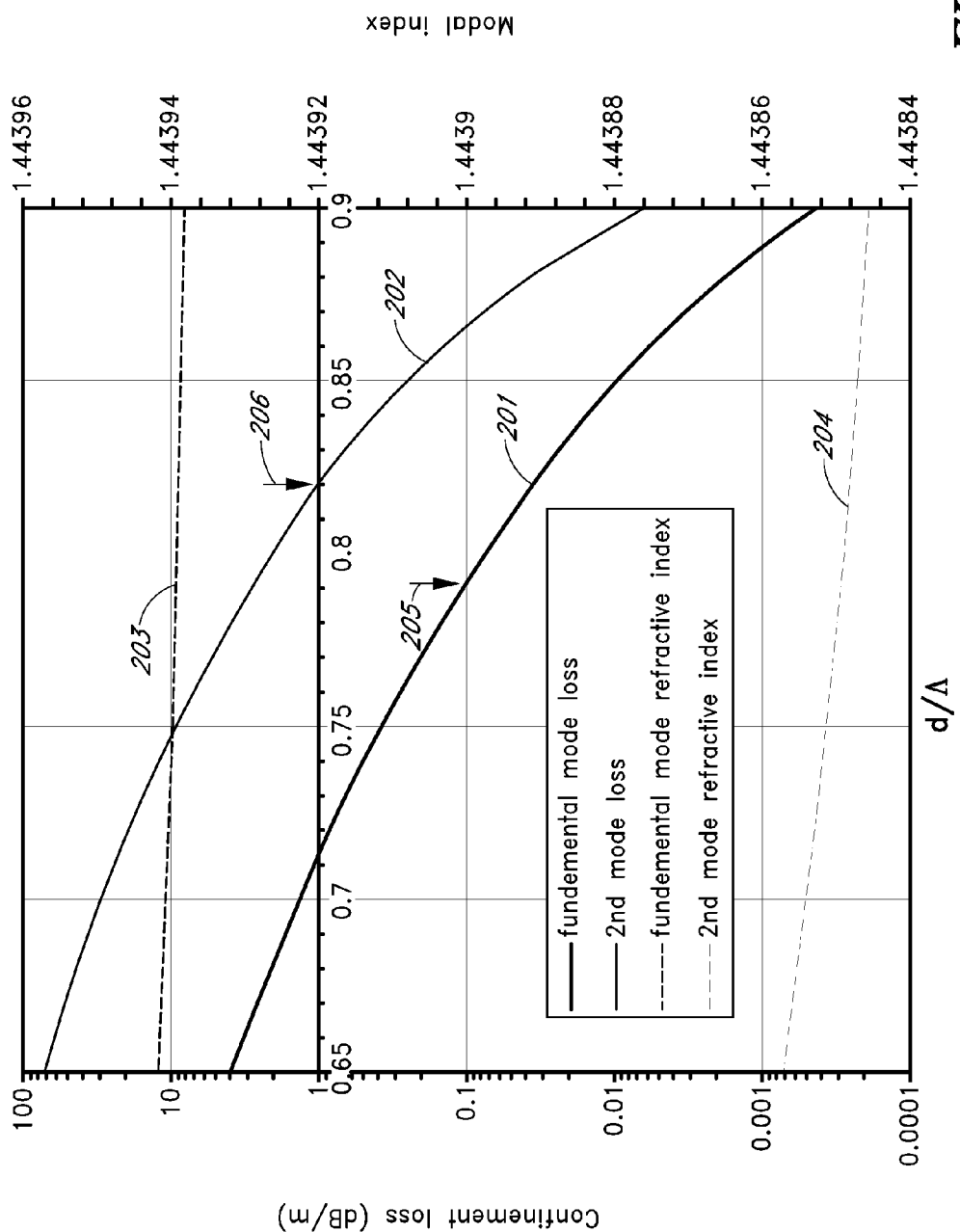
FIG. 2 is a plot illustrating estimated confinement loss and modal index versus d/Λ of an example leakage channel optical fiber similar to FIG. 1-*b*, wherein the cladding material in which the cladding features are disposed was assumed infinite in diameter and uncoated. A relative refractive index difference $\Delta_c$ (e.g.: fractional index change) is given by: $\Delta_c = (n_1 - n_2)/n_1$, wherein $n_1$ is the refractive index of the background cladding material (silica) and $n_2$ is the refractive index of the material in the holes. In this example refractive index of silica glass is assumed to be 1.444 at an example design wavelength of 1.05 μm, and $\Delta_c = 8.3 \times 10^{-4}$ relative to fused silica glass. The plot illustrates confinement loss and modal index of both the fundamental and $2^{nd}$ modes in a leakage channel fiber having a 50 µm core diameter, and at the wavelength of 1.05 µm.

FIG. 2 illustrates confinement loss and mode index for the fundamental and $2^{nd}$ order modes in a leakage channel fiber with 50 μm core diameter at the wavelength of 1.05 μm. Refractive index of silica glass is assumed to be 1.444. Commercially available fluorine-doped silica with a relative refractive index difference $\Delta_c=8.3\times10^{-4}$ lower than silica is used for the 6 cladding features. Curves 201, 202, 203 and 204 are confinement loss of the fundamental mode, confinement loss of the $2^{nd}$ mode, mode refractive index of the fundamental mode and mode refractive index of the $2^{nd}$ mode, respectively. The confinement losses 201 and 202 are plotted for various normalized hole diameters d/Λ. It can be seen that confinement loss increases towards small cladding features diameters and confinement loss of the $2^{nd}$ mode, curve 202, is approximately 27 times that of the fundamental mode, curve 201, when expressed in dB/m, surprisingly indicating that a small relative refractive index difference of $\Delta_c=8.3\times10^{-4}$ does not compromise the level of built-in mode filtering. A maximum fundamental mode loss of 0.1 dB/m was used to find lower limit 205 for the normalized hole diameter d/Λ and minimum $2^{nd}$ mode loss of 1 dB/m to find the upper limit 206 for the normalized hole diameter d/Λ.

Figure 3:
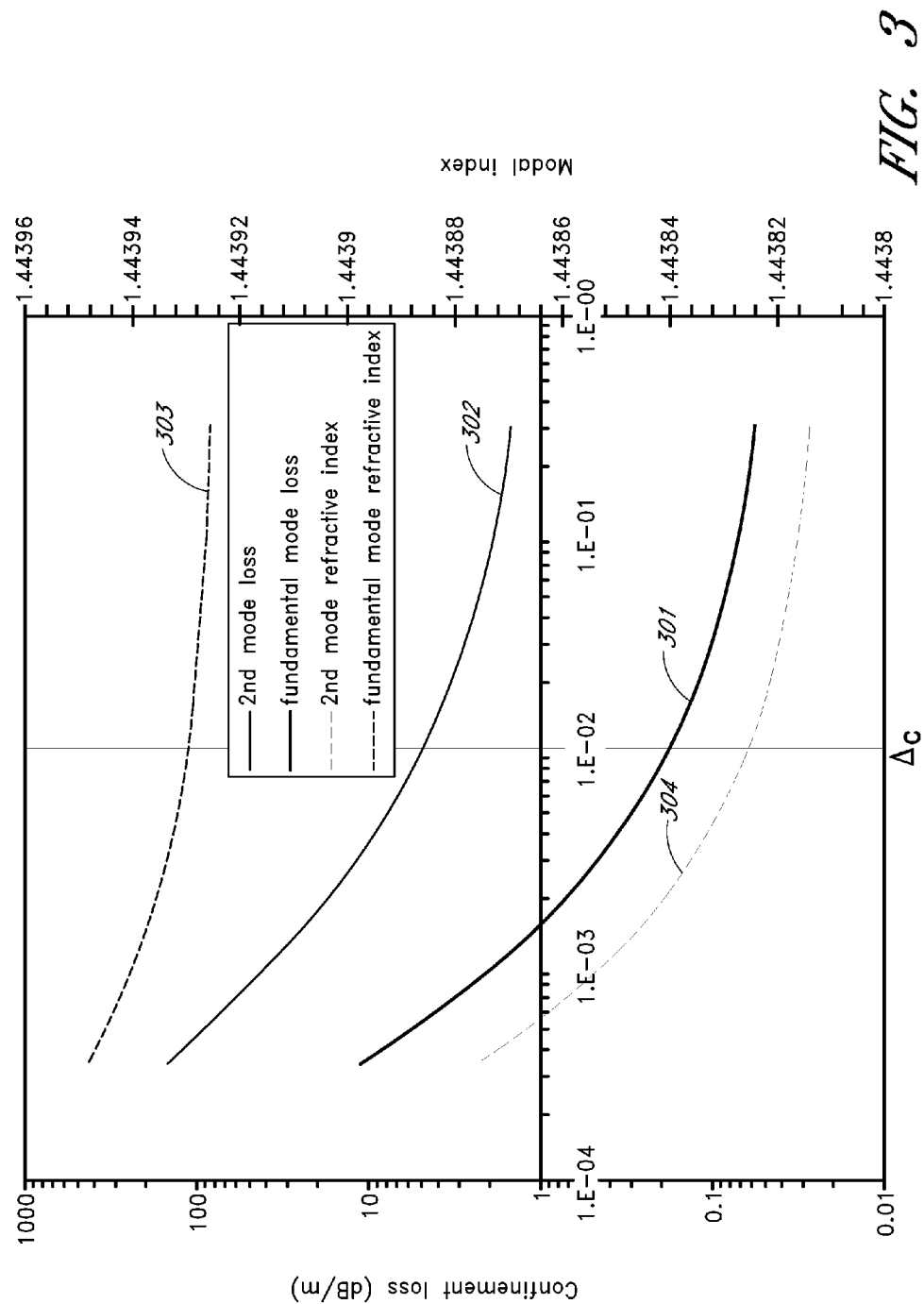
FIG. 3 is a plot of estimated confinement loss and modal index versus relative refractive index difference $\Delta_c$, relative to fused silica, $n_1$=1.444, with fluorine-doped silica in the holes, 50 µm core diameter, at a wavelength of 1.05 µm corresponding to FIG. 2, but with fixed d/Λ=0.675.

FIG. 3 illustrates the dependence of confinement loss and mode index on refractive index difference of fused silica with n=1.444 and the glass in the hole (cladding feature) for a leakage channel fiber with a 50 μm core diameter and d/Λ=0.675 at a wavelength of 1.05 μm. Curves 301, 302, 303 and 304 are confinement loss of the fundamental mode, confinement loss of the $2^{nd}$ mode, mode refractive index of the fundamental mode and mode refractive index of the $2^{nd}$ mode respectively. Confinement losses increase with a reduction of refractive index contrast.

Figure 4:
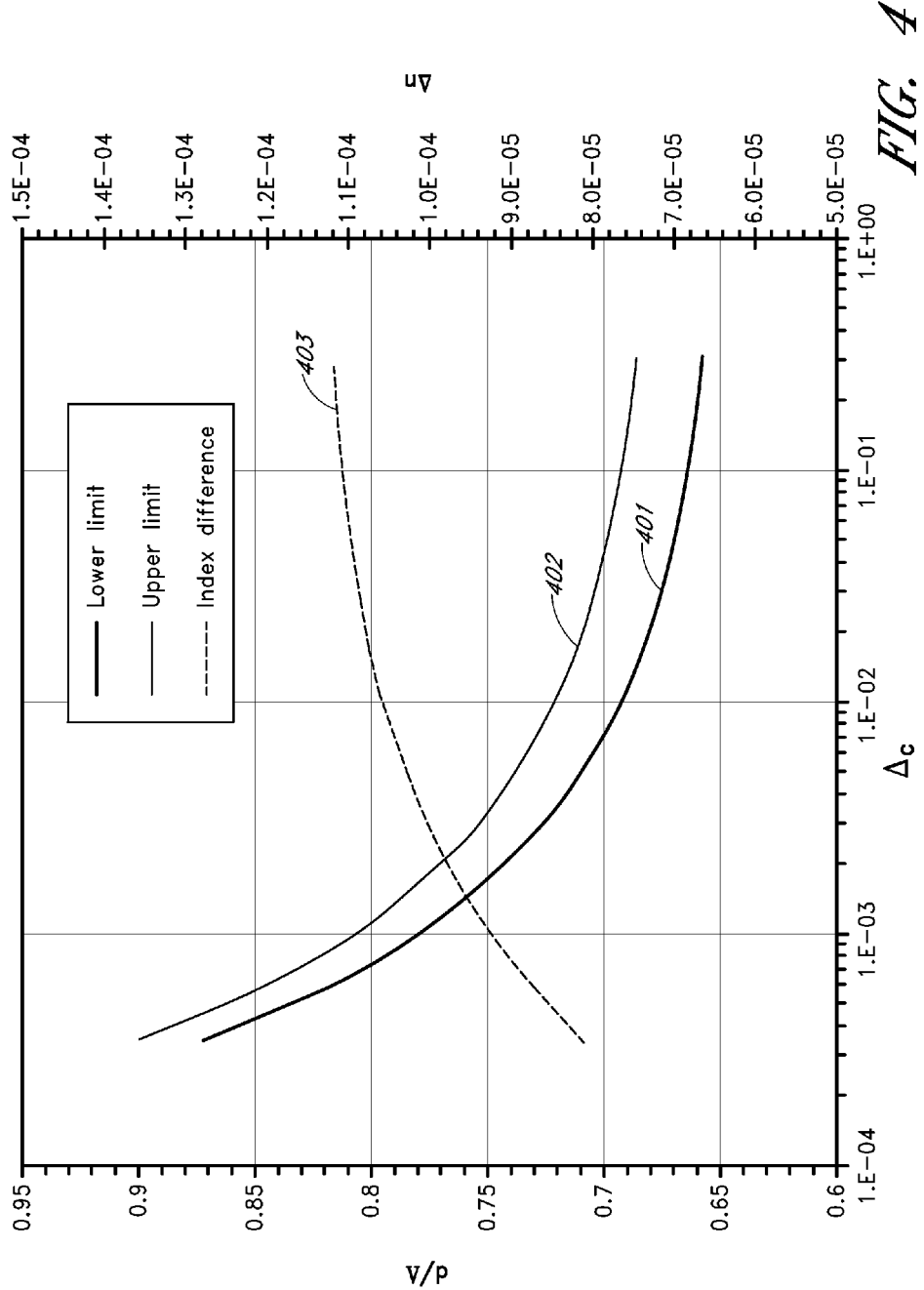
FIG. 4 is a plot illustrating estimated upper and lower design limits (based on desired loss levels for the first and higher order modes, 0.1 dB/m and 1 dB/m, respectively) for d/Λ versus the relative refractive index difference of fused silica with n=1.444 and the fluorine-doped silica glass (second cladding material, replacing the holes) for a leakage channel fiber of FIG. 1, with a 50 µm core diameter at a wavelength of 1.05 µm. The plot also shows variation of Δn, the refractive index difference between the modal indexes of the fundamental and $2^{nd}$ modes, as a function of $\Delta_c$.

FIG. 4 illustrates the dependence of upper and lower limits of designs for d/Λ on refractive index difference of fused silica with n=1.444 and the glass in the hole (cladding feature) for a leakage channel fiber with a 50 μm core diameter at a wavelength of 1.05 μm. A maximum fundamental mode loss of 0.1 dB/m was used to find lower limit for the normalized hole diameter d/Λ and minimum $2^{nd}$ mode loss of 1 dB/m to find the upper limit for the normalized hole diameter d/Λ. Curves 401, 402 and 403 are respectively: a lower limit of normalized hole diameter d/Λ, upper limit of normalized hole diameter d/Λ, and refractive index difference between the mode indexes of fundamental and $2^{nd}$ mode Δn. In addition to an increase of hole diameter of upper and lower limits of designs towards smaller relative refractive index difference, the design space is also getting smaller towards small relative refractive index difference, but a design space is still available at relative refractive index difference as low as $\Delta_c=3.5\times10^{-4}$ for this example.

Figure 5:
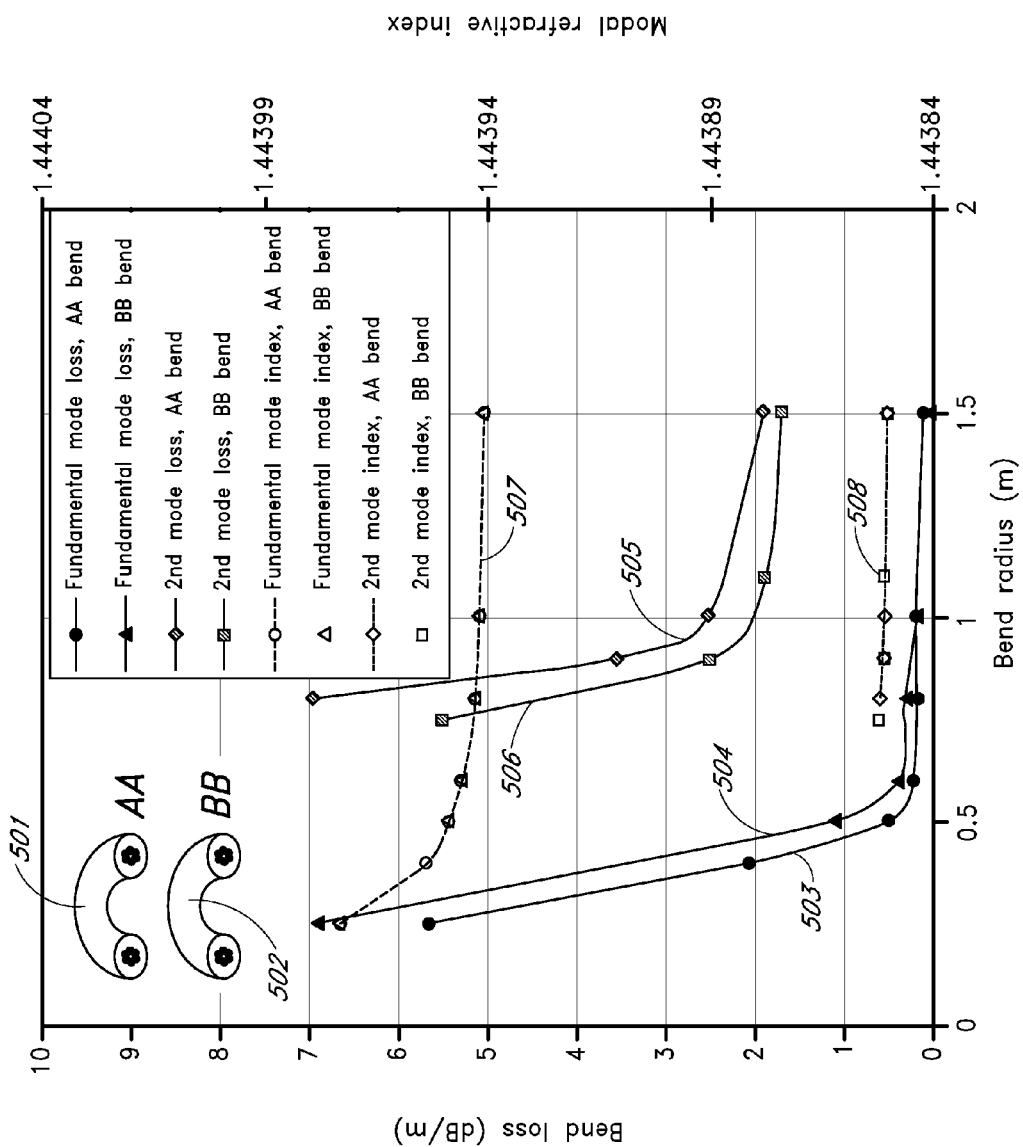
FIG. 5 is a plot illustrating estimated bend loss of fundamental mode and $2^{nd}$ mode, and the modal refractive index, versus bend radius. The plot shows simulated results for two orientations of bends for a leakage channel fiber with a core diameter of 50 µm, d/Λ=0.673, a wavelength of 1.05 µm, and relative refractive index difference between two glasses $\Delta_c$=8.3×10$^{-4}$.

FIG. 5 illustrates bend loss of fundamental mode and $2^{nd}$ mode for two orientations of bends for a leakage channel fiber with a core diameter of 50 μm, d/Λ=0.673, a wavelength of 1.05 μm and relative refractive index difference $\Delta_c=8.3\times10^{-4}$. AA bend orientation 501 is when the bending plane intersects the center of two cladding features. BB bend orientation 502 is when the bending plane intersects no cladding features. Curves 503, 504, 505, 506, 507 and 508 are loss of fundamental mode with AA bend orientation, loss of fundamental mode with BB bend orientation, $2^{nd}$ mode loss with AA bend orientation, $2^{nd}$ mode loss with BB bend orientation, mode index of fundamental mode and mode index of $2^{nd}$ mode respectively. It can be seen from fundamental and $2^{nd}$ mode loss curves, 503, 504, 505 and 506, that loss changes slowly above a critical bend radius and increases very quickly below the critical bend radius. The $2^{nd}$ mode has a larger critical bend radius compared to the fundamental mode. Extremely high $2^{nd}$ mode loss and, at the same time, low fundamental loss can be obtained when operating with a coil radius below the critical bend radius of the $2^{nd}$ mode and above the critical bend radius of the fundamental mode.

Figure 6:
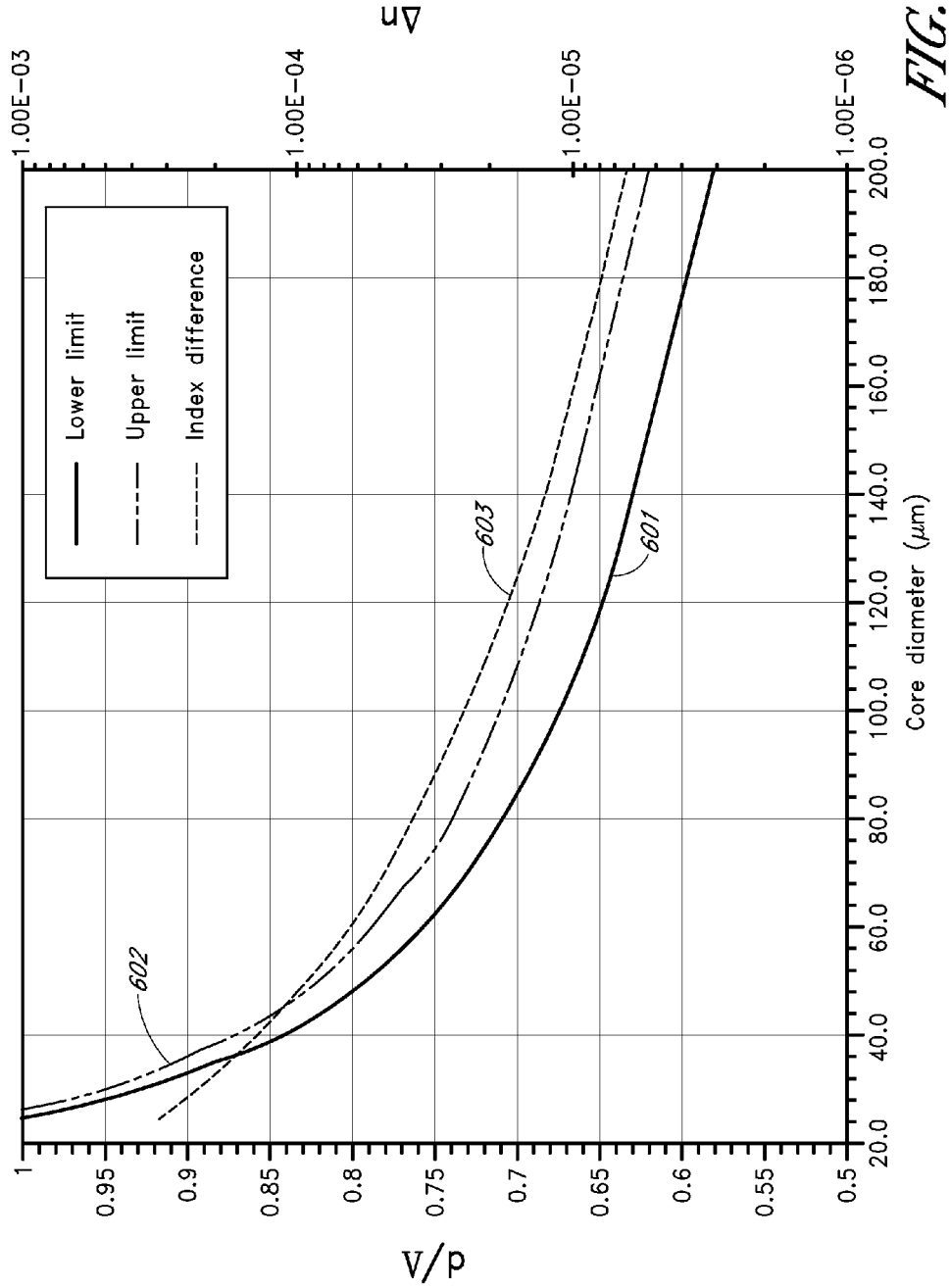
FIG. 6 is a plot illustrating estimated dependence of upper and lower limits of designs for d/Λ and Δn versus core diameters for a leakage channel fiber with relative refractive index difference between two glasses $\Delta_c$=8.3×10$^{-4}$ at a wavelength of 1.05 µm.

FIG. 6 illustrates the dependence of upper and lower limits of designs for d/Λ on core diameters for a leakage channel fiber with relative refractive index difference $\Delta_c=8.3\times10^{-4}$ at a wavelength of 1.05 μm. Curves 601, 602 and 603 are the lower limit of normalized cladding feature diameter d/Λ, the upper limit of normalized cladding feature diameter d/Λ, and the refractive index difference between the mode indexes of fundamental and $2^{nd}$ mode Δn. As in the example of FIG. 4, a maximum fundamental mode loss of 0.1 dB/m was used to find the lower limit for the normalized hole diameter d/Λ and minimum $2^{nd}$ mode loss of 1 dB/m to find the upper limit for the normalized hole diameter d/Λ. It can be seen that the lower and upper limits of d/Λ of the design space tends towards small cladding feature diameters for large core diameters. Large cladding features are used for small core diameters. Since relative cladding feature diameter can generally only go up to 1 in this configuration, the design space disappears for core diameters below approximately 24 μm.

The design limits in FIG. 6 are for straight fibers. Since coiling soften used in a practical case, the design space in FIG. 6 is often moved to slightly larger d/Λ so that the fiber would offer better bend performance. Also, although "limits," for example for a given performance are discussed herein, certain embodiments may go beyond these limits, for example, when different performance is desired, or for other reasons.

Figure 7:
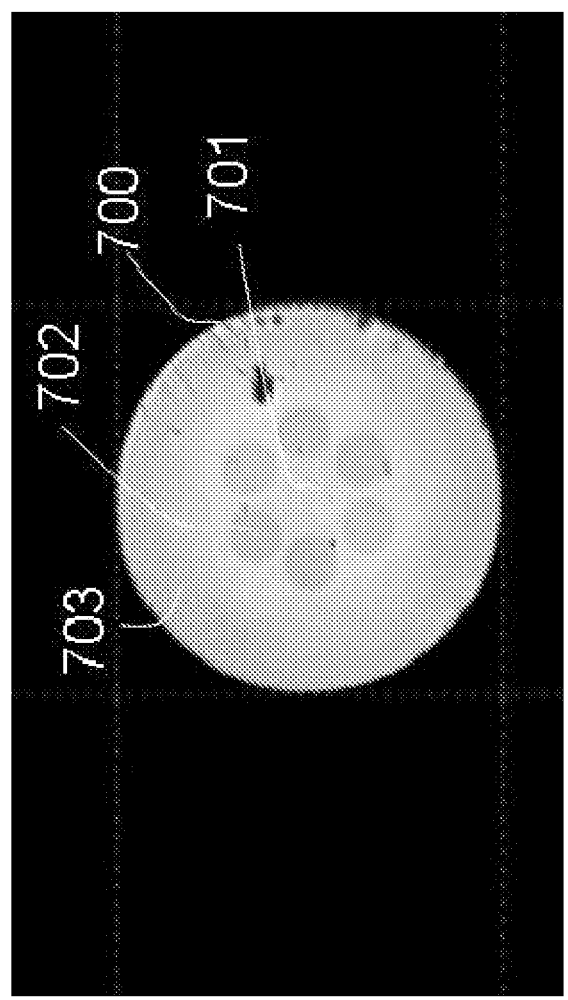
FIG. 7 is a photograph (microscope image) illustrating a cross-section of a fabricated leakage channel fiber with 48.6 µm core diameter, d/Λ=0.8, and relative refractive index difference between two glasses $\Delta_c$=8.3×10$^{-4}$. Effective area of the fiber is ~1340 µm$^2$.

FIG. 7 is a photograph (microscope image) illustrating a cross-section of a fabricated leakage channel fiber with 48.6 μm core diameter, d/Λ=0.8. Effective area of the fiber is ~1340 μm². The cladding features comprise fluorine-doped silica and the material surrounding the cladding features comprising silica glass without fluorine. This combination of glasses yields a relative refractive index difference $\Delta_c=8.3\times10^{-4}$. A preform was made by stacking silica rods (with 6 rods which were made by collapsing a silica tube onto a fluorine-doped silica rod) to give a relative cladding feature diameter d/Λ=0.8 and then drawing into smaller canes. Two fibers were drawn with diameters of 244 μm and 552 μm to give core diameters of 48.6 μm with an effective area of ~1340 μm², and 110 μm with an effective area of ~5940 μm², respectively. Cross-section of the fabricated leakage channel fiber 700 with 48.6 μm core diameter is shown in FIG. 7, where core 701 is substantially surrounded by 6 low refractive index fluorine-doped silica regions 702, and 703 is a cladding region beyond the low refractive index cladding features.

Figure 8:
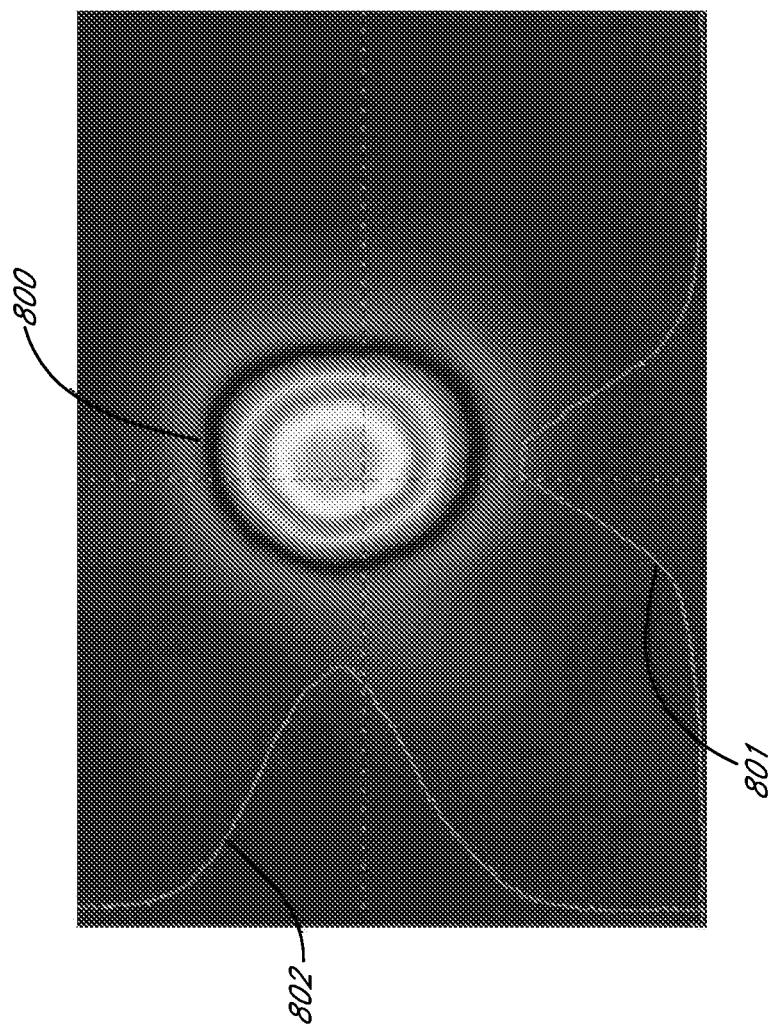
FIG. 8 illustrates measured mode profiles (e.g.: modal "near field" distributions) obtained along two orthogonal directions using the fabricated leakage channel fiber of FIG. 7 (core diameter of 48.6 µm).

FIG. 8 illustrates a measured near field mode pattern 800 from the output of the fiber 700. Mode profiles along horizontal and vertical directions are also illustrated in 801 and 802 respectively.

Figure 9:
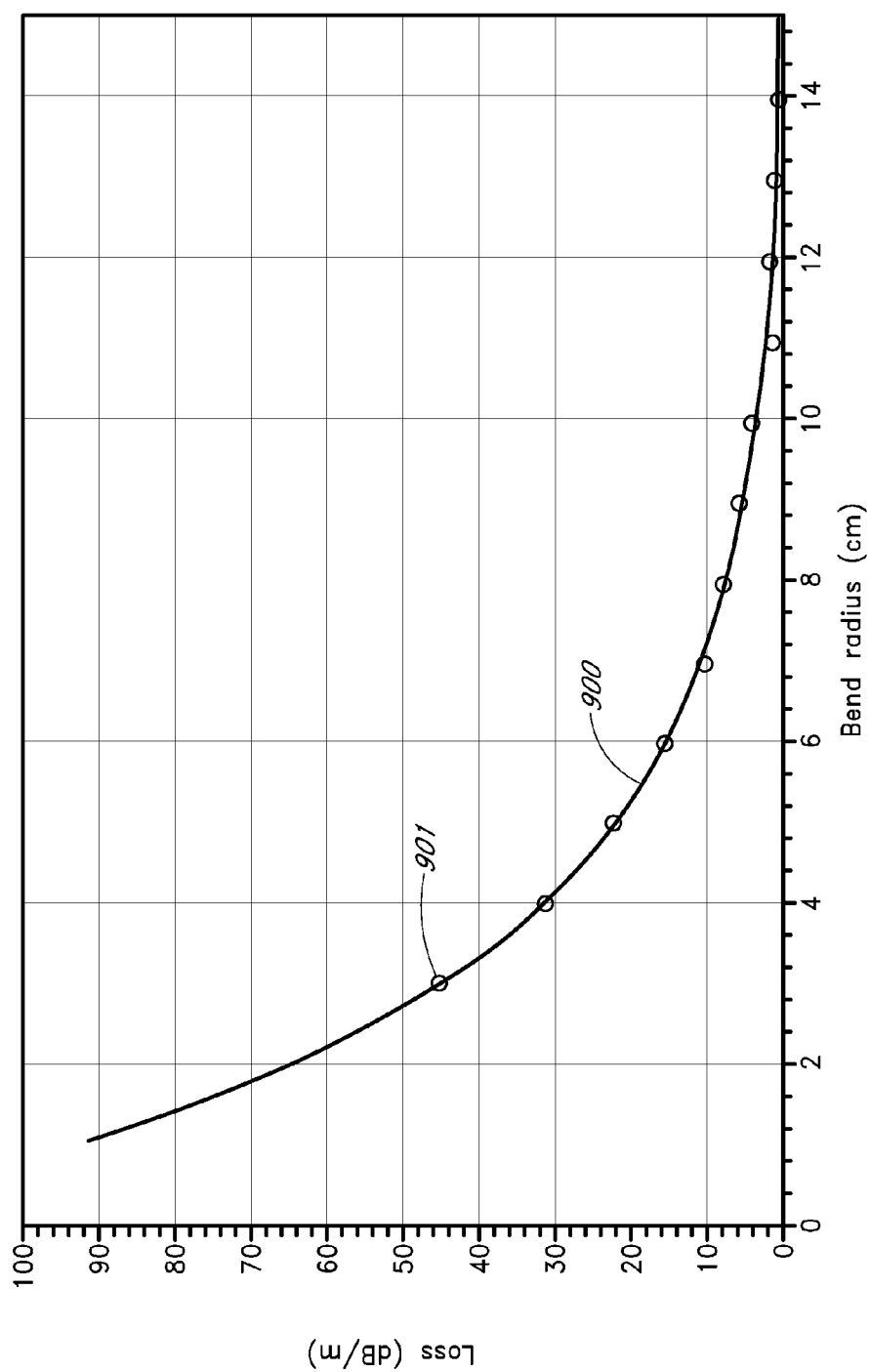
FIG. 9 is a plot illustrating measured bend loss versus bend radius obtained at several bend radii of the fabricated leakage fiber of FIG. 7, and a curve fit based on the measurements.

FIG. 9 illustrates bend loss 901 obtained by measuring the output of the fiber 700 while coiling fiber 700 into coils with various diameters. Curve 900 is a fit to the measured data 901. Fiber 700 can be coiled into 30 cm diameter coils, for example, without incurring significant losses.

Figure 10:
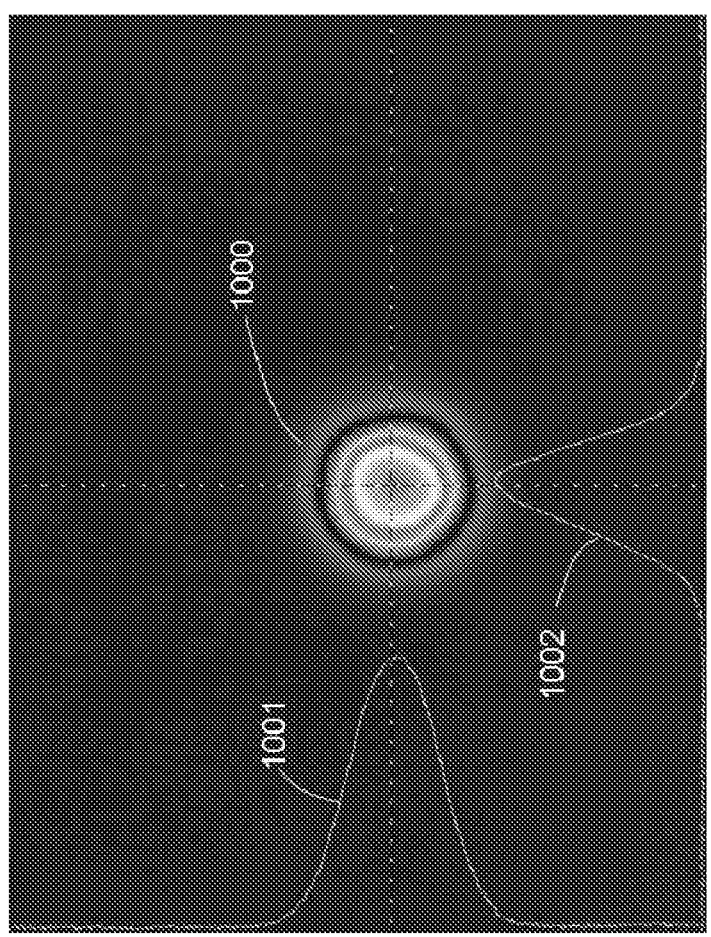
FIG. 10 illustrates measured mode profiles (e.g.: modal "near field" distributions) obtained along two orthogonal directions using a fabricated leakage channel fiber with a core diameter of 110 µm. The effective area of the fiber is ~5940 µm$^2$.

FIG. 10 illustrates a near field mode pattern measured from the output of the fiber with 110 μm diameter. Mode profiles along vertical and horizontal axis are shown in 1001 and 1002 respectively. In this case an approximate 7 meter fiber was coiled into a single approximate 2 meter coil diameter for the measurement.

Figure 11:
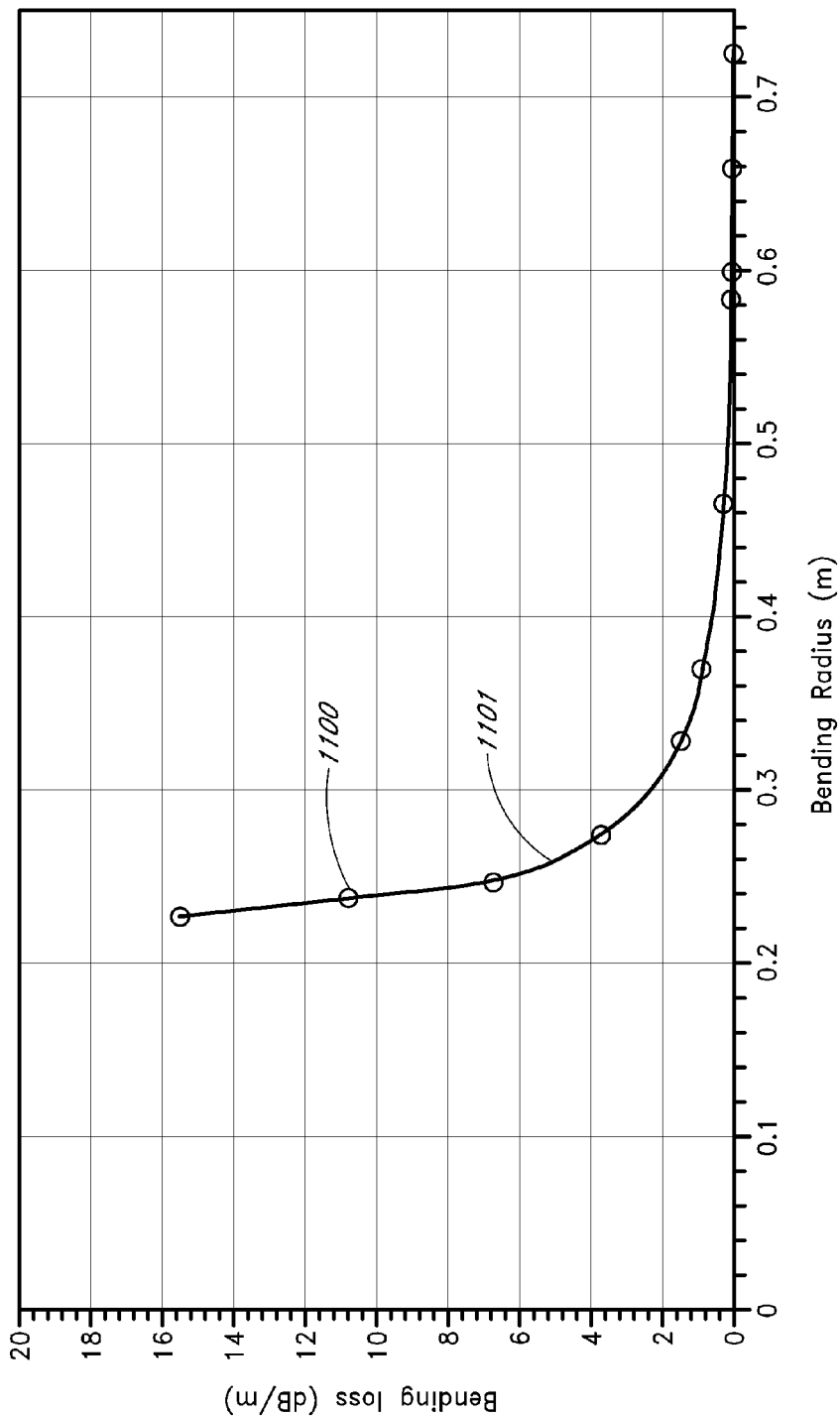
FIG. 11 is a plot illustrating measured bend loss versus bend radius obtained at several bend radii of the fabricated leakage channel fiber of FIG. 10 with a core diameter of 110 µm, and a curve fit based on the measurements.

FIG. 11 illustrates the measured bend loss 1100 of the fiber of FIG. 10 with a fit 1101 to the measured data 1100. The minimum bend radius for this example is about 60 cm.

Further simulated results and measurements results were obtained corresponding to fibers of non-circular shapes, different diameters, with coatings, and other variations.

Figure 12:
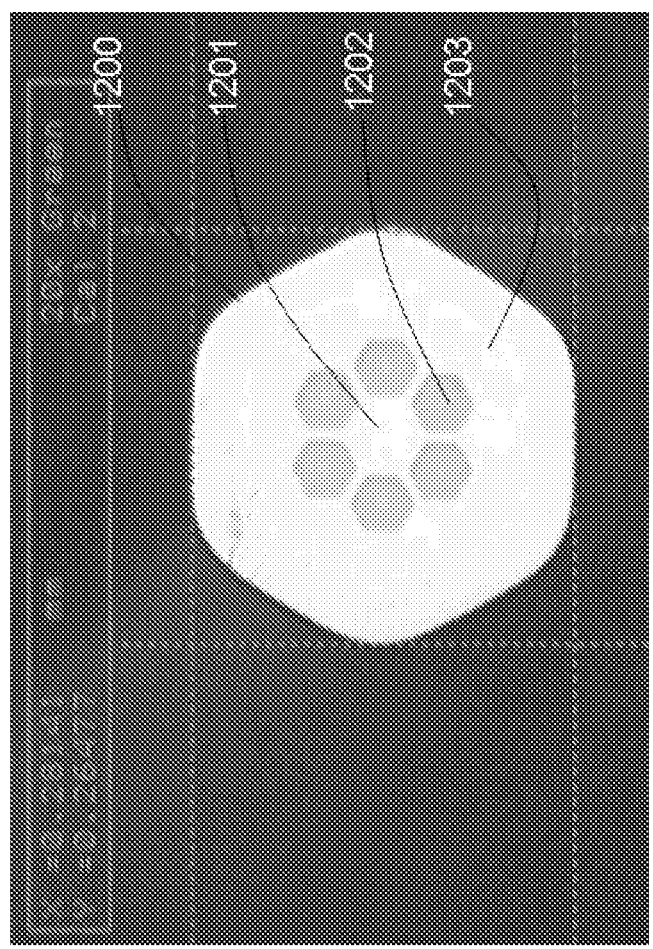
FIG. 12 is a photograph (microscope image) of a fabricated fiber having a non-circular shape, wherein the glass features of the second cladding are nearly rotationally symmetric.

FIG. 12 illustrates another fabricated fiber 1200 having a non-circular, approximately hexagonal, shape. The cross-section of the fiber 1200 shown in FIG. 12 has six sides with rounded corners therebetween. This hexagonal geometry promotes pump modes mixing in a double clad fiber. Core 1201 and low index features 1202 are also non-circular, and approximately hexagonal. Cladding region 1203 extends beyond low refractive index cladding features 1202.

The fiber 1200 in FIG. 12 which has an outer shape of hexagon, but with rounded corners, is contrasted with the circular geometry of fiber 700 in FIG. 7. As described above, this hexagon shape with rounded corners of fiber 1200 is beneficial for pump mode mixing in a double clad configuration where outer shape of the fiber forms the pump guide. In an example perform fabrication process, a hexagonal stack is formed with fluorine doped rods and silica rods in their desired configuration. This stack is slightly fused along its length in a furnace at high temperature before inserting into a larger silica tube. A small amount of vacuum is used inside the outer tube during fiber drawing. This vacuum is sufficient to help the formation of the hexagonal shape of the fiber and the features. A vacuum of −0.5 in Hg to −3 in Hg can be used at a drawing temperature of 2000 degree centigrade in some embodiments. Lower and higher vacuum is also expected to give similar results if appropriate adjustment of drawing temperature is made.

Figure 13A:
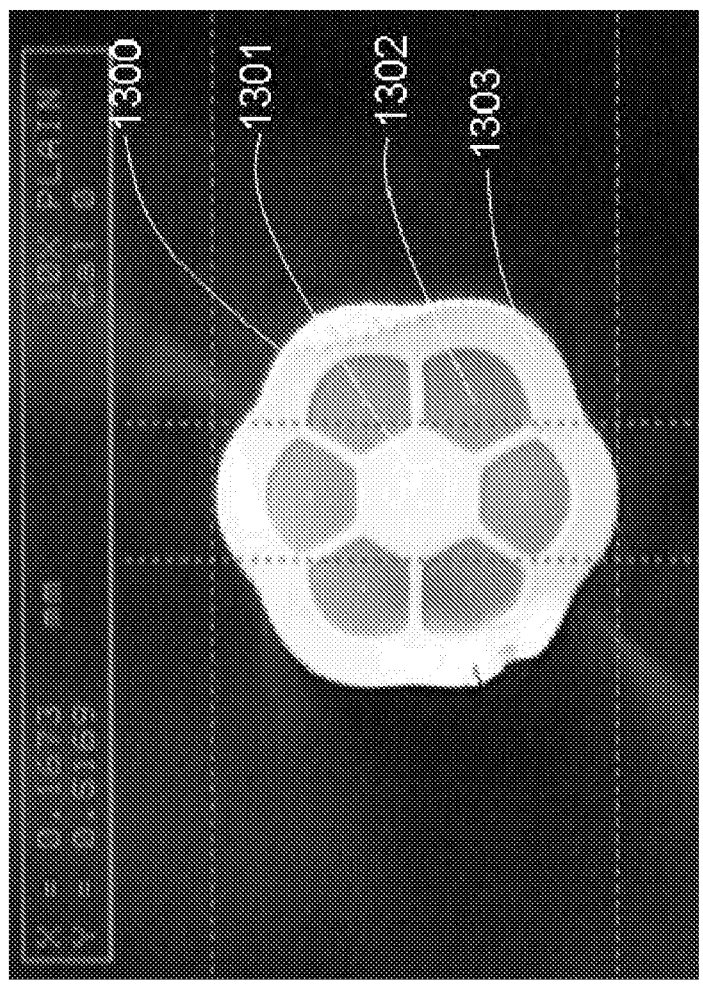
FIG. 13-a is a photograph (microscope image) of another fabricated fiber having a non-circular shape, a 152 µm core, and including six highly non-rotationally symmetric (e.g., non-circular) low index cladding features and a cladding region beyond the features. The features, however, are positioned in on a rotationally symmetric path, e.g., a ring, about the core.

FIG. 13a, corresponding to an end view, illustrates another fiber 1300 having a non-circular shape, with significant boundary variations, and non-rotationally symmetric (e.g., non-circular) low index features. The features, however, are positioned on a rotationally symmetric path, e.g., a ring, about the core. The fiber 1300 has six sides with small indentations therein and rounded corners therebetween. Fabricated fiber 1300 comprises a core 1301 with diameter of 152 μm, defined as side-to-side distance. The fiber also has six low index features 1302, which are not circular as well as a cladding region 1303 beyond the low index features. This shape is useful for increasing pump mixing. As described above, in fibers having a circular cross-section skew rays that avoid the doped center of fiber may propagate within the fiber. A deviation from circular shaped-cross-section can increase the number of rays that pass through the center of fiber which is doped with a gain medium thereby increasing the efficiency of pumping.

Figure 13B:
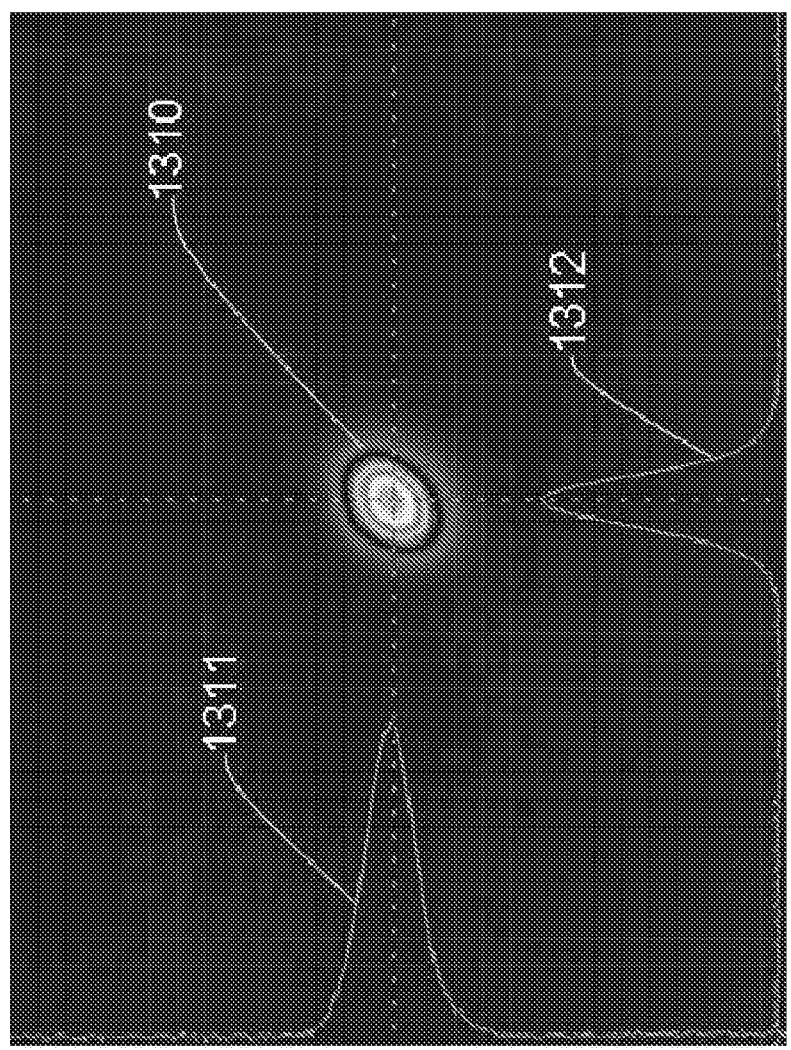

FIG. 13b illustrates measured near field mode profiles 1310 of fiber 1300 with mode profile 1311 and 1312 along vertical and horizontal directions respectively. Core diameter is 152 μm. The mode has a measured $M^2$ of 1.4. Insufficient mode filtering may account for the reduced beam quality. An approximate 7 meter fiber was coiled into a single approximate 2 meter coil diameter for the measurement, as in FIG. 10.

Figure 13C:
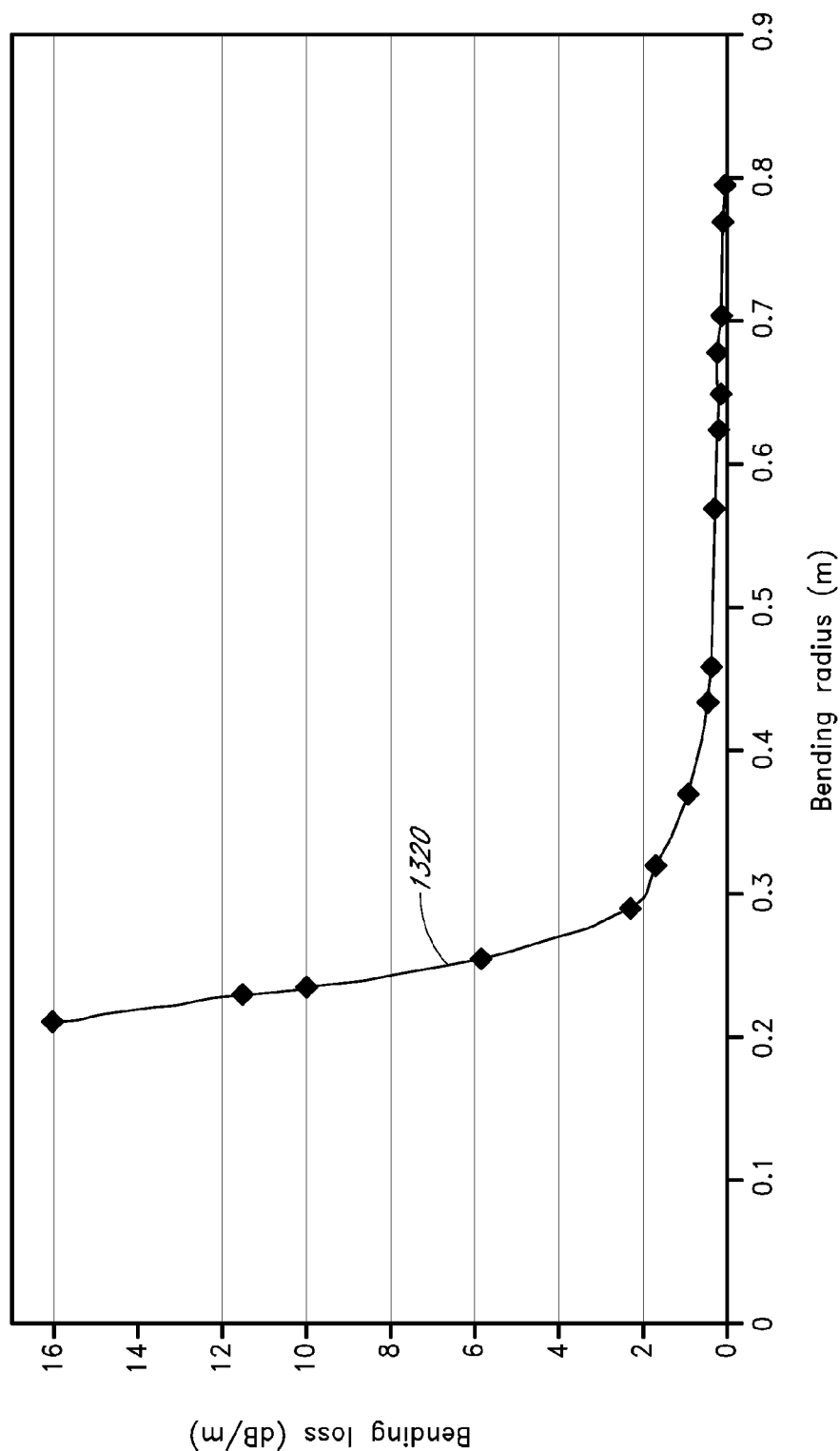

FIG. 13-c illustrates bend loss. Curve 1320 is bend loss measured on fiber 1300. The fiber can be bent to a bend radius of 0.5 m without significant bend loss penalty.

Figure 14A:
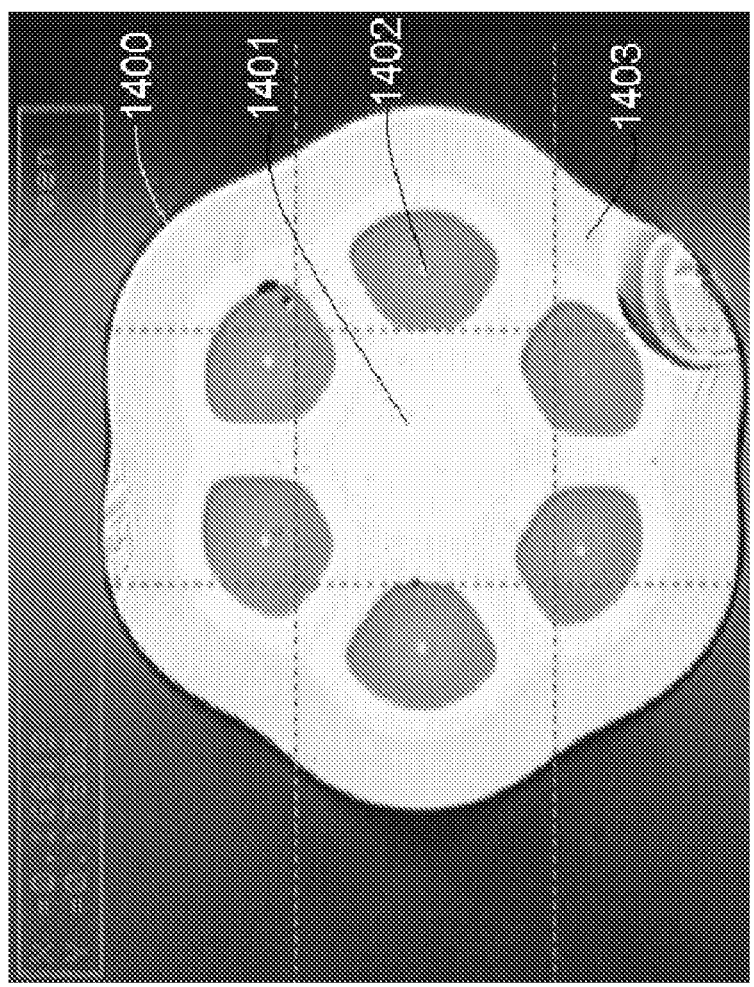
FIG. 14a is a photograph of another fabricated fiber having a non-circular shape, a 168 µm core, including six non-circular/high non-rotationally symmetric low index cladding features and a cladding region beyond the features. (The features, however, are positioned in a rotationally symmetric path, e.g., a ring, about the core.)

FIG. 14a, corresponding to an end view, illustrates another fabricated fiber. Fabricated fiber 1400 has a core 1401 with a diameter of 168 μm. There are six low index features 1402 as well as a region beyond the low index features 1403. This fiber 1400 also has a non-circular shape, with significant boundary variations, and non-rotationally symmetric (e.g., non-circular) low index features. The features, however, are positioned in on a rotationally symmetric path, e.g., a ring, about the core. The fiber 1400 has six sides with small indentations therein and rounded corners therebetween. This shape is also useful for increasing pump mixing.

Figure 14B:
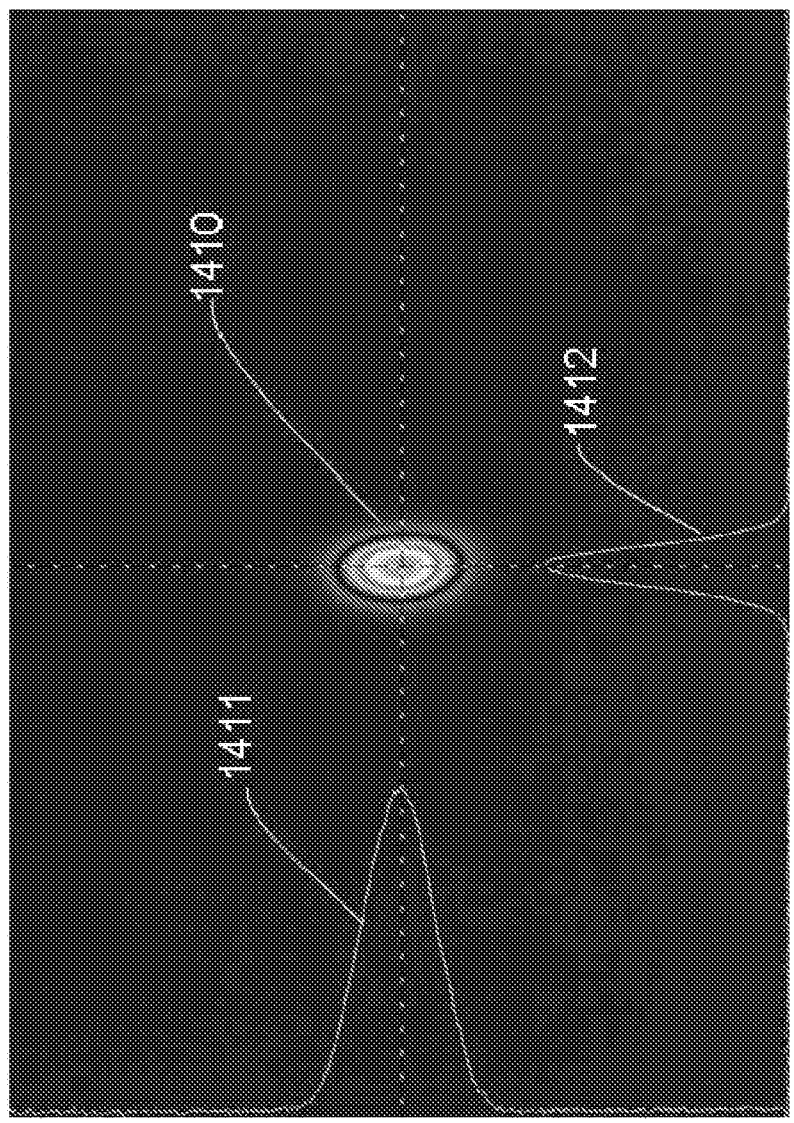
FIG. 14-b illustrates measured mode profiles (modal "near field" distributions) obtained along two orthogonal directions using the fabricated fiber of FIG. 14-a.

FIG. 14b illustrate a measured near field mode pattern 1410 from fiber 1400; 1411 and 1412 are mode profiles along vertical and horizontal directions respectively. The effective mode area is approximately 13,900 mm$^2$. The mode has a measured $M^2$ value of 1.12, approaching a theoretical limit. A straight fiber approximately 0.9 meters in length was used.

Figure 15:
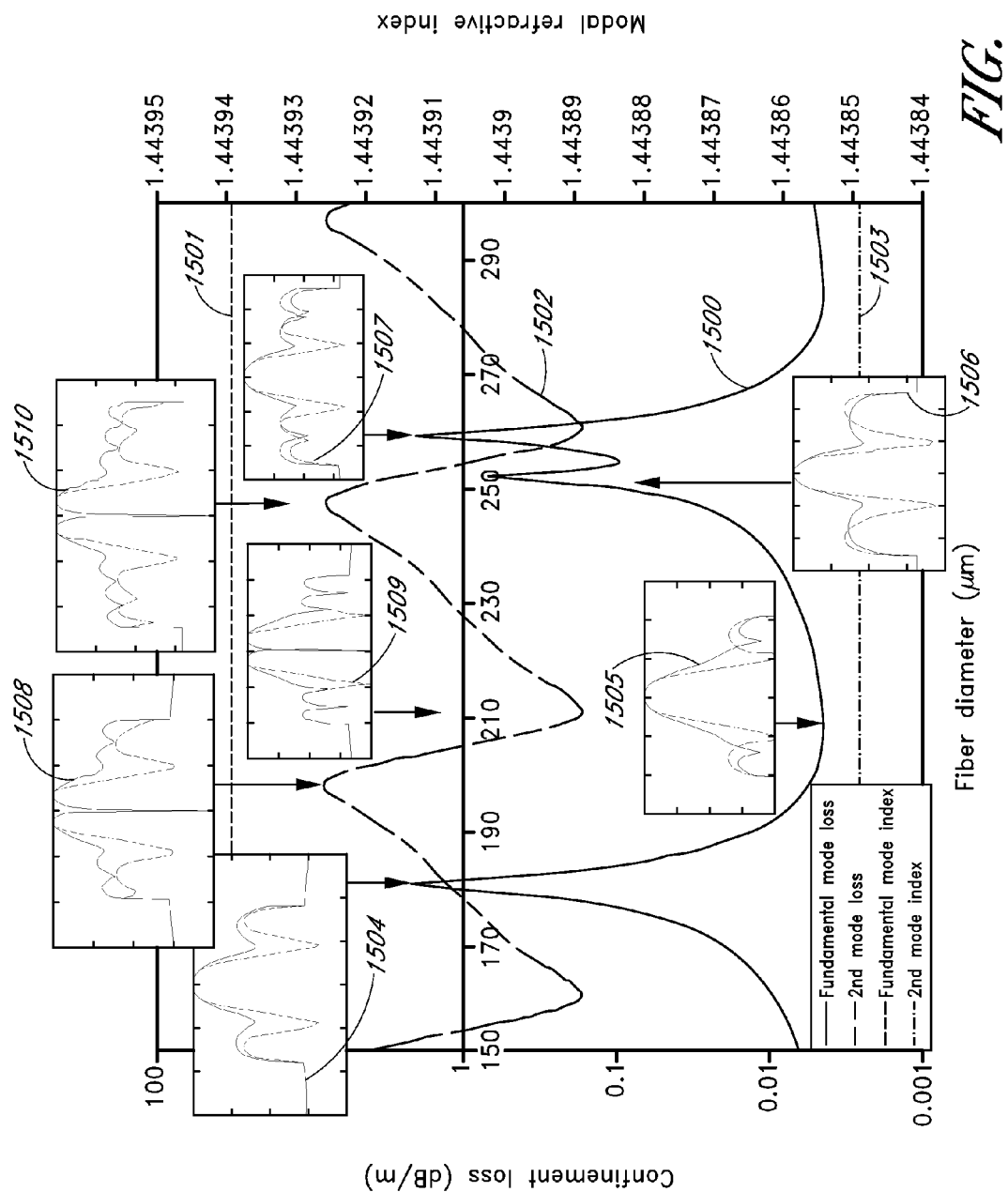
FIG. 15 is a plot illustrating estimated confinement loss and modal index versus fiber diameter. Fundamental and $2^{nd}$ order mode profiles corresponding to two orthogonal directions are superimposed to show the corresponding variation.

FIG. 15 is a plot illustrating estimated confinement loss and modal index versus fiber diameter. Fundamental and $2^{nd}$ order mode profiles corresponding to two orthogonal directions are superimposed to show the corresponding variation. The graphs shows calculated fundamental loss 1500, fundamental mode index 1501, second order mode loss 1502 and second order mode index 1503. Curves 1504, 1505, 1506 and 1507 are fundamental mode profiles along horizontal and vertical directions in solid and dotted lines respectively for fiber diameters of 179 μm, 207.5 μm, 251.5 μm, and 259 μm respectively. Curves 1508, 1509 and 1510 are second order mode profiles along horizontal and vertical directions in solid and dotted lines respectively for fiber diameters of 196.5 μm, 210 μm, and 247.5 μm respectively. A coating refractive index of 1.54 is assumed. In a non-circular fiber, the peaks in 1500 and 1502 are expected to broaden.

The calculation demonstrates that both fundamental mode and second order mode losses are changing with fiber diameter. At certain diameters, modes are more confined to the center of the fiber, shown in 1505 and 1509, to provide low loss. While at certain other diameters, modes are less confined to the center, for example 1504, 1506, 1507 for fundamental modes, to provide higher losses.

Because the choice of diameter may affect losses, it may be beneficial to operate with diameters that provide, or are selected or optimized (or approximately so) to provide both higher loss for the second order modes and lower loss for the fundamental modes.

Figure 16:
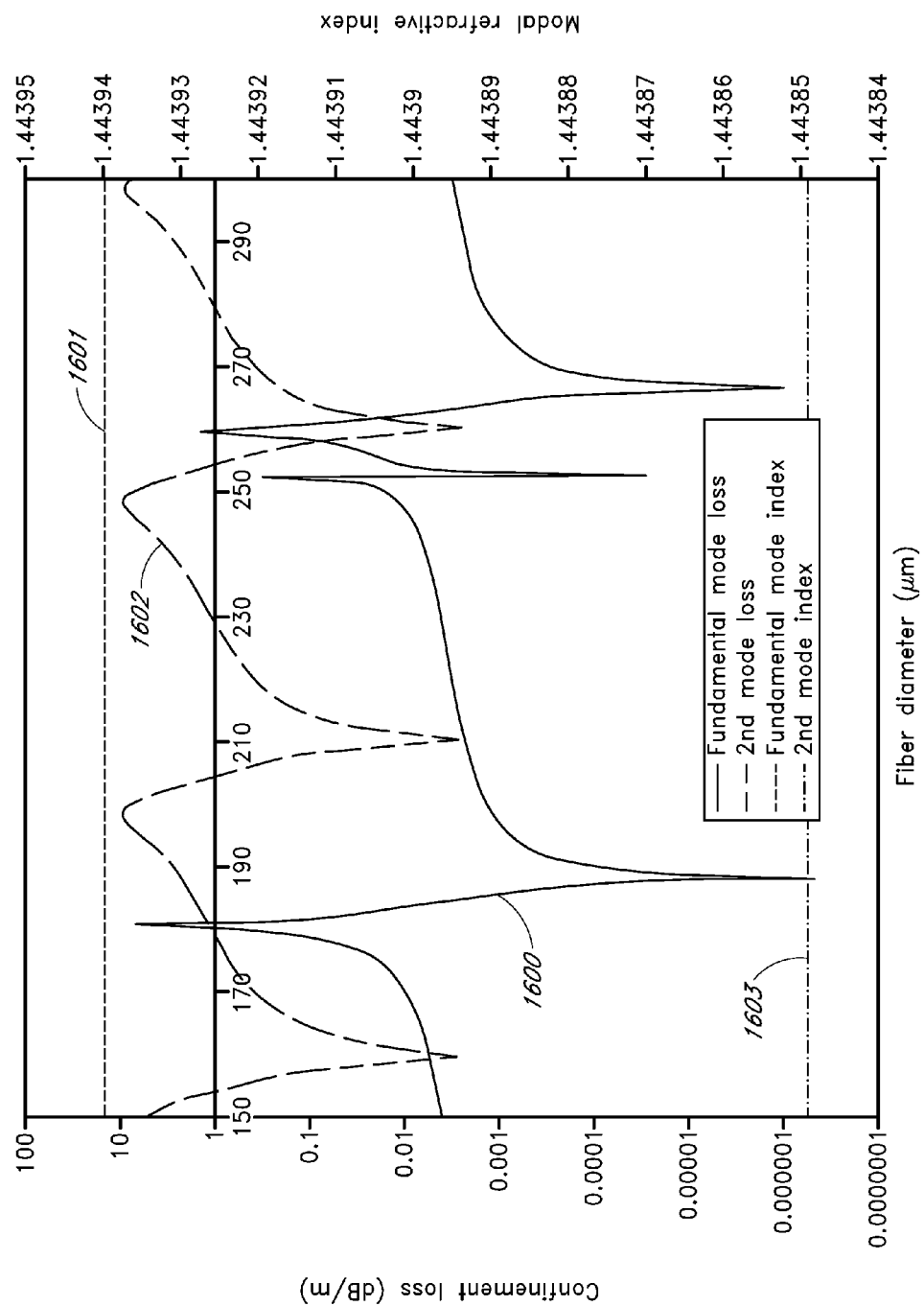
FIG. 16 is a plot illustrating estimated confinement loss and modal index versus fiber diameter, showing varying loss as the fiber diameter varies, and a different coating refractive index than the coating of FIG. 15.
Figure 17:
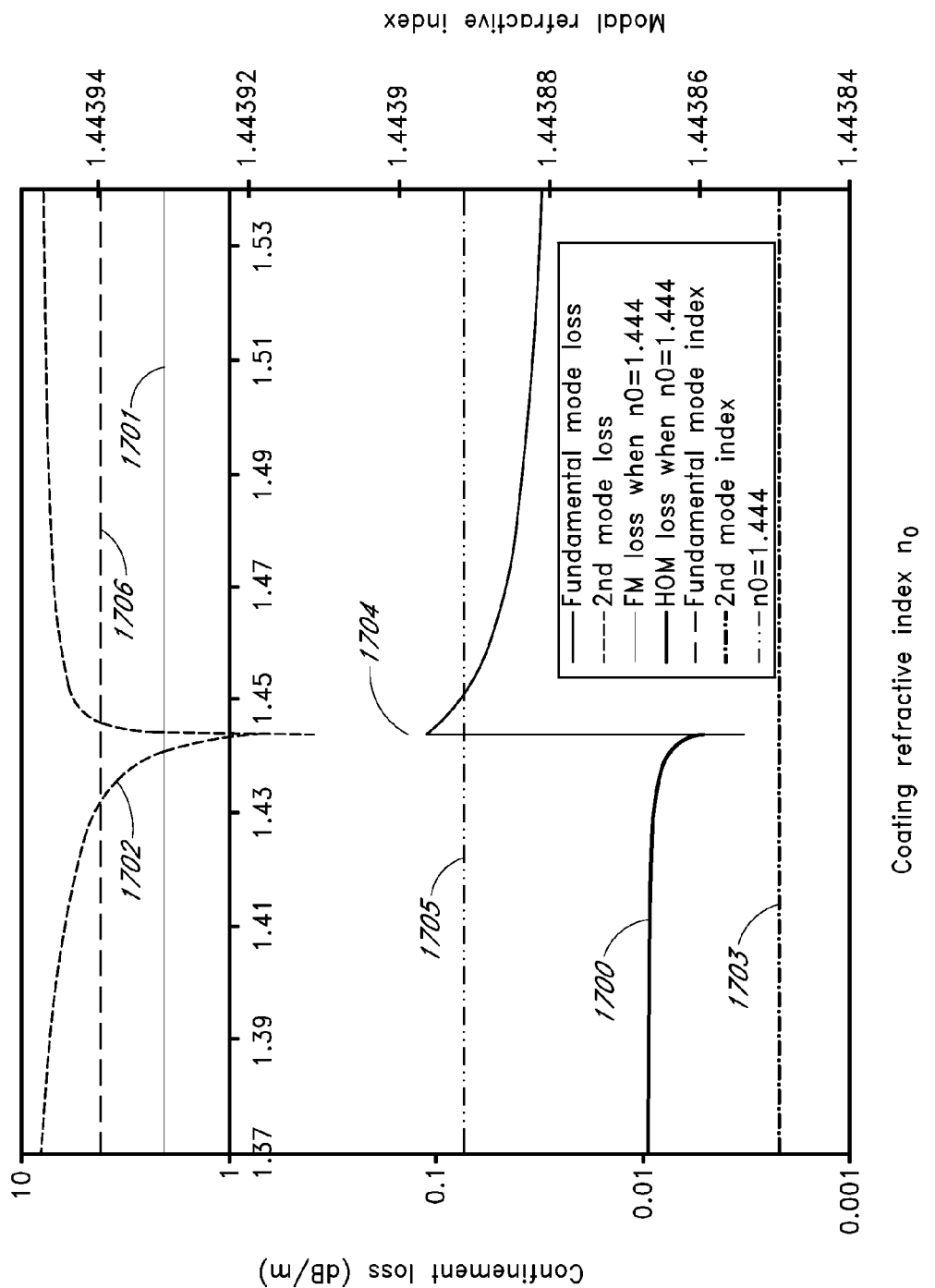
FIG. 17 is a plot illustrating estimated confinement loss and modal index versus coating refractive index.

FIG. 16 is a plot further illustrating estimated confinement loss and modal index versus fiber diameter, showing varying loss as the fiber diameter varies. FIG. 16 shows calculated fundamental loss 1600, fundamental mode index 1601, second order mode loss 1602 and second mode index 1603. The loss varies for both fundamental and second order modes when fiber diameter is changed. A complex coating refractive index of $n_0=1.37+j*10^{-8}$ was assumed for the analysis FIG. 17 is a plot illustrating estimated confinement loss and modal index versus coating refractive index. FIG. 17 shows calculated fundamental mode loss 1700, fundamental mode index 1701, second order mode loss 1702, and second order mode index 1703 versus coating refractive index $n_0$. Once again, a lossy coating with an imaginary part $10^{-8}$ was used. A fiber diameter of 247 μm is assumed. Line 1704 corresponds to the coating being matched to the second cladding material surrounding the cladding features and comprising glass having a refractive index of 1.444. Lines 1705 and 1706 are the level of fundamental mode and second order mode loss respectively when the coating refractive index is matched to the second cladding material surrounding the cladding features and comprising glass. It can be seen that the differential loss between the second order mode and fundamental mode is much larger when operating where coating refractive index is different from the refractive index of the glass surrounding the cladding features.

Figure 18:
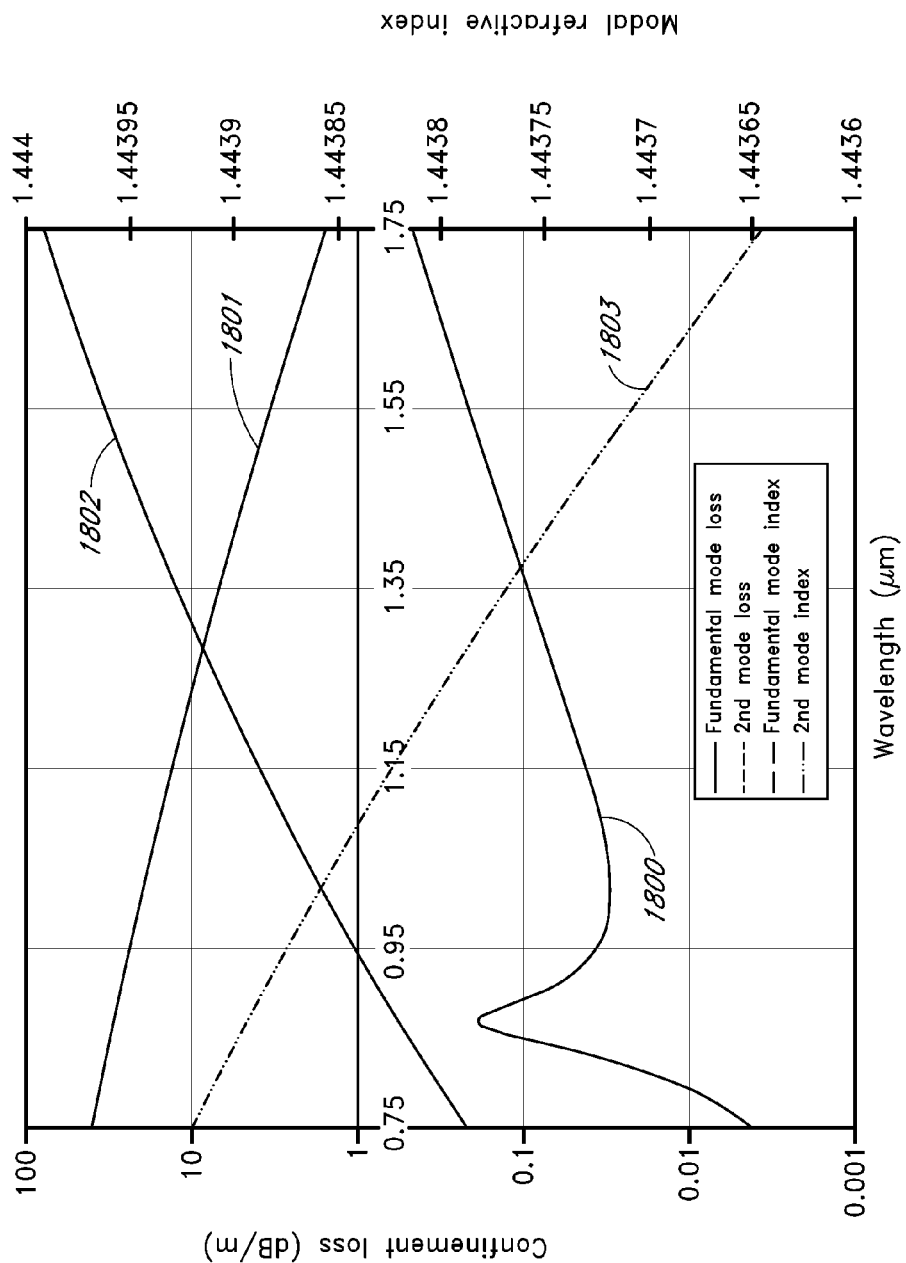
FIG. 18 is a plot illustrating estimated confinement loss and modal index versus wavelength.

FIG. 18 is a plot illustrating estimated confinement loss and modal index versus wavelength. The calculated fundamental mode loss 1800, fundamental mode index 1801, second order mode loss 1802, and second order mode index 1803, for different wavelengths, show the weak wavelength dependence which would allow practical fiber to be realized. Here $n_0=1.54$, and the fiber diameter is 247 mm.

Some embodiments of the present invention may include photonic crystal fibers in addition to leakage channel fibers. Photonic crystal fibers are discussed in Birks et al, Optics Letters, Vol. 22. No. 3, Jul. 1, 1997, pp 961-963.

One application of photonic crystal fiber is for designing endless single mode fiber, where single mode operation is achieved over a wide range of wavelengths, (for example, a wavelength range greater than 500 nm or greater than 1000 nm, such as a wavelength range from 458 nm to 1550 nm). This is done by limiting relative hole diameters to below 0.406. In this regime, experimentation has demonstrated that at shorter wavelengths more light is in the glass (as opposed to the holes) and thus the effective cladding refractive index is higher. The effective NA of the fiber is accordingly reduced when wavelength is decreased. This dispersion of such photonic crystal fibers can advantageously be used to extend the single mode operation of the fiber to lower wavelengths.

In particular, this dispersion is counter to the trend in classical fibers that cause classical single mode fibers to become multimode at shorter wavelength. The V number, for example, is inversely proportional to the wavelength. Thus, as the wavelength decrease, the V number gets large and exceeds 2.405 wherein the conventional fiber is multimode for these smaller wavelengths.

In photonic crystal fibers with small holes, the effective cladding index increases at smaller wavelengths, causing more light to be concentrated in the background glass (as oppose to the cladding features). This dispersion compensates for the inverse dependency of V number on wavelength which would otherwise limit the range of single mode operation to higher wavelength. This dispersive nature of the cladding refractive index in these photonic crystal fibers thus extends the single mode operation of the fiber to shorter wavelengths and enables endless single mode operation, which is not possible in conventional single mode fiber.

In addition to providing for single mode operation, photonic crystal fiber can also form large core single mode fiber. This is due to the ability of photonic crystal fiber to achieve very low fiber numerical aperture (NA) by controlling air hole diameter in the cladding. The cladding is a composite where the effective refractive index is determined by the air filling fraction and wavelength. Control is therefore provided over the effective refractive index and numerical aperture by design of the air hole, e.g., size and density.

Photonic crystal fibers (PCF) and leakage channel fibers (LCF) have as a distinguishing factor the number of holes. PCF generally has a large number of holes and number of layers (e.g., rings) is generally N≥3. The PCF may also have smaller holes than LCF.

Figure 19:
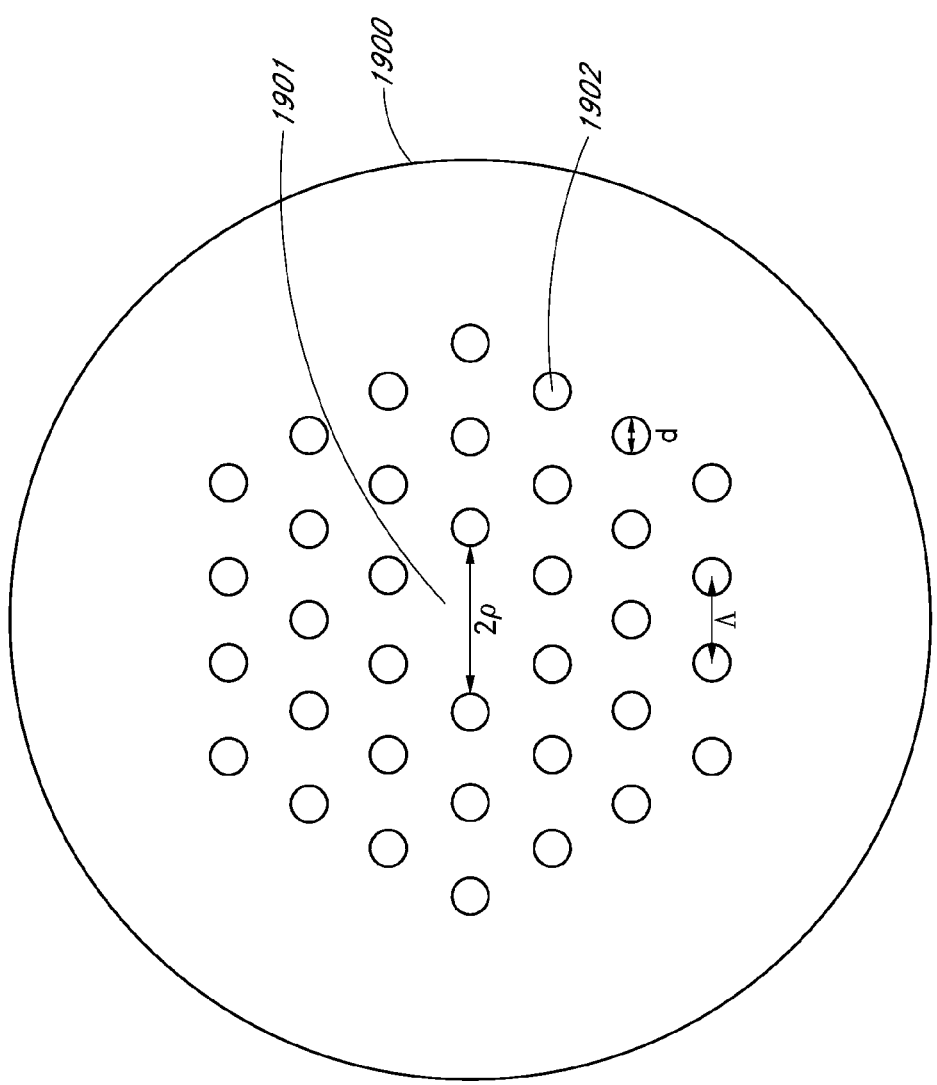
FIG. 19 is a cross sectional view schematically illustrating a fiber with 3 layers (N=3) of hexagonally arranged holes and definitions for pitch Λ, hole diameter d, and core radius ρ.

An example of a fiber 1900 with N=3 is illustrated in FIG. 19, where the fiber has a core 1901 surrounded by an array of air holes 1902 arranged in a hexagonal pattern comprising three rings or layers. Hole diameter d, center-to-center separation, also referred to as pitch Λ and core diameter 2ρ are also illustrated.

Some embodiments of the present invention may include substantially "all-glass" (e.g., glass cladding features disposed in a glass matrix material) in either endless single mode fiber and/or large core fiber configurations, with glass features 1902 (rather than air holes) having very low relative refractive index difference to that of the material in which the glass cladding features are disposed or compared to the rest of the fiber. As discussed below, relative refractive index difference as low as $8.3 \times 10^{-4}$, possibly much lower, can be used to realize these fibers. The design guidelines for various embodiments comprising all-glass endless single mode fiber and large core photonic crystal fiber are provided herein.

To analyze the single mode regime of operation, one can examine the $2^{nd}$ mode cutoff. In a conventional fiber, the second mode cutoff can be easily obtained by a well defined V value number, e.g. V=2.405 for step index fiber. Physically, this is the transition point where total internal reflection condition for the $2^{nd}$ mode just ceases to be satisfied. In a photonic crystal fiber with a composite cladding, this point may not be as easily defined.

Previous studies have analyzed the mode cutoff of air-hole photonic crystal fibers. Initial analysis was done by studying transition in effective mode areas of a fiber to look for the transition point where the $2^{nd}$ mode is no longer substantially bound in the core (Mortensen Optics Express, vol. 10, pp 341-348, 2002). Kuhlmey et al (Kuhlmey et al, Optics Express, vol. 10, pp. 1285-1290, 2002) have found there is a clearer transition point in the confinement loss of the $2^{nd}$ mode. This transition point can be precisely located by looking for a peak in the $2^{nd}$ order derivative of the $2^{nd}$ mode confinement loss.

Figure 20:
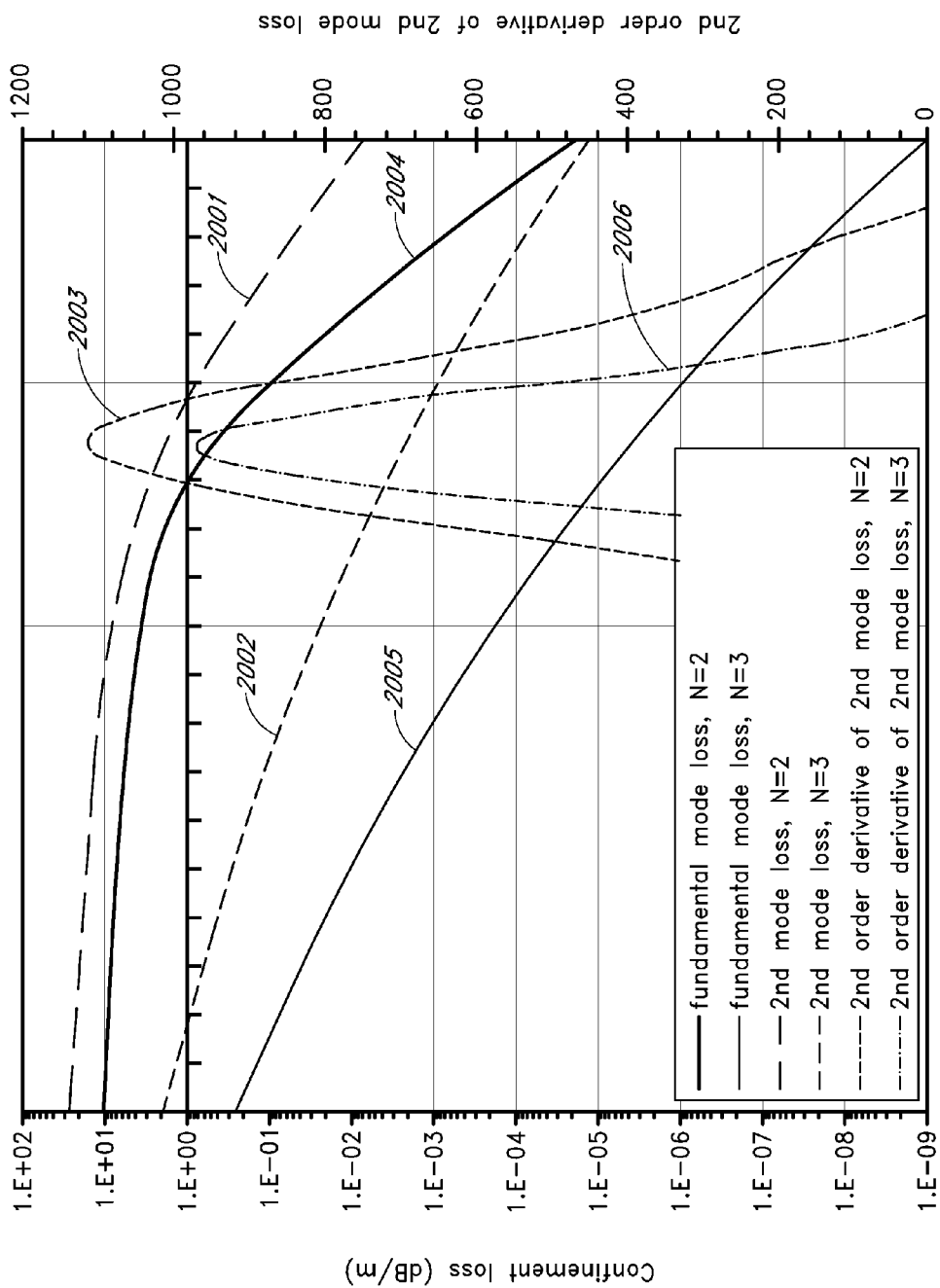
FIG. 20 is a plot illustrating simulated confinement loss of the fundamental and $2^{nd}$ modes versus d/Λ. Example embodiments of the present invention may include two or three layer (N=2, N=3) fibers. The plots illustrate corresponding $2^{nd}$ order derivative of $2^{nd}$ mode loss. In this example Δn=1.2×10$^{-3}$ and normalized wavelength of λ/Λ=10$^{-2}$.

FIG. 20 illustrates this process of locating $2^{nd}$ mode cutoff in a fiber with a relative refractive index difference $\Delta_c=8.3 \times 10^{-4}$ at $\lambda/\Lambda=10^{-2}$. Curves 2001, 2002, 2003, 2004, 2005, and 2006 are confinement loss of the $2^{nd}$ mode in a 2 layer fiber, confinement loss of fundamental mode in a 2 layer fiber, $2^{nd}$ order derivative of $2^{nd}$ mode loss in a 2 layer fiber, confinement loss of $2^{nd}$ mode in a 3 layer fiber, confinement loss of fundamental mode in a 3 layer fiber and $2^{nd}$ order derivative of $2^{nd}$ mode loss in a 3 layer fiber, respectively. The transition point of $2^{nd}$ mode loss from strong dependence on d/Λ, locally bound domain, to a slow one, non-localized mode, is shown in curves 2001 and 2004. This point is located by the peak in curve 2003 for N=2 and 2006 for N=3. The number of layers used does not affect the position of the transition point, but it does narrow the peak in the $2^{nd}$ order derivative of the $2^{nd}$ mode loss. The absolute loss is much less in fibers with more layers. By contrast, as the mode becomes less localized, it will be more sensitive to perturbations such as micro-bends and macro-bends, which will quickly attenuate the mode in a real fiber.

Figure 21:
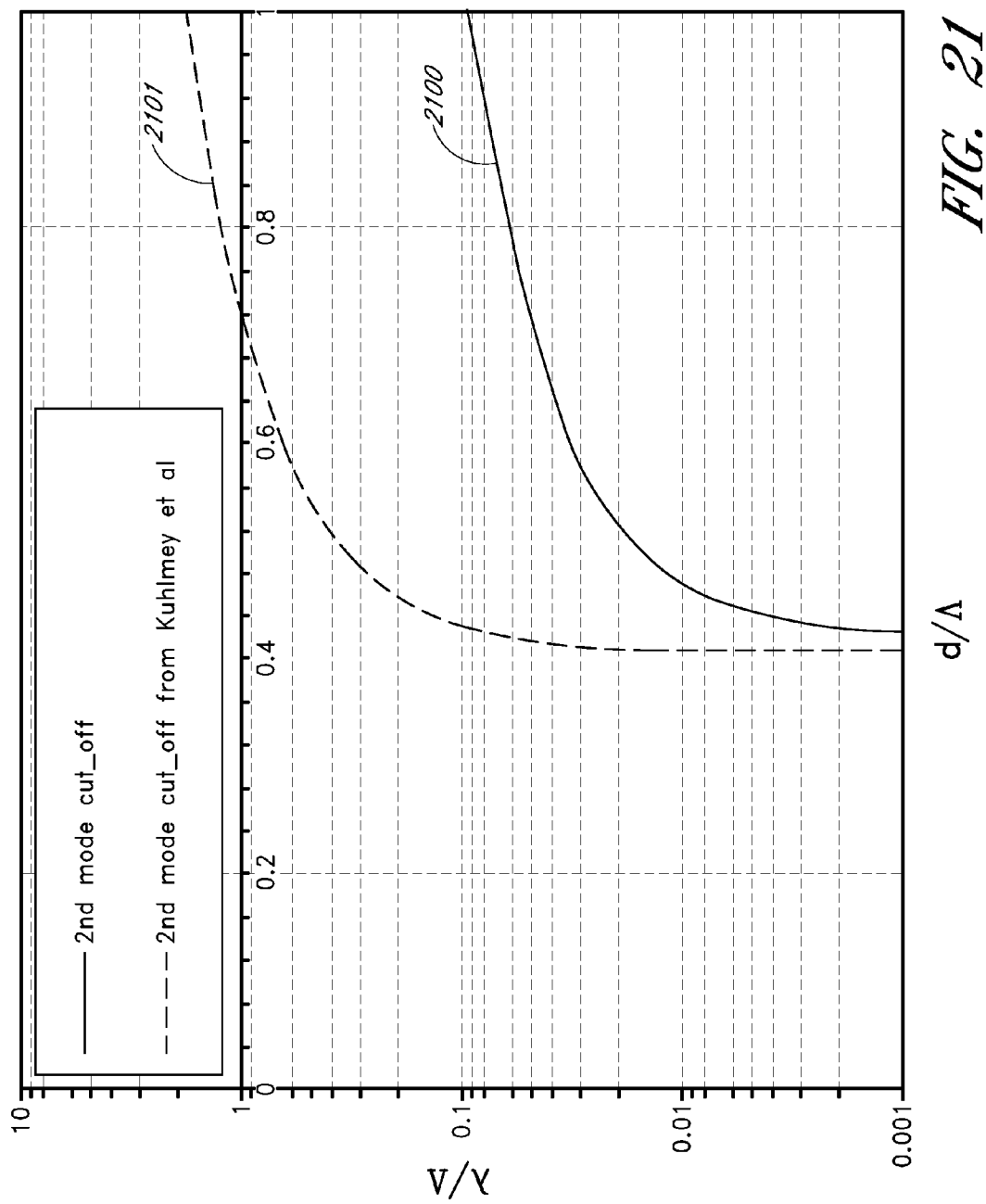
FIG. 21 is a plot illustrating the normalized wavelength λ/Λ versus d/Λ, showing a regime of single mode operation for the air-hole and all-glass fiber.

Kuhlmey's result (Kuhlmey et al, Optics Express, vol. 10, pp. 1285-1290, 2002) is illustrated in FIG. 21 in curves 2101. The $2^{nd}$ mode would be effectively cutoff to the left of curve 2101. Endless single mode operation of air-hole photonic crystal fiber is true for d/Λ<0.406. Curve 2100 is $2^{nd}$ mode cutoff for a relative refractive index difference of $\Delta_c=8.3 \times 10^{-4}$. The top of FIG. 21 is for small core diameter where λ/Λ is large while the bottom of FIG. 21 is for large core where λ/Λ is small. As it can be seen from FIG. 21, endless single mode operation can be achieved for d/Λ<0.425 for $\Delta_c=8.3 \times 10^{-4}$. In the large core regime, bottom part of FIG. 21, curves 2100 and 2101 are close while curve 2100 moves more to larger d/Λ in the small core regime, top of FIG. 21. At certain small core diameters, i.e. $\lambda/\Lambda>9.17\times10^{-2}$, single mode operation can be achieved for all d/Λ.

The calculated $2^{nd}$ mode cutoff corresponds to a relative refractive index difference $\Delta_c=8.3\times10^{-4}$. The $2^{nd}$ mode cutoff for larger relative refractive index difference than $\Delta_c=8.3\times10^{-4}$ would fall between curves 2100 and 2101 and $2^{nd}$ mode cutoff for smaller relative refractive index difference than $\Delta_c=8.3\times10^{-4}$ would fall below curve 2100.

Single mode operation can be achieved in the photonic crystal fibers, which has a large cladding comprising many periodic cladding features, but at the expense of worse bending performance due to smaller d/Λ. Leakage channel fiber, on the other hand, which needs only few cladding features, for example, one to 3 layers of holes, can provide better bend performance with sufficient level of mode filtering.

Furthermore, a core can be formed by missing more, e.g., 7 holes, in a hexagonal arrangement, instead of just one hole as in FIG. 19. See for example Limpert et al, Optics Express, vol. 14, pp. 2715-2720, 2006 and Schreiber et al, Optics Express, vol. 13, pp. 7622-7630, 2005). Small hole size around d/Λ<0.25 is used for the design in some embodiments. A similar all-glass design with low refractive contrast is also possible, but would possibly involve slightly larger holes than what would be used for the air-hole case.

A fiber's ability to bend gets worse when core diameter gets larger. In certain embodiments, at 2ρ>100 μm, large bend diameter, for example >1 m, is to be used. Amplifiers built with these fibers are designed primarily for use with a straight fiber having a short length of less than 1 meter, and having a highly doped core. This allows linear or near linear configuration to make the dimension practical. In some cases, fiber may take the form of short rods of 0.3 mm to several mm in diameters. Leakage channel fiber can be designed to operate in straight case by providing sufficient mode filtering. This can be done by reducing the cladding feature diameters, resulting in a lower value of the ratio d/Λ.

Although silica and fluorine-doped glass were used as the $1^{st}$ cladding material and the $2^{nd}$ cladding material, respectively, in the examples above, a relative refractive index difference up to $5\times10^{-3}$ can be obtained with doping silica glass with a dopant or a combination of dopants such as fluorine and boron.

In some embodiments, silica can be used for the first and second materials but only one of the materials may be doped, e.g., comprise doped silica. In various embodiments, for example, the cladding features are doped and have a lower refractive index than the background cladding material in which the cladding features are disposed.

In other embodiments, the background material is doped with, for example, a combination of germanium, phosphorous, tin, titanium, etc, while leaving the features undoped, for example, silica. It is also possible to dope both the background material and cladding features so that an index difference is produced. In other embodiments, doped silica can be used for the first and second materials but with different dopants or dopant levels for the first and second materials.

For example, germanium or/and phosphorus doped silica glass can be used as $1^{St}$ cladding material and silica glass, or fluorine or/and boron doped silica glass can be used as $2^{nd}$ cladding material to achieve relative refractive index difference as high as 3%. These glasses can be made to be of high purity with vapor phase deposition techniques and are physically, mechanically, chemically and thermally compatible.

Other silica glasses can also be used. Additionally, other non-silica glasses, such as phosphate glass, tellurite glass, chalcogenide glass, bismuth glass, fluoride glass etc. can also be used to implement the designs with low relative refractive index difference. In some embodiments, a slightly modified version of the same glass with slightly lower refractive index can be used as $2^{nd}$ cladding materials to achieve good compatibility. Other materials may also be used.

Preferred embodiments illustrated here for implementation of large core fibers include cladding features of low refractive index contrast. It worth noting that features with much larger refractive index contrast will also work as in the case where features are air holes.

Additional LCF Properties, Simulations, and Embodiments

FIGS. 15-18 illustrate examples showing confinement loss versus fiber diameter, coating refractive index, and wavelength. It was disclosed that a choice of diameter may affect losses, and that operation with a diameter optimized (or approximately so) to provide both higher loss for the second order modes and lower loss for the fundamental modes may be beneficial. A finite fiber diameter, a relative change in fiber diameter, coatings on the optical fiber, and wavelength may also affect mode profiles in various ways Although various suitable alternatives are available for coating a fiber, commonly used coatings are either a high index polymer or low index coating. A high index polymer coating is typically employed for standard optical fibers, whereas a low index coating is used to form a double clad fiber which supports a multimode pump, with total internal reflection at the interface between the low index coating and cladding region 103 providing for pump guide operation.

Referring back to the LCF of FIG. 1-b, strong optical coupling may be present between the core formed by the six low index features 102 and the first cladding region 103 beyond the six low index features.

Without subscribing to any particular theory, it is instructive to further analyze fiber performance with a coating 104 included. The choice of a high index or low index coating will affect propagation characteristics of the modes. Various embodiments may utilize An LCF as a gain fiber so as to produce high peak or average powers A high power multimode pump may typically be used in combination with a double clad fiber.

Referring again to the FIG. 1-b, an example of LCF gain fiber is a LCF 100 with coating 104 being a low index polymer coating, where a multimode pump is guided by total internal reflection at the interface between cladding 103 and low index coating 104. A single spatial mode laser beam is guided in the core 101, at least of portion thereof being doped with active ions.

Figure 22:
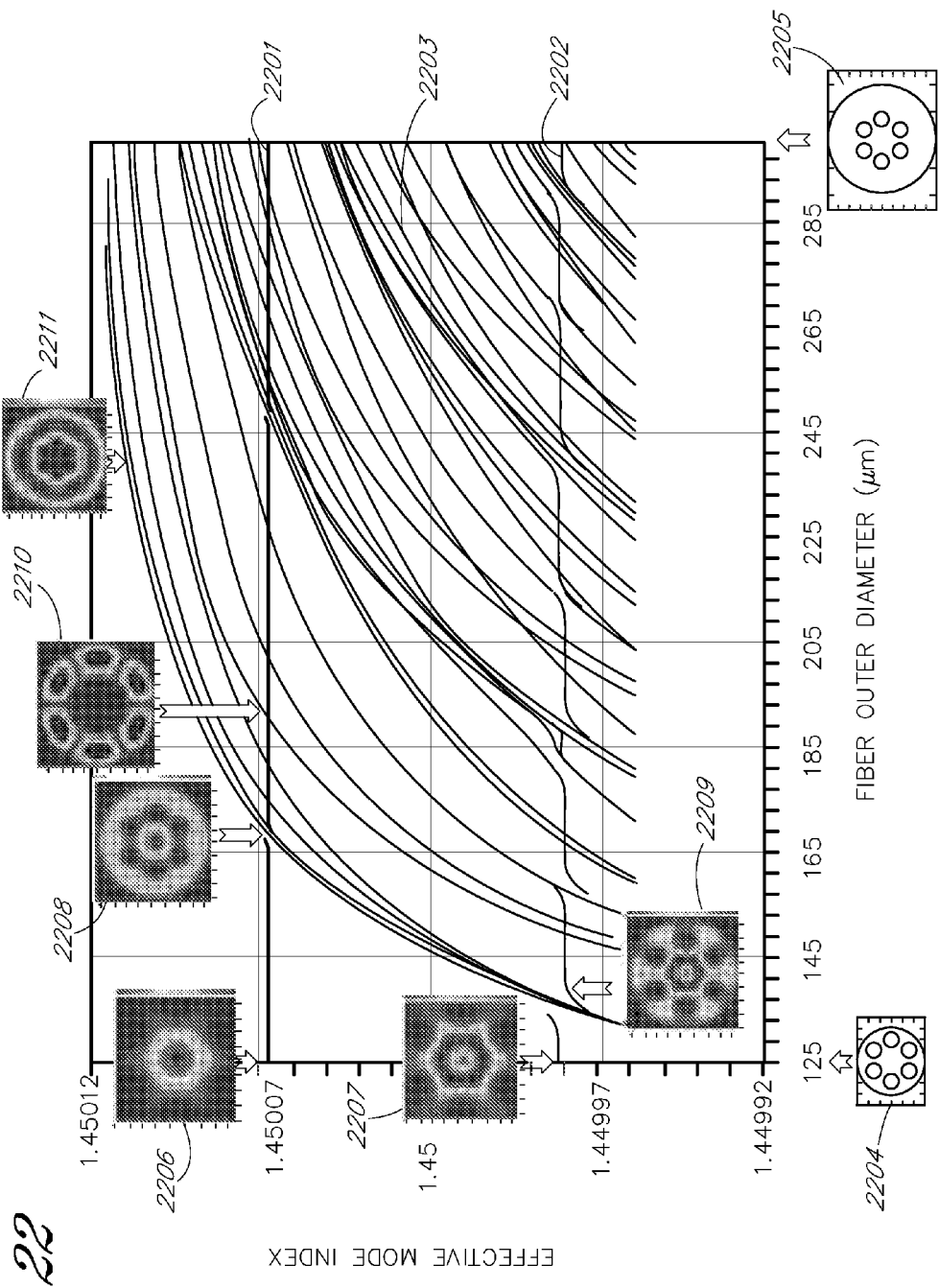
FIG. 22 is a plot illustrating the effective modal index versus fiber diameter, and illustrates the fundamental mode, second order mode, several higher order modes, and discontinuities referred to herein as "anti-crossings". Several example calculated mode profiles are also illustrated.

Many modes are guided in such a double clad LCF when considering the coated fiber. FIG. 22 illustrates a number of computed lower order modes for a LCF with 2ρ=50 μm, d/Λ=0.7, $\Delta n=1.2\times10^{-3}$ and $n_{coating}=1.37$, the results obtained by varying the fiber outer diameter. The dispersive refractive index of the background silica glass was also simulated by a standard empirical formula at λ=1.05 μm.

Figure 22A:
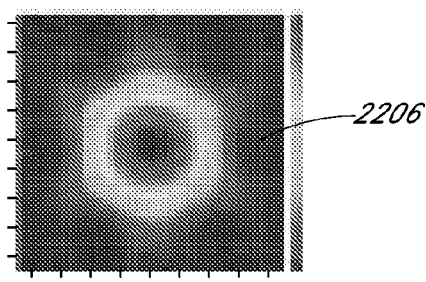
FIGS. 22A-22F are larger views showing the example calculated mode profiles of FIG. 22.
Figure 22D:
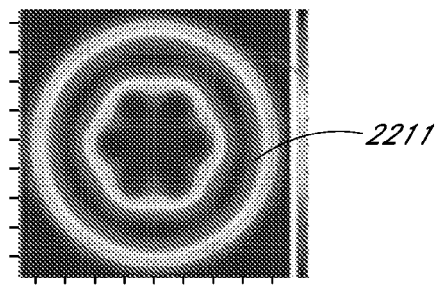
Figure 22B:
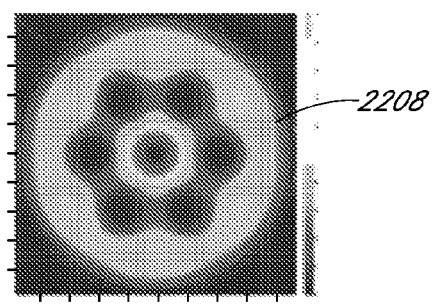
Figure 22E:
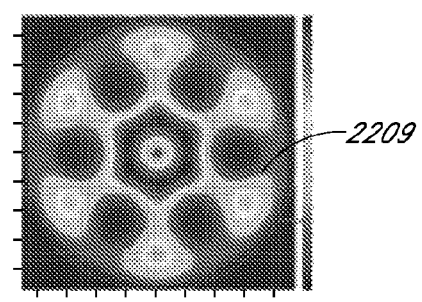
Figure 22C:
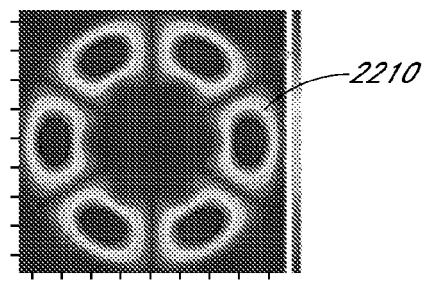
Figure 22F:
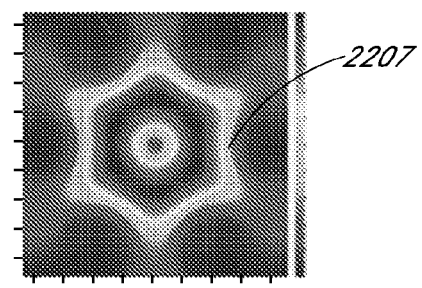

As noted above and shown in FIGS. 15-18, the choice of diameter may also significantly affect the confinement loss of the fundamental and higher order mode. The fundamental core mode is represented by line 2201 (which is substantially horizontal in FIG. 22), and the second core mode by line 2202 respectively, where the line 2202 corresponding to the second core mode exhibits noticeable discontinuities at various fiber diameters. Similar discontinuities occur along the section with line 2201, but are less distinct. All the other modes are represented by lines 2203 which effectively appear as a family of curves having strong dependence on the fiber diameter, wherein the modal index generally increases with increasing fiber diameter. The simulations were performed for fiber diameters of 125 µm, cross section illustrated as 2204, to fiber diameter of 300 µm, cross section is illustrated as 2205. Fundamental mode profile 2206 and 2nd mode profile 2207 at a fiber diameter of 125 µm are illustrated as insets in FIG. 22 and as enlarged views in FIGS. 22A and 22F, respectively.

A fundamental core mode for a conventional fiber generally corresponds to an $LP_{01}$ or $TEM_{00}$ like mode. For example, mode 2206 at 125 µm is $TEM_{00}$ like (see FIG. 22A) The fundamental mode is generally the mode with the largest effective index.

FIG. 22 shows that the fundamental core mode of the LCF is no longer the fundamental mode as the fiber diameter increases. For example, beyond about 165 µm the fundamental mode shape is altered, as exemplified by mode 2208 (see FIG. 22B). Moreover, a fundamental mode of the LCF at diameter approximately 235 µm, which has a highly non-Gaussian profile, is a mode 2211 with most of its power in the second cladding region 103 beyond the six low index features (see FIG. 22D). In other words, for sufficiently large fiber diameter, the fundamental core mode is a higher order mode of the LCF fiber. In any case, unless otherwise specified, a fundamental mode as used herein corresponds to a fundamental core mode.

However, exciting and propagating the fundamental core mode generally does not require a detailed analysis of each LCF, or more than a conventional optical system. For example, exciting a $TEM_{00}$ like mode only requires focusing an input beam having a pattern well correlated to the mode into the core. An extremely close match is generally not required because undesirable higher order modes are suppressed during propagation through the LCF.

Figure 23:
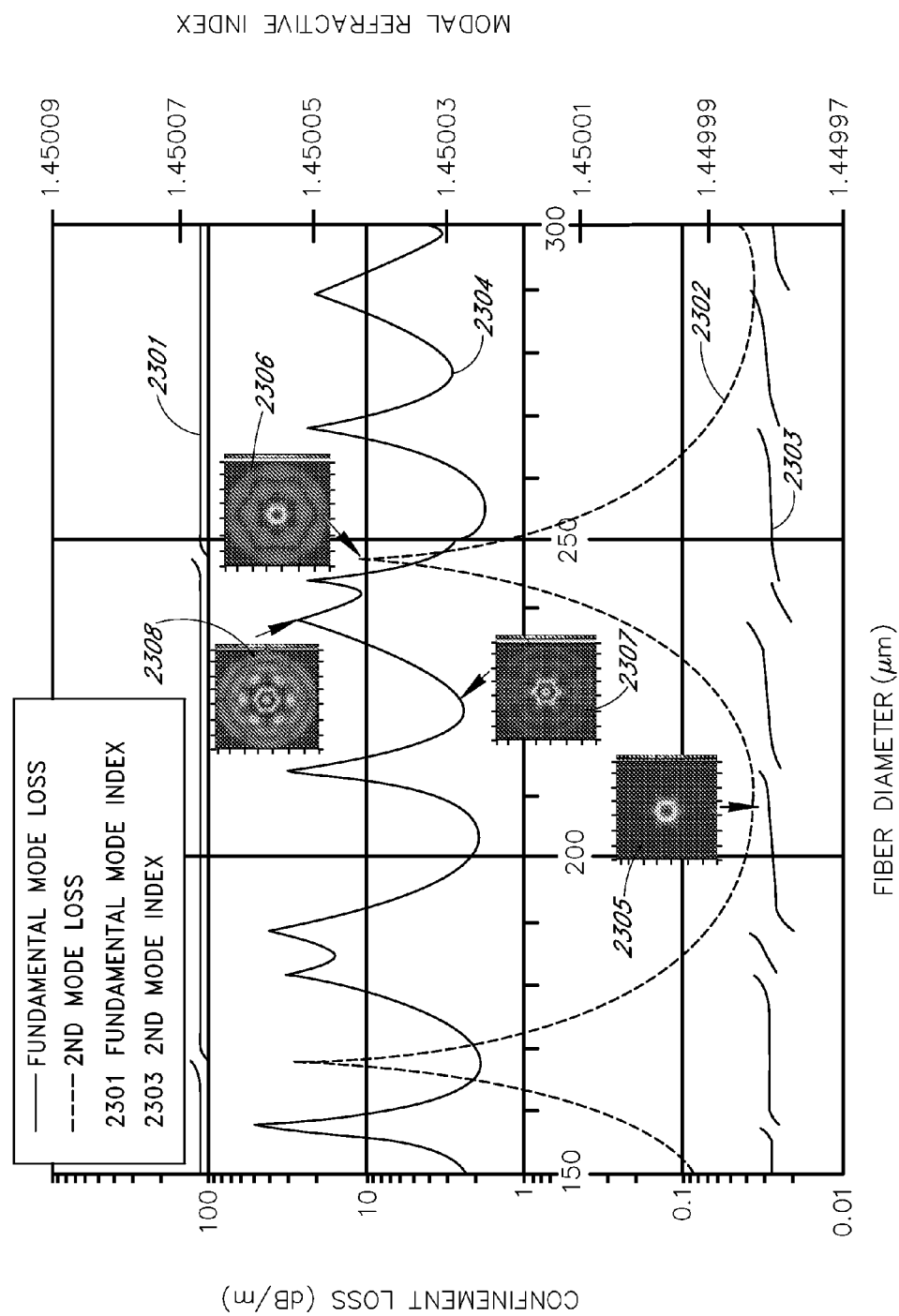
FIG. 23 is a plot illustrating confinement loss and modal index versus fiber diameter, and further illustrates the relative confinement loss of the fundamental and second order modes at anti-crossings. Several example calculated mode profiles are also illustrated.

The locations in FIG. 22 where apparent discontinuities are found are called "anti-crossings" (e.g.: the modes crossover each other), and have significance for relative confinement loss. Strong and weak anti-crossings are shown in FIG. 22, and respectively correspond to relatively large and small magnitude discontinuities, respectively, in modal index. Any two distinct modes cannot have a same modal index, and the anti-crossings result. The anti-crossings correlate to the relative confinement loss of various modes as shown in FIG. 23, and will be discussed further in following paragraphs. Strong anti-crossings correspond to strongly interacting modes, for example 2208 and 2209 which have similar spatial features. Such modes have modal indices that are close in value One example is a fundamental core mode 2208 at ~170 µm or a second core mode 2209 at ~135 µm. At weak anti-crossings, e.g. the intersecting mode 2210 at ~195 µm, mode spatial variations are more distinct. Therefore, the anti-crossings may be exploited to increase mode discrimination, and are of significance in certain fiber embodiments.

Many more strong anti-crossings exist for the second core mode. Therefore, in embodiments utilized in a fiber amplifier or laser, the second order mode may have a larger part of its power in the cladding where there is no gain. More importantly, in some cases, the increased reliance on the glass and coating boundary for second order mode guidance increases power leakage to coating and other modes through macro and micro bending as well as perturbation-induced coupling at the glass and coating interface.

The above observations further confirms, that it may be beneficial to select fiber diameters that provide both higher loss for the second order modes and lower loss for the fundamental. In various embodiments a fiber diameter is chosen such that the second core mode is at a strong anti-crossing. Higher order mode suppression and much improved single mode operation in the core results.

It is instructive to further analyze how a choice of low or high index coating effects propagation, while recognizing that the low index coating is typical for a double clad configuration. In a double clad LCF with lossless low index coating, all guided modes are theoretically lossless. Total internal reflection occurs for the large number of guided modes at the glass 103 and coating 104 boundary. Although all modes are guided, the modes which are guided by the glass 103 and coating 104 interface with less guidance from the inner cladding features 102 are much more susceptible to macro and micro bending. The susceptibility may be caused by the much larger spatial presence and glass and coating interface imperfections. Power is coupled among these modes, reducing their effective propagation distance in the core. Robust single mode propagation in the core under these conditions occurs for only the fundamental core mode. In a case where the core is doped with active ions, only the fundamental core mode will be strongly amplified. This is not, however, a critical factor in higher order mode suppression.

In contrast to the LCF with low index coating, all modes are leaky in a LCF with a high index coating. Modes which rely strongly on low index coating and less on the inner cladding features for guidance will leak out quickly. Confinement loss, in this case, provides a good measure of how much a mode is guided by the inner cladding features, and, consequently, of mode discrimination in propagation. The respective mode profiles remain unchanged when the higher index coating is replaced by a lower one, despite some loss. Consequently, the analysis for the case of high index coating provides for a good measure of mode robustness for the case of low index coating.

Figure 23A:
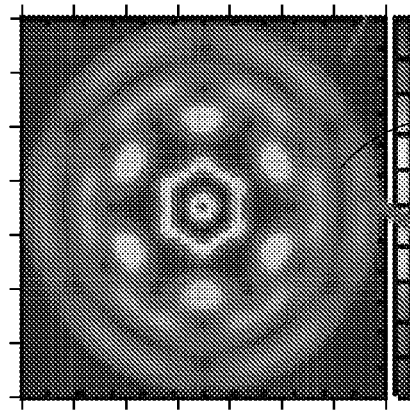
FIGS. 23A-23D are larger views showing the example mode profiles of FIG. 23.
Figure 23C:
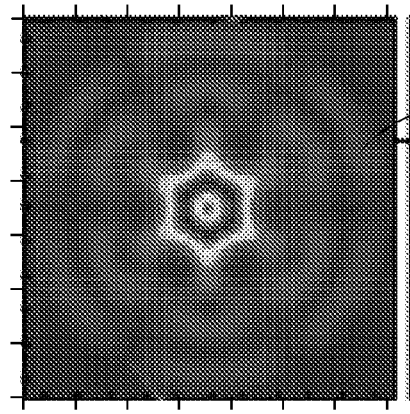
Figure 23B:
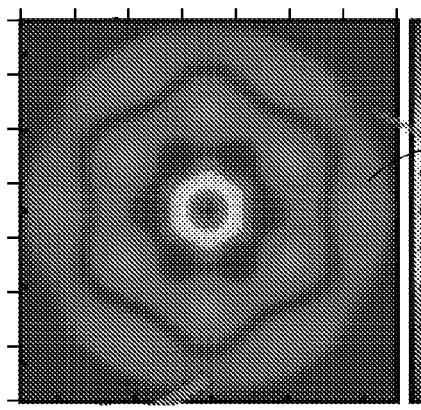
Figure 23D:
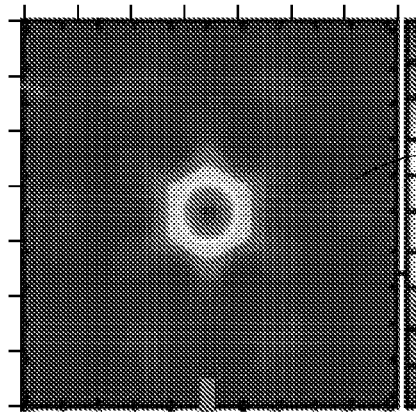

Aside from some transmission loss, the peak locations of relative confinement of the example LCF illustrated in FIG. 22 is not significantly affected by a choice of coating. The confinement losses of the same LCF in FIG. 22 with a high index coating of $n_{coating}$=1.54 and λ=1.05 µm are shown in FIG. 23. Lines 2301 and 2303 are effective indexes of fundamental and 2nd mode respectively. Dashed line 2302 and solid line 2304 are confinement losses for the fundamental and 2nd mode respectively. The peaks in the confinement loss are from strong anti-crossings. It is interesting that the peaks remain at the same locations as those shown in FIG. 22 with low index coating. Example fundamental mode profiles at an anti-crossing and away from an anti-crossing are illustrated as insets 2306 and 2305, respectively, in FIG. 23 and as enlarged views in FIGS. 23B and 23D, respectively. Example 2nd order mode profiles at an anti-crossing and away from an anti-crossing are illustrated as insets 2308 and 2307, respectively, in FIG. 23 and as enlarged views in FIGS. 23A and 23C, respectively.

Referring again to FIG. 23, a high ratio of confinement loss of the $2^{nd}$ order mode to the fundamental is achievable with several fiber diameters, and maximized, in this example, for a diameter about 215 µm. If confinement loss is the only factor to be considered, then in one embodiment the clear choice to maximize higher order mode loss is a fiber diameter of about 215 µm, while being aware that the ratio may change rapidly for a small change in diameter. A significant increase of mode discrimination can be achieved with either a high or low index coating by configuring the fiber with a fiber diameter so as to operate at a strong second core mode anti-crossing.

However, specific design considerations may lead to selection of a fiber diameter that produces a non-maximized higher order mode loss so as to achieve other benefits. In various embodiments a choice of fiber first cladding dimension, for example diameter $2\rho_0$ of a circular first cladding, may be made based on cost and various design goals. For example, for an amplifier or laser design considerations exist for pumping the gain medium. Because the present cost of high brightness pump diodes is relatively high, a larger fiber diameter corresponding to mode 2308 may be preferred in some embodiments. FIG. 23 shows that the ratio of confinement loss of the $2^{nd}$ order mode to the fundamental is not maximized at the larger diameter, but still exceeds 100:1. The larger fiber diameter facilitates pump light coupling into a pump guide with relatively low brightness pump diodes.

Conversely, if a design goal is to increase or maximize peak pulse or CW power then high brightness diodes and state-of-the art delivery optics may be utilized to couple energy into the smaller diameter fiber, for example an approximate diameter that increases or maximizes the $2^{nd}$ order mode loss and reduces or minimizes the fundamental mode loss. The delivery optics may include miniature optical elements to deliver energy from a single high brightness diode or an array or diodes. If a fiber diameter is very large, for example greater than 300 µm in some embodiments, other considerations arise which affect beam propagation. Therefore, some LCF embodiments may utilize inexpensive diodes and a large pump cladding dimension, while others may utilize a smaller diameter pump guide and high brightness diodes. In some embodiments a smaller diameter pump guide and high brightness diodes will result in increased pump power over a decreased length of fiber resulting in high peak power without significant non-linear effects.

Therefore, in various embodiments a fiber diameter in the range of about 125 µm to 300 µm may be utilized, and a ratio of fundamental to $2^{nd}$ order mode confinement loss may generally exceed 10, or may be in the range of about 10 to 100. In some embodiments the confinement loss ratio may exceed 100. For example, a ratio of confinement loss may be up to about 500, or perhaps approach 1000 for a fiber a few meters in length (e.g.: 1 m, 2 m, 5 m). Higher order mode loss may exceed 10-20 dB over a 5 m length, and may be in the range of about 1-4 dB/m, 3-6 dB/m, or other ranges.

The pump energy may be guided by total internal reflection at the interface between cladding region 103 and coating 104 as shown in FIG. 1b. In various embodiments a low index glass 107, as illustrated in FIG. 1c, may form a pump cladding. In some embodiments the pump cladding may be formed as an array of air holes.

Some embodiments may utilize a cladding region 103 as a pump guide. Region 103 may have a dimension in the range of about 150-400 µm, and may exceed about 500 µm. A core dimension may be in the range of about 50-150 µm. In some embodiments the core dimension may be about 20-40% of the pump guide dimension, and may be sufficiently small to maximize higher order mode loss and/or minimize bend loss.

Examples and properties of LCFs with low index coating have been used to illustrate properties of double clad fibers. Other suitable alternatives may be utilized. For example, in at least one embodiment a glass with low refractive index may be used as an alternative to the low index coating. The glass may be highly fluorine-doped silica. Another alternative may be one or more layers of air holes to replace the low index coating. Referring again to FIG. 1B, the layer of air holes may be formed to replace coating 104. Furthermore, additional silica (not shown) can be added beyond the highly fluorine-doped silica and air holes. Many variations are possible.

Figure 24:
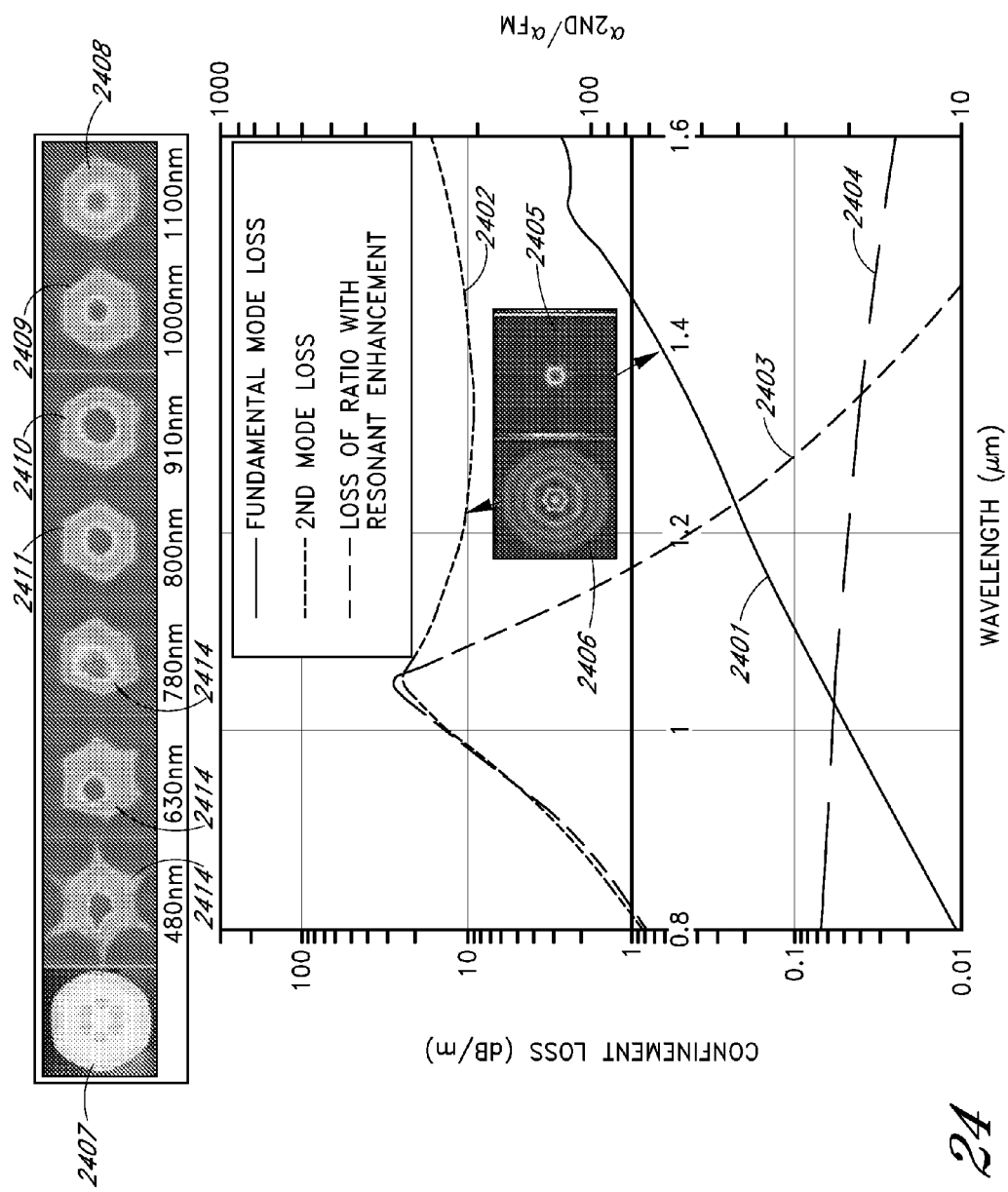
FIG. 24 is a plot illustrating confinement loss and loss ratio of the second order mode to fundamental mode versus wavelength. Several example calculated mode profiles are also illustrated.

Wavelength sensitive properties of an LCF are also of interest, FIG. 24 illustrates an example of an LCF operating at the strong second core mode anti-crossing at a fiber diameter of 268 µm. Confinement losses 2401 and 2402 for the fundamental and 2nd modes respectively are simulated for a range of wavelengths. Fundamental mode profile 2405 and 2nd mode profile 2406 are illustrated as insets in FIG. 24 and in enlarged views in FIG. 24A. FIG. 24 demonstrates that a loss ratio 2403, $\alpha_{2nd}/\alpha_{FM}$, as high as 337 is achieved at λ=1.05 µm and $\alpha_{2nd}/\alpha_{FM}$ is larger than 100 well over a range of two hundred a standard LCF, without considering the region beyond the low index features. Resonant enhancement as used herein refers to enhanced $2^{nd}$ order mode suppression as shown, for example, in FIGS. 23 and 24. However, it is the pre-selected diameter and not wavelength that provides the enhancement in some fiber embodiments. The enhanced higher order suppression is obtained in some embodiments by selecting at least a suitable diameter, and/or generally operating an LCF at a $2^{nd}$ order mode anti-crossing. For example, as shown in FIG. 24, operating this 268 µm-diameter fiber embodiment at a wavelength of about 1.05 µm provides significant higher order mode suppression (e.g., $\alpha_{2nd}/\alpha_{FM}$ approximately 337).

Fabricated Passive and Active LCFs, and Examples of Performance Data

The following paragraphs illustrate examples of performance of both passive PCFs and an LCF power amplifier. Some parameters of interest include beam quality and loss variations with bending, wavelength dependence of propagation, and refractive index variations caused by a stress-optic effect.

Figure 24A:
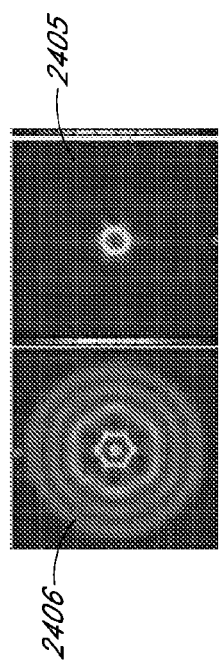
FIGS. 24A and 24B are larger views showing the example mode profiles of FIG. 24.
Figure 24B:
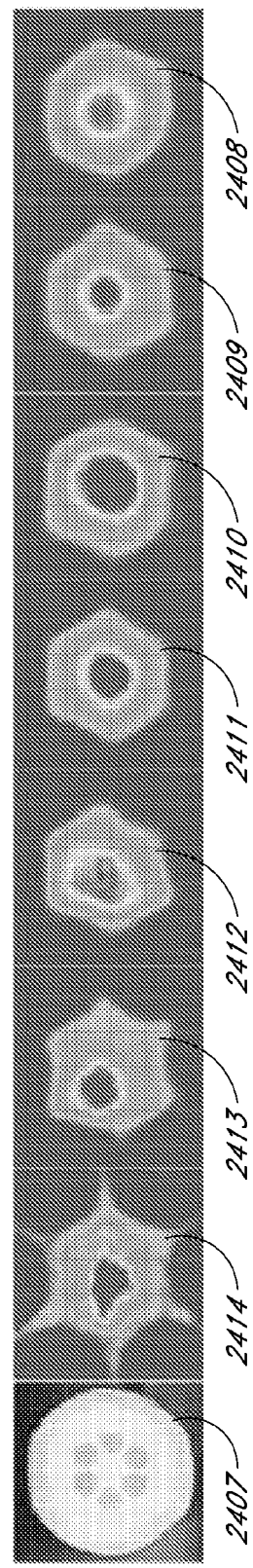

Several LCFs with various core diameters, from 30 to 180 µm, and with d/Λ from 0.7 to 0.9, were fabricated using the well known stack-and-draw technique, where rods of the same diameters are stacked hexagonally to form a bundle. The bundle is then inserted into a tube to be drawn into fibers with appropriate atmosphere and vacuum control inside the tube. An ytterbium-doped fiber, was also fabricated. The non-circular cross section 2407 is shown in FIGS. 24 and 24B. The LCF has $2\rho$=52.7 µm, d/Λ=0.8, and a coating with $n_{coating}$=1.37. The outer glass diameter is 254.2 µm (measured "flat-to-flat," e.g., from a substantially flat surface to an opposite substantially flat surface), and the effective mode area is calculated to be 1548 µm$^2$ with a measured pump absorption of ~11 dB/m at 976 nm. The center part of the core is doped with ytterbium ions. The ytterbium-doped glass was made with a specially developed process to produce a glass with excellent refractive index uniformity, and precise refractive index match to the rest of the fiber. These steps preserve the desired mode pattern as well as robust single mode operation in this example.

In a first test of robustness of single mode propagation of this LCF, the output of a 6 m fiber coiled loosely in ~50 cm diameter coils was collimated and imaged by a CCD camera while input condition was adjusted. Note that this example LCF is a double clad ytterbium-doped fiber, but in this experiment the fiber was used in an unpumped configuration. Nevertheless the output mode pattern was stable and no higher order mode was observed even when the launch condition was adjusted far from optimum, proving that the higher-order modes had a much higher propagation loss even in an unpumped double clad amplifier fiber. During this first test, the output mode pattern was stable and remained fundamental mode while the fiber was handled by pressing and bending between two fingers.

To characterize the wavelength dependence of propagation, the output modes in a wavelength range from 480-1100 nm after propagation of a super-continuum source through a 20 cm length of this LCF were captured by a CCD and are shown as images 2408-2414 in the top inset of FIG. 24 and in FIG. 24B. The silicon CCD responsivity is very low beyond 1100 nm so no data was acquired. Clear broad band single mode operation is evident above 800 nm while there are increasing signs of higher order mode content towards shorter wavelength below 800 nm. FIG. 24 shows that the simulated second order mode gets increasingly transmitted towards shorter wavelength reaching a loss of ~1 dB/m at 800 nm for this LCF with 50 μm core. Despite the fact that this LCF has low index coating while the simulated fiber has high index coating, the simulation provides good agreement with the experiment.

Figure 25:
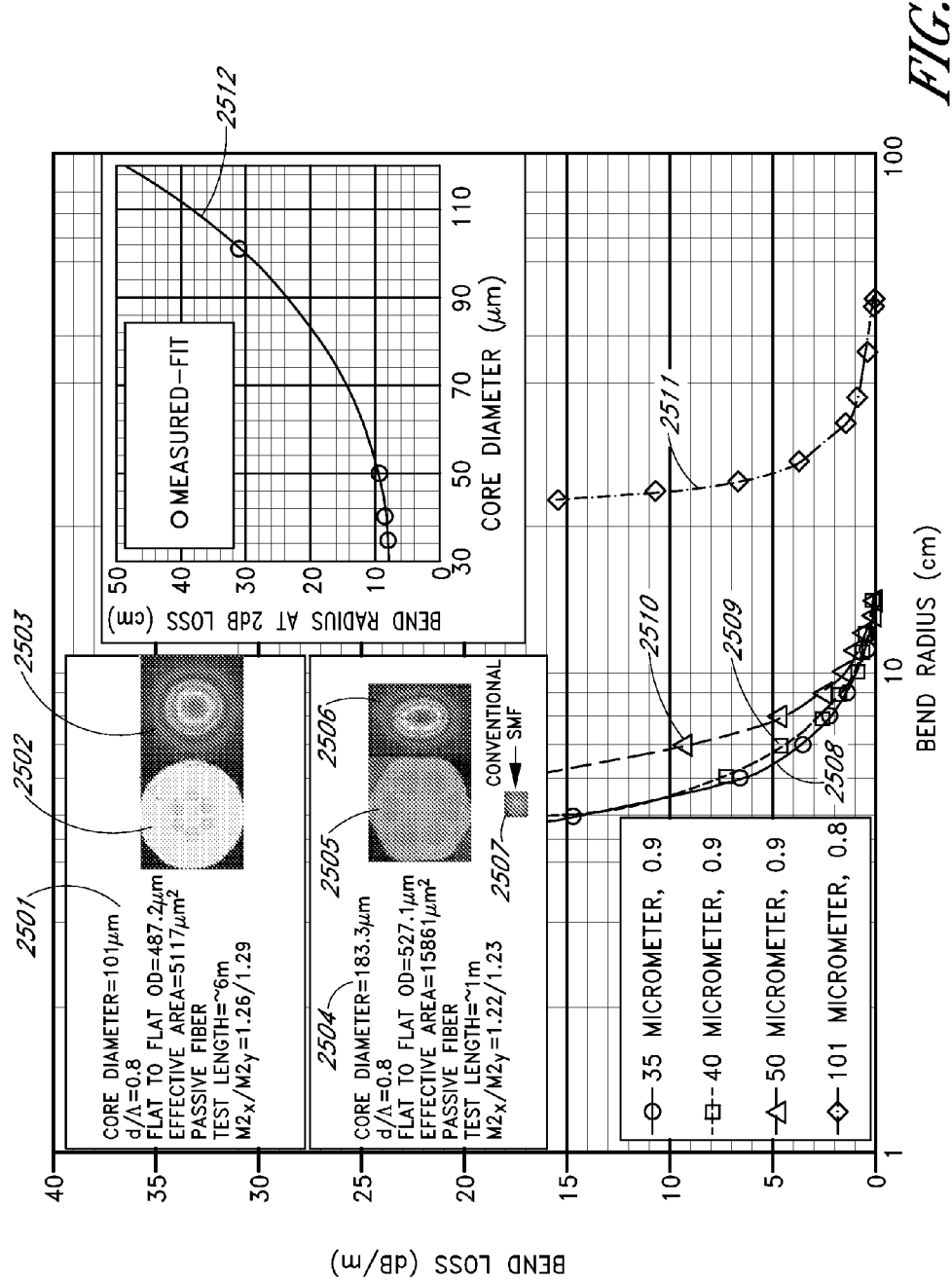
FIG. 25 includes plots illustrating performance of a fabricated leakage mode fiber. Several example mode profiles are also illustrated. The measured critical bend radius at 2 dB/m is plotted in an inset.
Figure 25A:
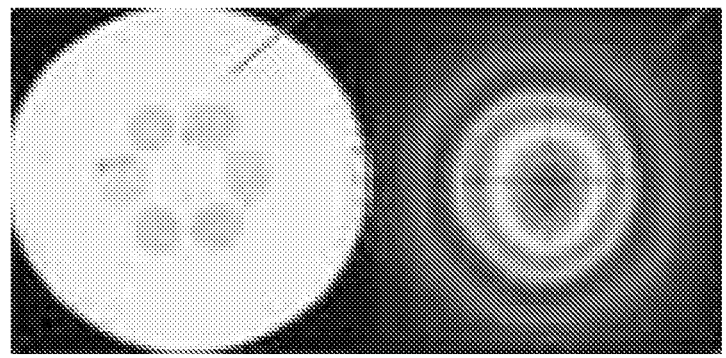
FIGS. 25A and 25B are larger views showing the example mode profiles of FIG. 25.
Figure 25B:
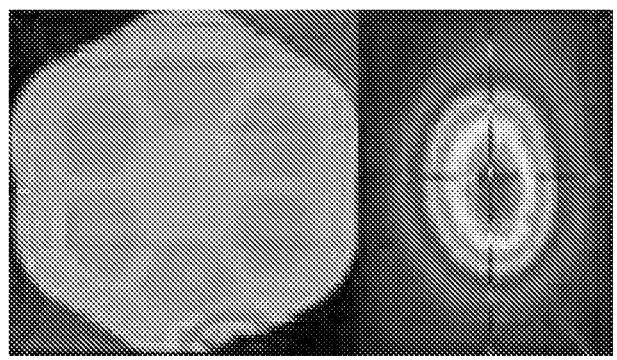

FIG. 25 illustrates numerous characteristics and performance data in inset 2501 of a passive LCF with $2\rho=101$ μm, $d/\Lambda=0.8$ and a coating with $n_{coating}=1.54$. The effective mode area of this LCF was calculated to be 5117 μm$^2$. A cross section 2502 of the fiber is shown in the inset 2501 and in FIG. 25A. A length of this LCF ~6 m long was loosely coiled in a 1 m coil. M$^2$ is commonly used for beam quality measurement. A M$^2$ value of 1 corresponds to a 'perfect' Gaussian-like beam profile, with all practical beams having an M$^2$ value >1. The Measured M$^2$ with an ASE source and Spiricon M$^2$-200 is M$^2_x=1.26$ and M$^2_y=1.29$. FIG. 25 also illustrates characteristics and performance in inset 2504 of another LCF with $2\rho=183.3$ μm, $d/\Lambda=0.8$ and a coating with $n_{coating}=1.54$. A cross section 2507 conventional single mode optical fiber (SMF) of the same scale is also shown for comparison with the cross section 2505 shown in the inset 2504 and in FIG. 25B. The effective mode area of this LCF is calculated to be 15861 μm$^2$, believed to be a record effective mode area and over two orders of magnitude improvement over conventional single mode optical fiber. The measured M$^2$ of a 1 m straight fiber with an ASE source is M$^2_x=1.22$ and M$^2_y=1.23$. Measured mode pattern 2503 and 2506 at the output of the fibers are also shown in the insets 2501 and 2504, respectively, in FIG. 25 and in FIGS. 25A and 25B, respectively.

Figure 25C:
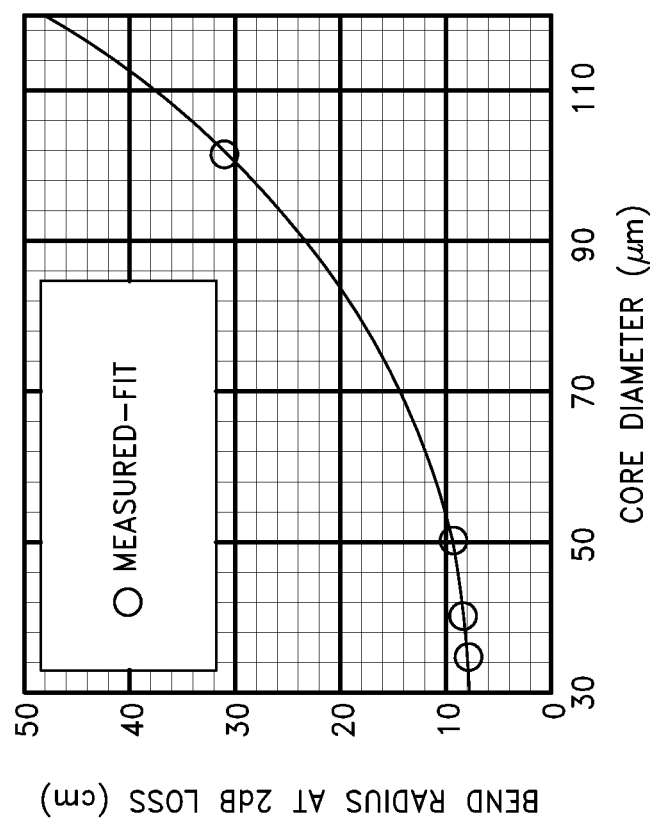
FIG. 25C is a larger view of the inset of FIG. 25 showing the measured critical bend radius at 2 dB/m.

FIG. 25 illustrates bend loss measurements 2508, 2509, 2510 and 2511 in four LCFs with core diameters of 35 μm, 40 μm, 50 μm, and 101 μm respectively. The fiber was first laid in a prefabricated circular groove with various diameters. Transmission at each coil diameter was then measured after the output mode pattern was confirmed. Absolute transmission of the fibers was measured by a separate cut-back measurement. The absolute transmission was then used to re-calibrate the relative bend loss measurement. The ability of some embodiments of LCFs to be bent diminishes very quickly as the core diameter increases. This effect is fundamentally related to the fact that the ability of guided modes to navigate a bend is related to how rapidly a mode can change its spatial pattern without breaking up while propagating, e.g. maintain adiabatic transition. As the mode gets larger, this ability to change diminishes very quickly in some cases. The measured critical bend radius at 2 dB/m is plotted as open circles in the inset in FIG. 25 and in FIG. 25C and fits well to the $\rho^{2.5}$ dependence 2512.

The examples illustrated in FIGS. 24-25 correspond to passive fibers, e.g.: no pump beam was injected during testing.

Use of large core LCFs for high peak pulse or CW power application is of considerable interest. By way of example, FIGS. 10-13, and 16-21 and the associated text of U.S. patent application Ser. No. 11/134,856, filed May 30, 2005, published as U.S. Patent Publication No. 2006/0263024, and entitled "Single Mode Propagation in Fibers and Rods with Large Leakage Channels", show various device and system configurations. For example, FIG. 11 of U.S. application Ser. No. 11/134,856 schematically illustrates an embodiment of a large mode area fiber comprising a core doped with rare earth ions that is used in a fiber amplifier or in a laser pumped by a multimode pump source.

Figure 26:
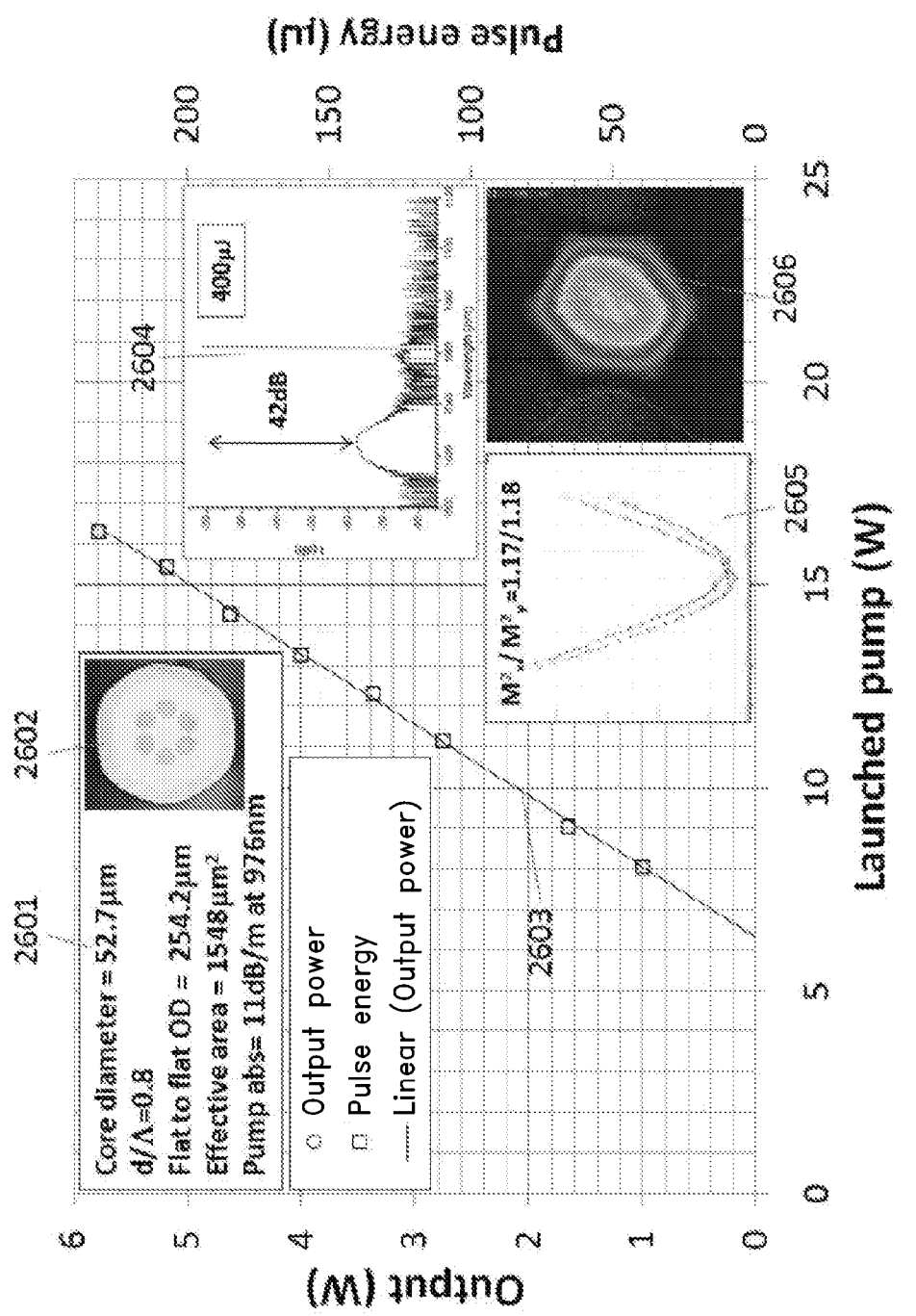
FIG. 26 includes plots illustrating performance of a fabricated optical fiber in a fiber amplifier system.
Figure 26B:
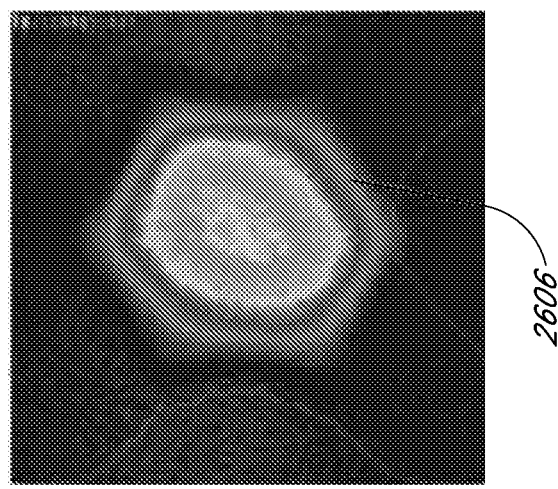
FIG. 26B is a larger view of the output mode shown in FIG. 26.
Figure 26A:
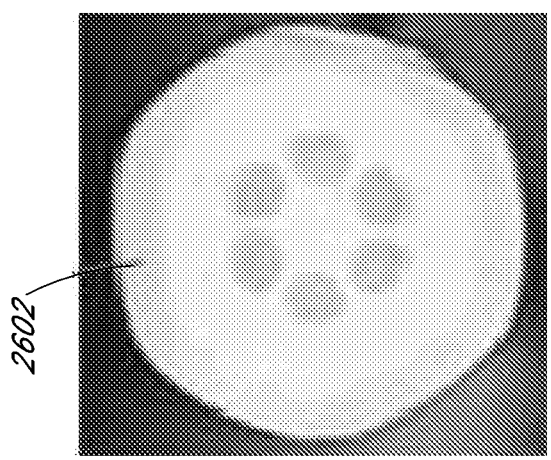
FIG. 26A is a larger view of the cross section of the fiber shown in FIG. 26
Figure 26C:
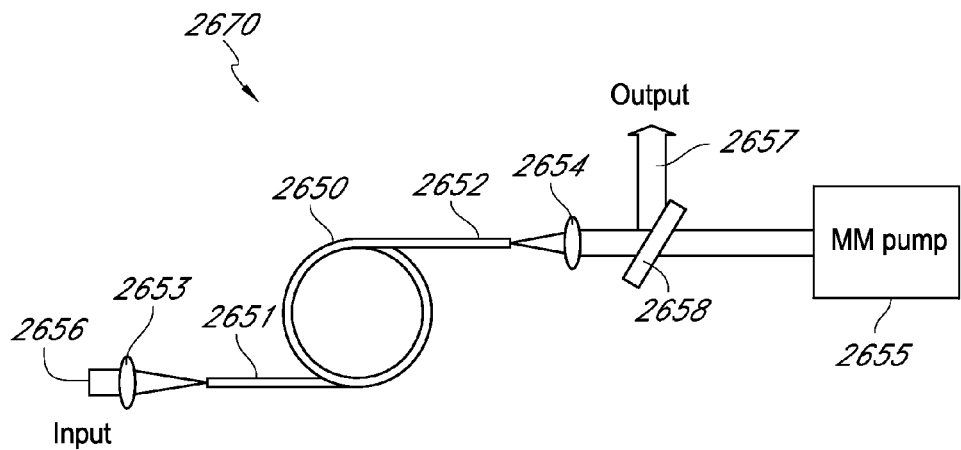
FIG. 26C schematically illustrates an embodiment of a large mode area fiber comprising a core doped with rare earth ions that can be used in a fiber amplifier or in a laser pumped by a multimode pump source.

Referring to FIG. 26C of the present application, FIG. 26C schematically illustrates an embodiment of a large mode area fiber comprising a core doped with rare earth ions that can be used in a fiber amplifier or in a laser pumped by a multimode pump source. In this embodiment, the fiber has straight input and output ends 2651, 2652 and a coiled section therebetween. A multimode pump 2655 is used to pump the amplifier or laser using a coupling lens 2654. Input beam 2656 is launched into fiber 2650 through a lens 2653. Output 2657 is separated by dichroic mirror 2658.

Initially, to test fiber performance in the active regime, a single stage fiber amplifier was constructed based on 3 m of the ytterbium-doped LCF shown and described with reference to FIGS. 24 and 24A, 24B. FIG. 26 illustrates characteristics and performance in inset 2601 of this fiber with its cross section 2602 (also shown in FIG. 26A). The amplifier fiber ends were angle cleaved to ~8 degrees. This amplifier was seeded by a micro-chip laser operating at 1062 nm with 125 mW output at 25 kHz repetition rate (5 μJ pulse energy) and was counter-directionally pumped. The measured pulse duration of the micro-chip laser was 600 ps. The amplifier performance 2603 is summarized in FIG. 26. The measured amplification slope efficiency is ~57%. A maximum power of 7 W (320 μJ) was obtained before the onset of lasing at the amplifier gain peak of ~1026 nm (e.g.: the available 1062 nm input was displaced from the gain peak). The measured M$^2$ (shown in inset 2605) at 7 W output power was M$^2_x=1.17$ and M$^2_y=1.18$ for the two orthogonal orientations, respectively. Output mode 2606 is also shown in the inset in FIG. 26 and in FIG. 26B.

The possibility to handle high peak powers with this LCF was tested using a two stage LCF fiber amplifier configuration. Each stage of the LCF amplifier included a straight input and output end with a coiled portion therebetween, and having a coil diameter of about 0.5 m. The amplifier output was limited by available pump power. Operation below a non-linear threshold of the fiber was apparent because no obvious signatures of self-phase modulation and Raman scattering were observed. A measured spectrum 2605 with 400 μJ pulse energy is shown in FIG. 26. The amplified spontaneous emission level was over 40 dB below amplified signal level in the output spectrum 2605.

In various embodiments an LCF amplifier and/or laser may provide for operation at pulse energies in the range of 10 μJ-10 mJ, and a preferred range of operation from about 100 μJ to about 1 mJ in some embodiments. CW or pulsed operation may be utilized, for example for production of pulses at KHz or MHz repetition rates. In at least one embodiment an output beam may generally be of low numerical aperture and may be particularly well suited for fiber delivery of an output beam for applications including, for example, welding, cutting, and marking. In various embodiments an LCF fiber may be employed for generation of ultrashort pulses, for example in a chirped pulse amplification (CPA) system. With appropriate beam shaping and magnification optics, micromachining applications may be carried out using high-peak power pulses, with high beam quality, for example with $M^2$ values in the range of about 1.1 to 1.5, using an all fiber system. In some embodiments frequency converters may be utilized to produce high peak power visible or near UV pulses. In some embodiments nearly diffraction limited spot sizes in the range of approximately 1 µm to 50 µm may be produced.

Various laser or amplifier embodiments may be utilized in an all-fiber design for generation of high peak power pulses in the femtosecond, picosecond, and nanosecond regimes with negligible non-linear effects. In one example embodiment a core diameter of about 70 µm-100 µm or larger may be used to produce nanosecond pulses having energy of a few mJ to about 10 mJ. Ultrashort pulses with exemplary pulse widths of about 1-10 ps may be produced with output energies in the range of about 10 µJ to a few hundred µJ.

Figure 26D:
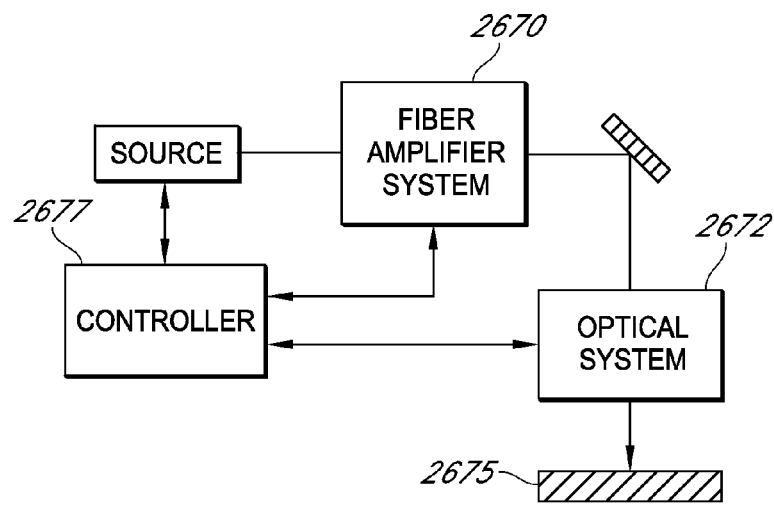
FIG. 26D schematically illustrates an embodiment of a laser-based material processing system utilizing a large mode area fiber amplifier.

FIG. 26D schematically illustrates an exemplary laser-based material processing system which may be configured with the large mode area amplifier system 2670 of FIG. 26C. The system 2670 may also be configured as a multistage amplifier (not shown). The optical system 2672 may deliver an approximately diffraction limited beam to target 2675. The spot size will generally be application dependent, but may be in the range from about 1 µm to 250 µm. The optical system 2672 may also include scan mirrors or other suitable beam positioning equipment. Target 2675 may also be mounted on a translation and/or rotary positioning stage, Controller 2677 coordinates operation of the laser, optical system, and any positioning mechanism.

Further characterization of this embodiment of the LCF fiber included measurement of LCF refractive index variations which may be affected by various properties of the LCF fiber including, for example, the size and/or spacing of cladding features, the thermal expansion coefficients of the cladding and/or cladding features, etc.

Figure 27:
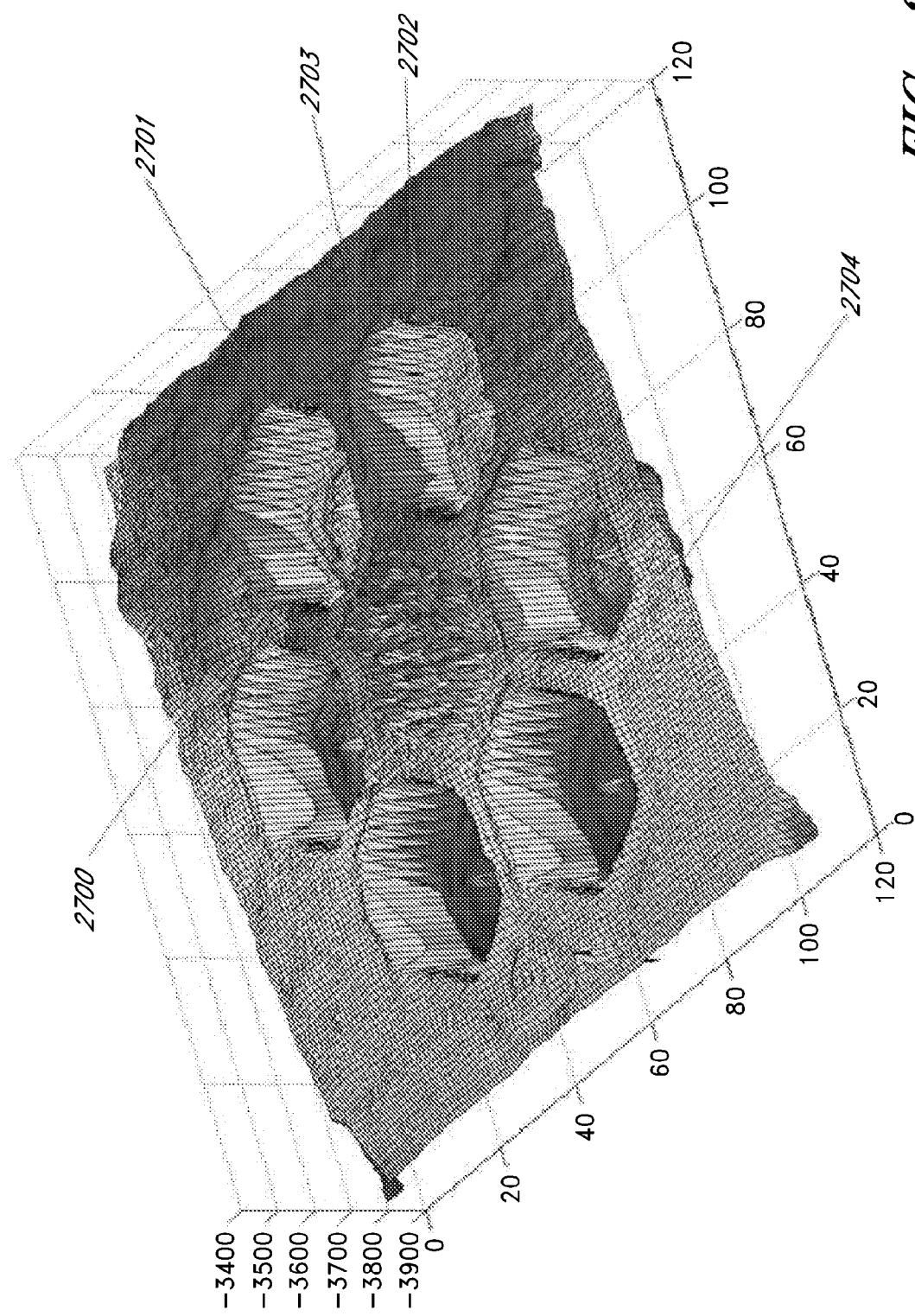
FIG. 27 is a three-dimensional plot illustrating a measured two-dimensional refractive index profile of the fiber of FIG. 26, and illustrates an increase in index of refraction near the low index features.

FIG. 27 illustrates a measured 2D refractive index 2700 of this LCF, showing core 2702 with doped center part 2703 and low index features 2701. The area 2704 around the low index features 2701 has an increased index of refraction. The index increase may be caused by the different material properties of silica and fluorine-doped silica, particularly from the different thermal expansion coefficients, δT. As fiber is drawn at high temperature, the fluorine-doped silica with higher coefficient of thermal expansion is trying to contract more than the surround silica glass. This contraction is, however, limited by the surrounding silica. The fluorine-doped silica is under tension in the fiber and the surrounding silica under compression at room temperature. This stress apparently gives rise to a stress-index index variation due to stress-optics effect Localized variations in index can occur in some fiber embodiments as a result of different thermal properties of the features and the first cladding material. However, LCF guidance mechanisms were observed in some example experiments with LCF fibers. In some cases, the relatively large feature size, arrangement, and number of features provides for LCF guidance as a dominant mechanism.

In some embodiments, feature sizes and arrangements can affect the index profile of the core region (or other fiber regions), for example increasing the relative change in refractive index. Increasing the feature size and spacing (e.g.: scaling the overall dimension) will generally result in a larger relative index change (e.g.: larger maximum index modulation). The net index variations caused by the stress-optical effect may include compensating contributions from nearby features, and the net result, in some cases, is dependent on feature spacing. For example, smaller features spaced closer together will generally produce reduced index modulation. In various embodiments the feature sizes and/or spacing may be pre-selected to tailor the index profile of the cladding and/or core regions. In some embodiments, the materials comprising the cladding and the cladding features may be pre-selected to tailor the index profile of the cladding and/or core regions. For example, in some embodiments, the materials are selected based at least in part on values of their thermal expansion coefficients. In some embodiments, the cladding features may comprise fluorine-doped silica and the cladding may comprise silica. Other materials, e.g., doped and/or undoped glasses, may be used in other embodiments.

Fabricated LCF Example: N=2—Mode Loss and Bend Loss

In various embodiments wherein cladding features are disposed in a single layer (e.g.: rings) as in FIGS. 1b and 1c typical values of d/Λ may be in the range of about 0.65-0.9, 0.7-0.9, or 0.75-0.85. In some embodiments at least a second layer of features (N≥2) may be disposed beyond cladding features 102, and a typical range of d/Λ in some cases may be in a range of about 0.3-0.9, 0.4-0.8, 0.5-0.7, or 0.5-0.8. Other ranges of d/Λ may be used for any of the layers of cladding features. If more than one layer of cladding features is used, the ratio d/Λ may (but need not) be different for each layer of cladding features.

Figure 31:
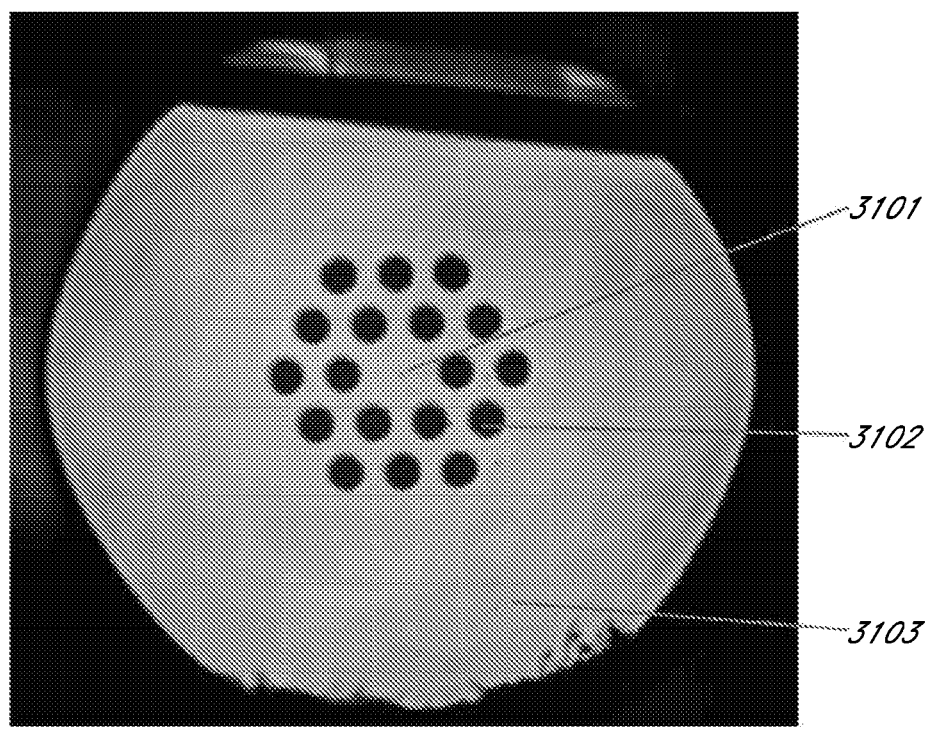
FIG. 31 illustrates a cross section of a fabricated LCF having two layers of cladding features, wherein d/Λ≈0.6.
Figure 32:
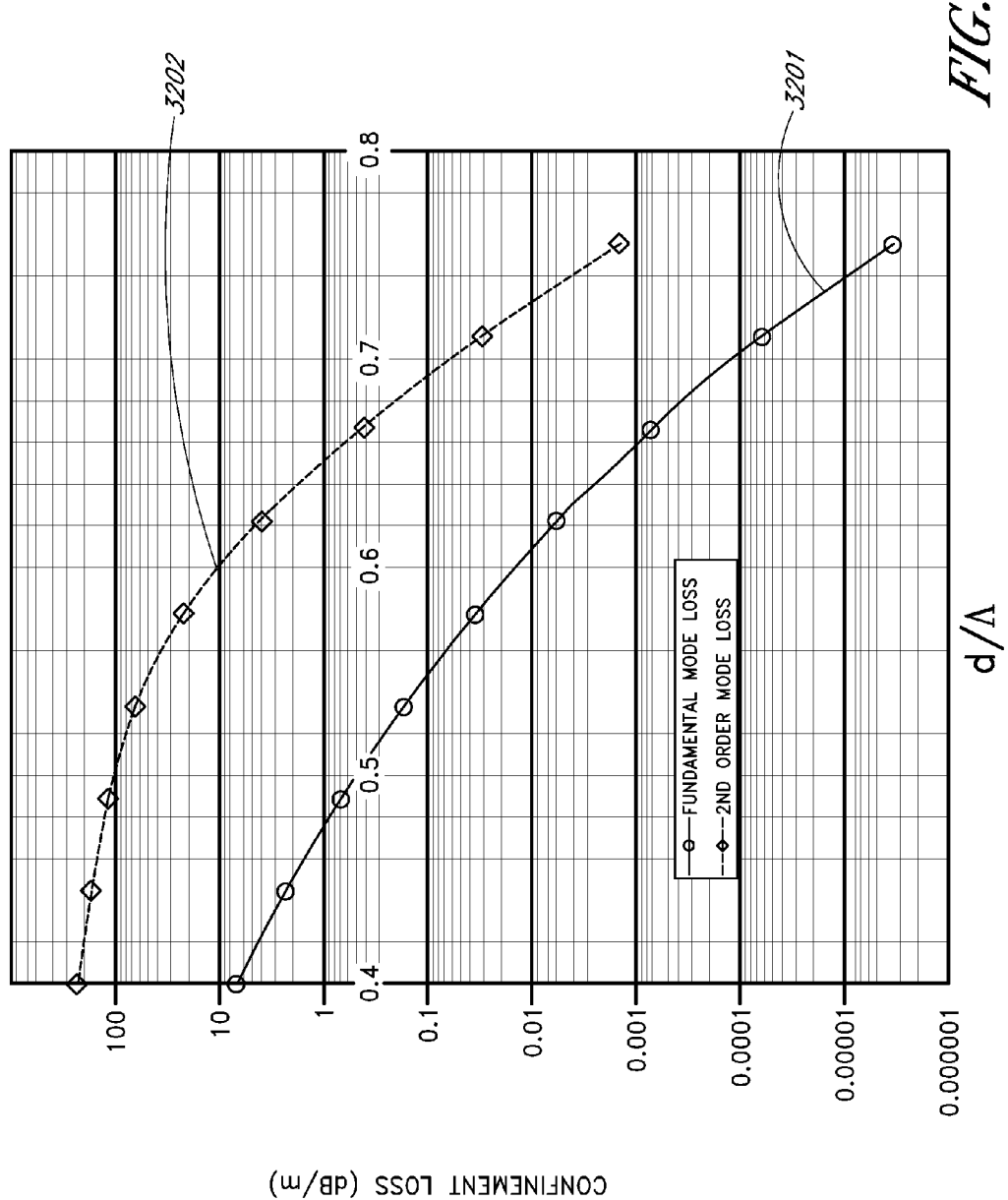
FIG. 32 is a plot illustrating confinement loss of fundamental and second-order modes of LCFs with two layers of cladding features.

FIG. 31 shows the cross section of a fabricated LCF with two layers of cladding features 3102 with d/Λ=0.6, substantially surrounding a core 3101, and a further outer cladding layer 3103. This LCF has a core diameter of 45 µm and a fiber diameter of about 400 µm. Such design provides this example LCF with a much improved higher order mode loss but slightly higher bend loss. The calculated confinement losses for fundamental and $2^{nd}$ order modes in example LCFs with two layers of cladding features are shown in FIG. 32. Fundamental mode confinement loss 3201 and $2^{nd}$ order mode confinement loss 3202 are plotted for various d/Λ. No outer cladding is included in this example calculation. It is assumed that cladding features are placed in an infinite cladding. It can be seen from FIG. 32 that a confinement loss ratio in the hundreds can be readily achieved over a significant range of d/Λ. Further careful choice of outer cladding dimension can further improve this ratio in some embodiments. Some LCF embodiments with further additional layers (N>2) can further improve loss ratio but, in some cases, at the cost of poorer bend loss performance.

Fabricated PCF and Example Test Results

Returning to FIG. 19, the figure illustrates an embodiment of an LCF with N=3, distinguished from a conventional photonic crystal fiber by the few layers of holes.

An endless single mode PCF with air holes in the cladding was first reported by Birks, et al with its unique property of greatly extending the single mode (SM) regime of a conventional optical fiber. A direct consequence of this is a significant increase of the core diameter in a SM fiber. This is beneficial for extending peak powers in commercial fiber lasers, which are limited by nonlinear effects due to tight core confinement.

There are, however, a number of drawbacks in some embodiments of fibers with air holes. The dimensions of small air holes in an endless SM fiber depends critically on a balance of strong surface tension and pressure during fiber drawing process and, consequently, is difficult to reproduce. The air holes have also to be sealed in a device to prevent environmental contamination, which can often have a negative impact on mode quality, especially in fibers with large cores. An all glass PCF is certainly attractive both in its ease of fabrication and in the possibility of deploying similar handling techniques that are well developed for conventional fibers.

As noted above, one or more of feature sizes and arrangements, material thermal properties, and other factors can (singly or in various combinations) affect the index profile of the core region (or other fiber regions), for example increasing the relative change. The localized variation may cause index (non-PCF) guidance. In some implementations, if this surprising guidance mechanism is not properly considered the resultant output mode will deviate from a desired or expected shape. When properly considered, the index guidance may provide a new and interesting guidance mechanism for use with a PCF, The following example illustrates the effect of index modulation on the guidance and mode profiles in an embodiment of a PCF fiber.

Figure 28B:
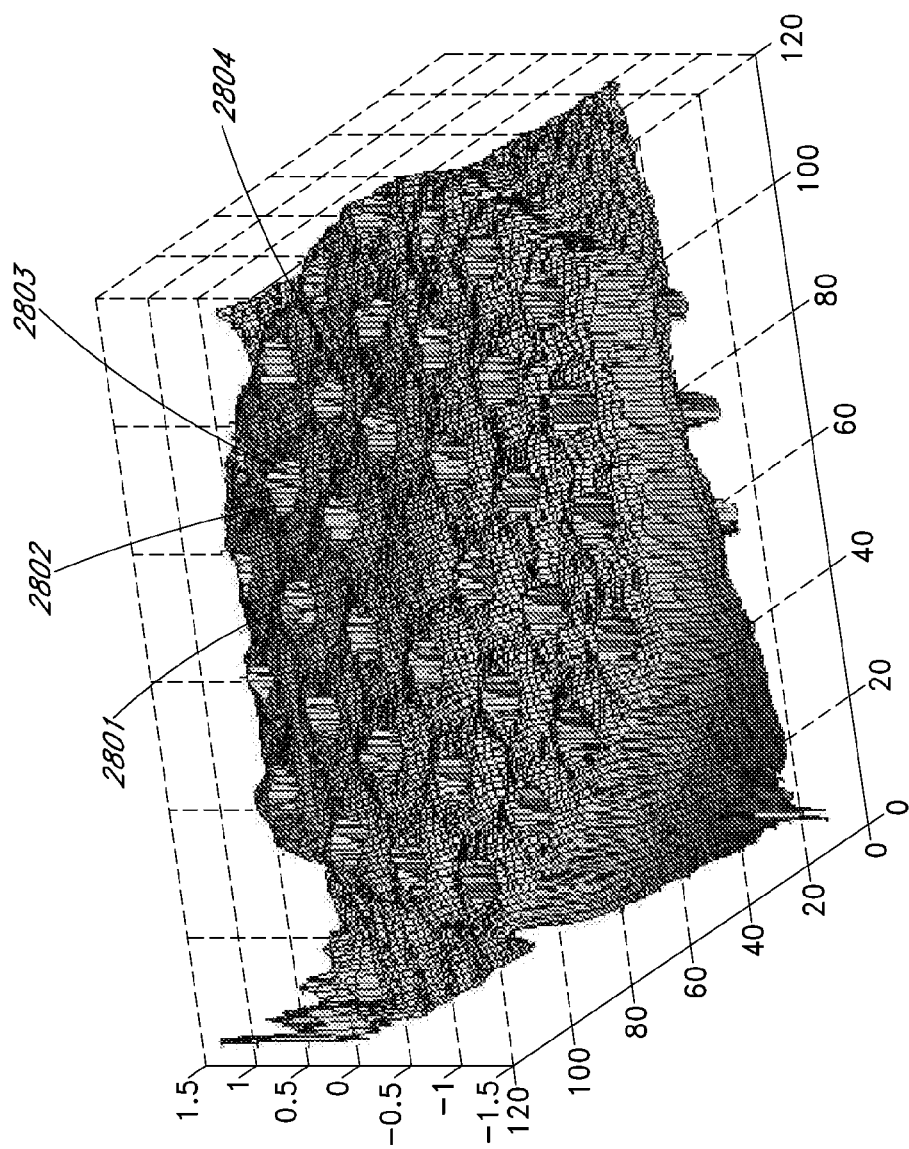

An all glass PCF was fabricated with $d/\Lambda=0.35$ and core diameter of 47 µm. The cross section 2800 of the fiber is shown in FIG. 28A and its refractive index profile 2801 is shown in FIG. 28B. Low index features 2802 are shown along a raised index ring 2804 around each low index feature 2802 due to mismatch in thermal properties. The raised index ring 2804 also creates a high index portion in the core 2803. A length of this fiber was kept straight while the output mode was measured at various wavelengths. The modes 2810, 2811, 2812, 2813, 2814 and 2815 at wavelengths 780 nm, 800 nm, 910 nm, 980 nm, 1000 nm and 1100 nm, respectively, are shown in FIG. 28C. Due to the existence of the lower wavelength cut-off, PCF guidance gets weaker towards the shorter wavelength. The example fiber embodiment is not very well guided below 780 nm, giving a maximum normalized core diameter $2\rho/\lambda\approx60$.

Figure 29:
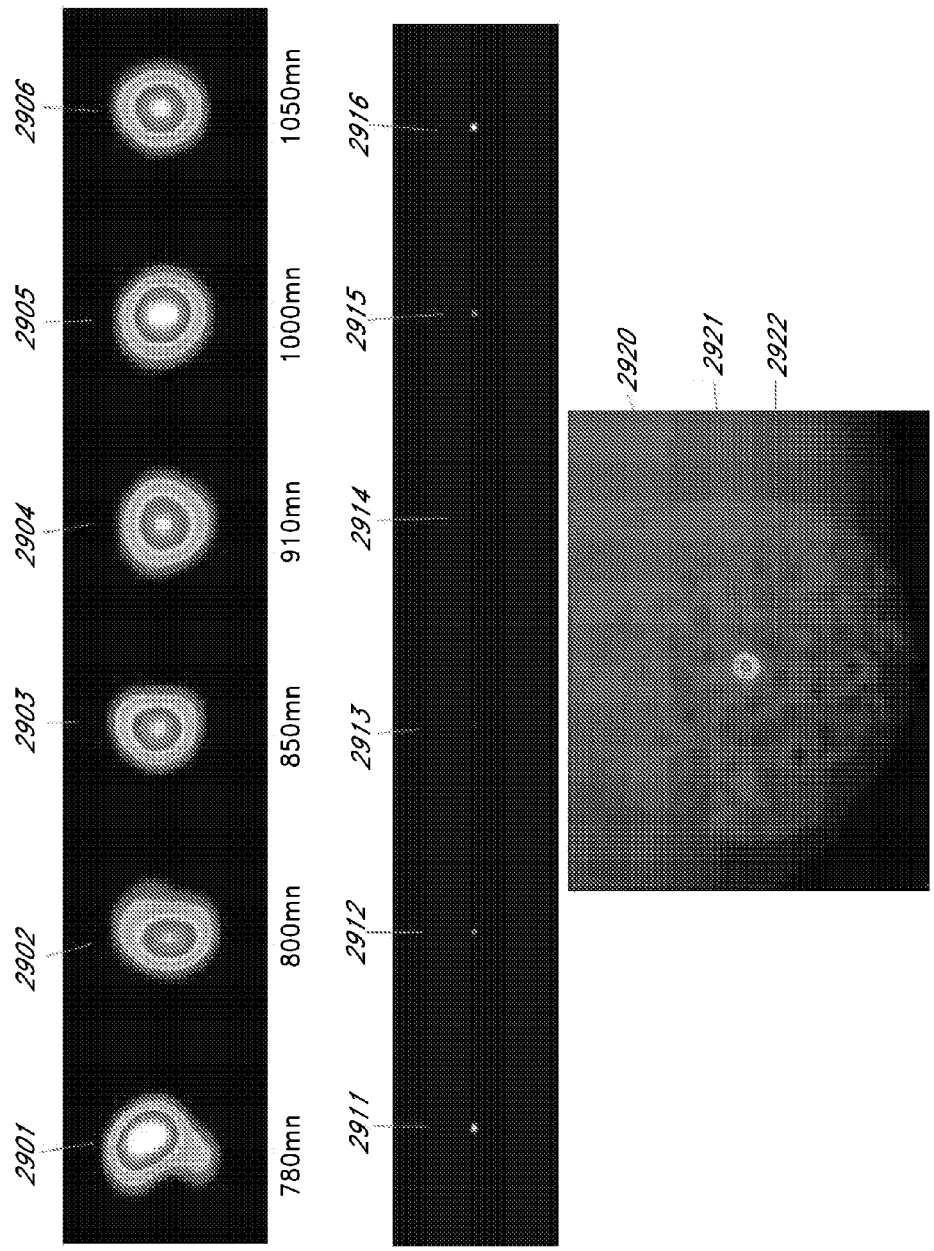
FIG. 29 illustrates mode field measurements obtained at several wavelengths using a fabricated fiber drawn from the same preform as the LCF of FIG. 28A.

A portion of the preform for the fiber shown in FIG. 28A was drawn into a fiber with diameter of ~700 µm and core diameter of ~130 µm. The raised index portion of ~80 µm in diameter in the center of the fiber starts to guide single mode shown in FIG. 29. Modes 2901, 2902, 2903, 2904, 2905 and 2906 were measured at wavelengths of 780 nm, 800 nm, 850 nm, 910 nm, 1000 nm and 1050 nm respectively. The fundamental mode operation is very robust at 1 µm and higher order mode content is seen below 850 nm. Modes 2911, 2912, 2913, 2914, 2915 and 2916 are modes captured while adjusting launch condition at 1 µm wavelength. No other modes can be guided in this range of adjustment in this example. In any case, it is most apparent from image 2920 that the mode is not guided by normal PCF guidance. The image 2920 was taken with the fiber cross section illuminated. In FIG. 29, the mode 2921 can be clearly seen not to extend to the low index features 2922. Also, the mode 2921 is substantially centered well within a core region of the fiber (e.g., the region bounded by the inner layer of low index features 2922). The mode shape does not exhibit the characteristics of the cladding features, for example as illustrated with mode profile 2814 in FIG. 28C, whose shape is indicative of a mode guided with cladding features.

Figure 30:
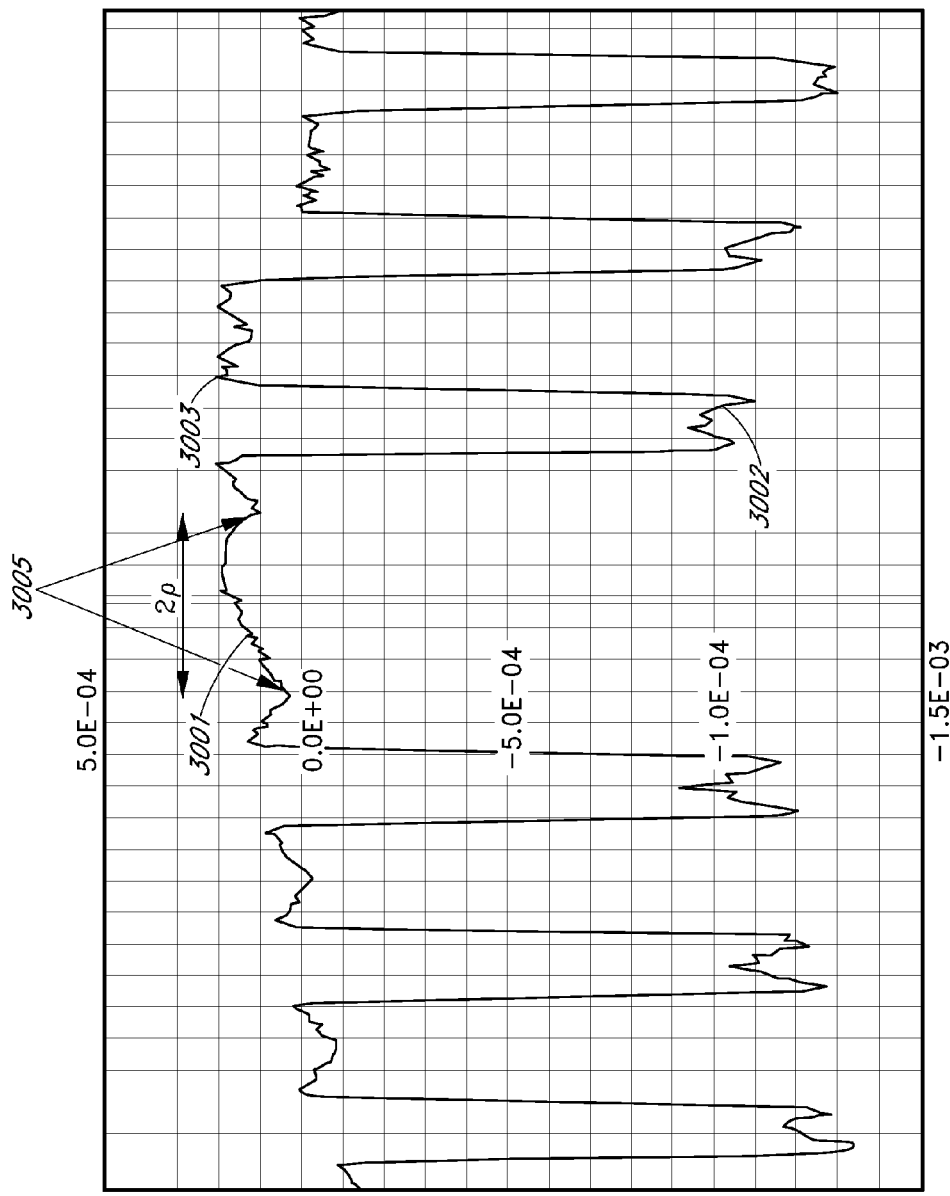
FIG. 30 is a plot illustrating a section of the two-dimensional refractive index profile of FIG. 28B.

Refractive index variation in the cross section of a fiber along a line crossing the center of the fiber and a number of fluorine-doped rods was measured and is shown in FIG. 30. The raised index core 3001 has a diameter of $2\rho$. Index depression 3002 from fluorine-doped glass is also shown along with the raised index ring 3003 around it from stress effect. In some embodiments, the refractive index variation in a portion of the core may be approximately parabolic. The refractive index variation may permit a fundamental mode to be guided within a portion of a core having a non-uniform refractive index. For example, the mode diameter may be a fraction of the core diameter such as, for example about 50%.

The non-PCF guidance was a surprising result of the experiment. It suggests that conventional PCF guidance in large core fibers may be restricted to fiber embodiments where only small air holes are formed in the first cladding regions, configurations where a material other than glass is used, or possibly configurations where holes are filled with gas. The results also suggest that some possible PCF designs are less preferable for all glass, large core fibers. In some large core embodiments glasses having well-matched coefficients of thermal expansion may be utilized. Decreasing the core size, for example to 50 µm, may also generally improve performance in some cases.

In contrast to various LCF embodiments, the arrangement and relatively small feature size selected for this PCF example increased the localized index variation. The localized variation may be used for non-PCF guidance.

In at least one embodiment an all-glass fiber may comprise a first cladding material having a first thermal expansion coefficient. Additional layers, $N \geq 2$, of cladding features may be disposed in the first cladding material, and these features may be reduced in size compared to typical LCF cladding feature sizes. The cladding features may comprise a second cladding material having a second thermal expansion coefficient. A localized increase in an index of refraction adjacent to a cladding feature may be present. Moreover, a core region may be bounded by a first inner layer of cladding features. A portion of the core region may exhibit a non-uniform index profile as illustrated in FIG. 30, forming an index gradient. Referring to the FIG. 30, an exemplary relative refractive index difference measured from the peak of the raised index core region 3001 to local minima 3005 is less than about $5\times10^{-4}$, and may typically be less than about $1\times10^{-3}$. The increased local index beyond each local minima 3005 corresponds to a transition to low index cladding features. The local gradient from the peak to local minima is sufficiently large to cause index guiding of a fundamental mode within at least a portion of the core region. The relative refractive index difference may be caused by a stress-optic effect.

In various embodiment a diameter of the large core fiber may be in the range of about 30 µm to 200 µm. Applications of such a fiber may be found, for example, in high-power chirped pulse amplification systems, non-linear amplifiers, and continuum generators to broaden a spectrum of an input pulse. Such a high-peak power pulse will have sufficiently high intensity to exceed a non-linear threshold of the fiber medium. In some embodiments a pre-amplifier or power amplifier may be formed by doping the core Various embodiments may utilize "all-fiber" designs, or at least configurations that reduce the number of bulk optical components. Such embodiments may include any exemplary "all-glass" design above. Integrated configurations may be used with N=1, 2, 3, or a larger number of layers, polarization or non-polarization maintaining fibers, various pump guide arrangements, coatings, and various cladding configurations. Integrated designs may be utilized with lasers and amplifiers, including multiple stage designs. Various integrated designs may be particularly beneficial for fiber arrays, for example high-power coherent arrays, and the like. Arrangements may be utilized in exemplary applications, including material processing, laser radar, and telecommunications.

In some embodiments, various combinations of amplifier and transmission fibers may be spliced and yet efficiently couple energy while preserving beam quality. For example, the lens 2653 in FIG. 26C, or other bulk optic component(s), may not be required. A splice may be used to efficiently couple an input beam to the large core fiber 2650, while maintaining approximately diffraction limited beam quality.

FIG. 33A (not to scale) is a cross-section that schematically illustrates an LCF 3320 having a rare-earth doped large core 3315 and cladding features 102. A single-mode (or few-mode) fiber 3300 having a core 3305 is to be spliced to fiber 3320. In this example the outer diameters of the fibers 3300 and 3320 are approximately equal, but fibers may be selected with non-equal outer diameters. The fibers are to be spliced near plane 3310.

By way of example, commercially available CORNING® HI1060 single-mode specialty fiber may be utilized as the single-mode fiber 3300. The fiber parameters include a mode field diameter of about 6.2 μm, a length of about 1.2 m, a numerical aperture of about 0.14, and a cutoff wavelength of 920 nm±50 nm. The LCF 3320 may be an all-glass fabricated LCF having a length of about 80 cm, a 53 μm core, a corresponding mode-field diameter of about 43 μm, and a much smaller numerical aperture than the fiber 3300. In this example, the LCF 3320 is to be aligned with and spliced to the single mode fiber 3300.

The maximum power coupling expected with direct butt-coupling between two single mode fibers may be computed as follows (see, e.g., Ghatak, "Butt coupling between single mode fibers", in Introduction to Fiber Optics, Cambridge University Press, 1998, p 153):

$$T_0 = (2 * \omega_1 * \omega_2)^2 / (\omega_1^2 + \omega_2^2)^2, dB_{Loss} = -10 \log_{10}(T_0)$$

where $\omega_1$ and $\omega_2$ are the respective mode diameters. If the two fibers 3300, 3320 described above were directly coupled (butt-coupled) a loss of about 11 dB would be expected. Therefore, some mechanism to expand or otherwise match the mode fields is needed to avoid such loss.

In one example, splicing was carried out by using a source to provide for measurement and alignment of the cores of the two fibers. As a first step, the fundamental mode was excited and verified by imaging onto a CCD camera. The camera was then replaced with an optical power meter to measure loss. Upon establishing alignment of the two fibers, the splicing process was carried out by heating the region near plane 3310.

A surprisingly efficient coupling arrangement was demonstrated. Without subscribing to any particular theory, the results indicate dopant of core material 3305a diffused during splicing and increased the core size of fiber 3300. Applying multiple electrical arcs (rather than just a single arc) to heat the fiber ends and to join the fibers (e.g., with fusion splicing in this example) further increased the mode field of the single mode fiber 3300. A small 2.8 dB loss at approximately a 1060 nm wavelength, and reduced loss of about 1.5 dB at a wavelength of 1.3 μm, was observed. The observed loss is much smaller than would be obtainable with direct coupling (e.g.: 2.8 dB as opposed to 11 dB in this example). Although measurable variations in efficiency may be found from fiber to fiber, the demonstrated decrease in loss is significant.

FIG. 33B schematically illustrates the LCF 3320 and single mode fiber of FIG. 33A after splicing. The dimension of core 3305a is shown as expanded relative to the core 3305. As a result, an input beam can be transmitted from the fiber 3300 to the LCF 3320 with low-loss and without a significant compromise in mode quality.

FIG. 33C schematically illustrates an example of a mode profile relative to the cladding features, exemplifying propagation of the fundamental core mode and LCF guidance. The approximate $1/e^2$ beam diameter 3330 is shown, corresponding to roughly 80% of the core dimension.

Figure 33D:
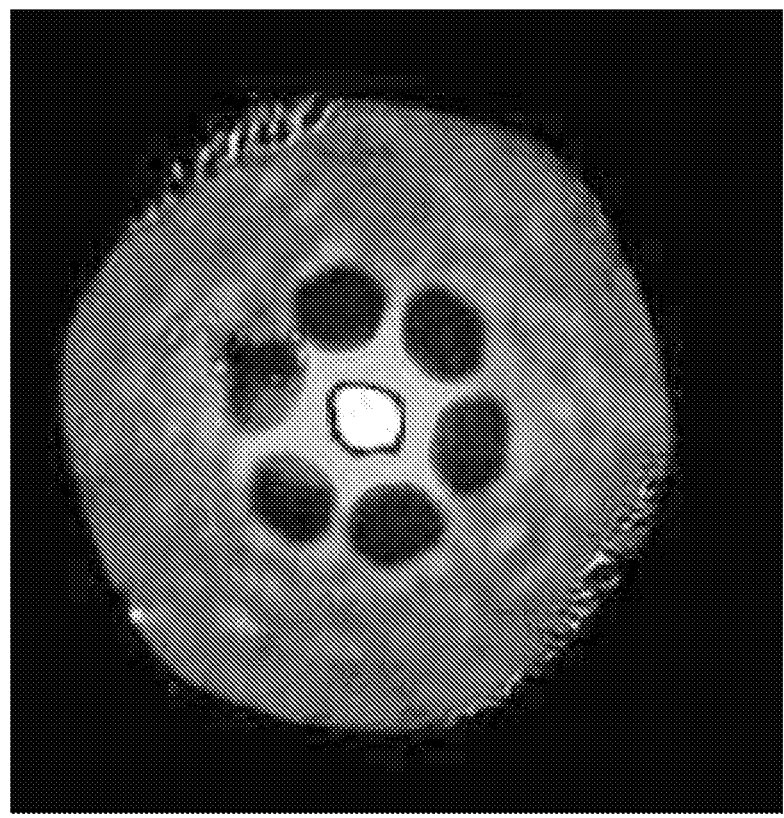
FIG. 33D is a photograph illustrating the output of a fabricated LCF, wherein the LCF and single mode fiber were spliced as illustrated in FIG. 33B. The photo shows the fundamental core mode relative to the cladding features, and demonstrates LCF guidance.

FIG. 33D is a photograph illustrating the output of a fabricated LCF, wherein the LCF and single mode fiber were spliced as illustrated in FIG. 33B. The photo shows the fundamental core mode relative to the cladding features, and demonstrates LCF guidance. The mode diameter relative to the cladding features closely corresponds to that schematically illustrated in FIG. 33C.

FIGS. 33A-33C schematically illustrate one example where the single mode fiber and LCF have the same outer diameters. The splicing of an LCF is not so restricted, and the single-mode fiber diameter may be different than the LCF diameter.

In some embodiments an intermediate fiber may be used and splicing carried out at each end. Such arrangements may provide for efficient coupling to an LCF having a larger core than the 53 μm core of the example above.

Large core fibers can be used in a variety of devices, systems and applications. For example, large core fibers can be used as passive delivery fiber for high peak power pulsed as well as CW lasers. The core may be rare-earth doped for operation in a fiber laser or laser amplifier. High peak power amplification is often used for ultra short pulses having picosecond or femtosecond pulse widths, for example, in configurations for direct amplification and chirped pulse amplification systems.

By way of example, specific reference is made to FIGS. 10-13, and 16-21 and the associated text of U.S. patent application Ser. No. 11/134,856, filed May 30, 2005 and entitled "Single Mode Propagation in Fibers and Rods with Large Leakage Channels", which show various device and system configurations which may be modified to utilize photonic crystal fibers, endless single mode photonic crystal fibers and leakage channel fibers configurations disclosed therein. For example, embodiments of the present invention may be utilized in many optical systems including amplifiers, lasers, short or ultrashort pulse generators, Q-switched lasers and other systems. Embodiments of the present invention may be used in systems for laser based modification of metal, semiconductor, and dielectric materials utilizing infrared, visible, and/or UV wavelengths. Other applications are also possible.

A wide variety of alternative configurations are also possible. For example, components (e.g., layers) may be added, removed, or rearranged. Similarly, processing and method steps may be added, removed, or reordered.

Accordingly, although the inventions described herein have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the inventions. It should be understood that various features and aspects of the disclosed embodiments can be combined with, or substituted for, one another in order to form varying modes of the disclosed inventions. Thus, it is intended that the scopes of the present inventions herein disclosed should not be limited by the particular disclosed embodiments described above.

What is claimed is:

1. A fiber optic amplifier system comprising:
   an optical pulse source providing optical pulses having a nearly diffraction limited input spatial profile;
   an optical pump source; and
   a fiber comprising,
      a first cladding region comprising a first cladding material having a first index of refraction, n1;
      cladding features disposed in said first cladding region, said cladding features comprising a second cladding material having a second index of refraction, n2, wherein n2 is less than n1, and wherein the cladding features have a dimension d and a center-to-center spacing Λ, and a ratio d/Λ is in a range from 0.3 to 0.9;
      a core region at least partially surrounded by said cladding features, said first cladding region and said cladding features configured such that said core region propagates at least one lower order mode having a wavelength, while limiting propagation of at least one higher order mode having the wavelength by providing said at least one higher order mode with a higher loss than the at least one lower order mode at the wavelength, wherein at least a portion of said core region is rare-earth doped, and
      a pump cladding configured to receive pump energy from said optical pump source,
   said fiber configured to receive said pulses and amplify said pulses such that the fiber optic amplifier system is configured to produce output pulses having nearly diffraction limited output spatial profiles and at least one output pulse having energy in a range from 10 μJ to 10 mJ.

2. The fiber optic amplifier system of claim 1, wherein said fiber is configured as an all-glass, leakage channel fiber.

3. The fiber optic amplifier system of claim 1, wherein said first cladding material comprises a first glass that comprises fused silica, and wherein said second cladding material comprises a second glass that comprises fluorine-doped silica glass or boron-doped silica glass.

4. The fiber optic amplifier system of claim 1, wherein said core region has a diameter in a range from 30 μm to 200 μm.

5. The fiber optic amplifier system of claim 1, wherein said first cladding region has a diameter in a range from 125 μm to 300 μm.

6. The fiber optic amplifier system of claim 1, wherein a relative refractive index difference characterized by (n1−n2)/n1 is less than $4.5 \times 10^{-3}$.

7. The fiber optic amplifier system of claim 1, wherein a repetition rate of said output pulses exceeds 1 kHz.

8. The fiber optic amplifier system of claim 7, wherein said repetition rate of said output pulses is below 1 MHz.

9. The fiber optic amplifier system of claim 1, wherein a pulse width of the at least one output pulse is below 1 ns.

10. The fiber optic amplifier system of claim 9, wherein said pulse width is above 1 ps.

11. The fiber optic amplifier system of claim 1, further comprising a pump guide to transmit a portion of said received pump energy to said core region.

12. The fiber optic amplifier system of claim 1, wherein said pump cladding is disposed beyond said first cladding region.

13. The fiber optic amplifier system of claim 1, wherein said pump cladding comprises a low index glass.

14. The fiber optic amplifier system of claim 13, wherein said low index glass comprises fluorine.

15. The fiber optic amplifier system of claim 1, wherein said pump cladding comprises a layer of air holes.

16. The fiber optic amplifier system of claim 1, wherein at least a portion of said pump cladding comprises a non-circular portion.

17. The fiber optic amplifier system of claim 16, wherein said non-circular portion is configured to increase mode mixing of a pump beam incident on said pump cladding.

18. A laser-based material processing system comprising:
   the fiber optic amplifier system of claim 1; and
   an optical system comprising a beam delivery optic to produce a spot on or within a material, said spot having a spot diameter in a range from 1 μm to 250 μm.

19. A laser-based radar system comprising the fiber optic amplifier system of claim 1.

20. The fiber optic amplifier system of claim 1, further comprising:
   a single mode or few-mode input fiber coupled to said fiber to deliver pulses from said optical pulse source to said fiber, wherein a core of said input fiber is expanded and power coupled from the core of said input fiber to said fiber is substantially greater than obtainable with butt-coupling.

21. The fiber optic amplifier system of claim 1, wherein a ratio of the loss of said at least one higher order mode to the loss of said at least one lower order mode is greater than 10 and less than 1000.

22. The fiber optic amplifier system of claim 1, wherein said wavelength is in a range from 458 nm to 1550 nm.

23. The fiber optic amplifier system of claim 1, where said ratio d/Λ is in a range from 0.5 to 0.8.

24. The fiber optic amplifier system of claim 1, where said ratio d/Λ is in a range from 0.65 to 0.9.

25. The fiber optic amplifier system of claim 1, where said ratio d/Λ is in a range from 0.75 to 0.85.

* * * * *

UNITED STATES PATENT AND TRADEMARK OFFICE
CERTIFICATE OF CORRECTION

| | | |
|---|---|---|
| PATENT NO. | : 9,632,243 B2 | Page 1 of 1 |
| APPLICATION NO. | : 14/644779 | |
| DATED | : April 25, 2017 | |
| INVENTOR(S) | : Liang Dong et al. | |

It is certified that error appears in the above-identified patent and that said Letters Patent is hereby corrected as shown below:

In the Specification

In Column 3 at Line 8, change "$1^{St}$" to --$1^{st}$--.

In Column 3 at Line 67, after "$n_1$" insert --.--.

In Column 10 at Line 24, change "11/134,856;and" to --11/134,856; and--.

In Column 12 at Line 31, change "A." to --$\Lambda$.--.

In Column 21 at Line 61, change "$1^{St}$" to --$1^{st}$--.

In Column 26 at Line 16, after "two hundred" insert --nanometers, representing at least an order of magnitude improvement over loss ratio 2404 in--.

In the Claims

In Column 35 at Line 44, in Claim 4, change "from30" to --from 30--.

In Column 35 at Lines 50-51, in Claim 6, change "(n1-n 2)/n1" to --(n1-n2)/n1--.

Signed and Sealed this
Third Day of October, 2017

Joseph Matal
*Performing the Functions and Duties of the
Under Secretary of Commerce for Intellectual Property and
Director of the United States Patent and Trademark Office*